US012780215B2

(12) United States Patent
Lin et al.

(10) Patent No.: US 12,780,215 B2
(45) Date of Patent: Nov. 3, 2026

(54) DISTRIBUTED NEURAL NETWORK SYSTEM FOR VEHICLE OCCUPANT MONITORING AND CONTROL

(71) Applicant: Reveal Innovations, LLC, Santa Clara, CA (US)

(72) Inventors: Rocky Chau-Hsiung Lin, Cupertino, CA (US); Thomas Yamasaki, Anaheim Hills, CA (US); Koichiro Kanda, San Jose, CA (US); Diego Rodriguez Risco, Campbell, CA (US); Alexander Joseph Ryan, Mountain View, CA (US); Samah Najeeb, Menlo Park, CA (US); Samir El Aouar, San Jose, CA (US)

(73) Assignee: Reveal Innovations, LLC, Santa Clara, CA (US)

(*) Notice: Subject to any disclaimer, the term of this patent is extended or adjusted under 35 U.S.C. 154(b) by 685 days.

(21) Appl. No.: 17/937,772

(22) Filed: Oct. 3, 2022

(65) Prior Publication Data

US 2023/0023870 A1 Jan. 26, 2023

Related U.S. Application Data

(63) Continuation of application No. 16/267,317, filed on Feb. 4, 2019, now Pat. No. 11,461,636, which is a (Continued)

(51) Int. Cl.

*B60W 40/08* (2012.01)
*G06N 3/04* (2023.01)
*G06N 3/063* (2023.01)

(52) U.S. Cl.

CPC ............... *B60W 40/08* (2013.01); *G06N 3/04* (2013.01); *G06N 3/063* (2013.01)

(58) Field of Classification Search

None

See application file for complete search history.

(56) References Cited

U.S. PATENT DOCUMENTS 6,236,908 B1 * 5/2001 Cheng ................. F02D 41/0062 701/1
8,370,030 B1 2/2013 Gurin (Continued)

OTHER PUBLICATIONS

Zeiler et al., Visualizing and Understanding Convolutional Networks, D. Fleet et al. (Eds.): ECCV 2014, Part I, LNCS 8689, 2014; pp. 818-833 (Year: 2014).*

(Continued)

*Primary Examiner* — Alan Chen

(74) *Attorney, Agent, or Firm* — Sheppard Mullin Richter & Hampton LLP

(57) ABSTRACT

Systems and methods are disclosed for applying neural networks in resource-constrained environments. A system may include a sensor located in a resource-constrained environment configured to generate first sensor data and second sensor data of the resource-constrained environment. The system may also include a first computing device not located in the resource-constrained environment configured to produce a neural network structure based on the first sensor data. The system may also include a second computing device configured to determine a state of the resource-constrained environment based on input of the second sensor data to the neural network structure. The system may also include a controller located in the resource-constrained environment configured to control a device in the resource-constrained environment based on the state of the resource-constrained environment determined by the second computing device. The second computing device may be further configured to calculate an activation area for the neural network structure.

16 Claims, 48 Drawing Sheets

Related U.S. Application Data continuation of application No. 15/947,295, filed on Apr. 6, 2018, now Pat. No. 10,210,451, which is a continuation-in-part of application No. 15/699,298, filed on Sep. 8, 2017, now Pat. No. 9,965,720, which is a continuation of application No. 15/397,715, filed on Jan. 3, 2017, now Pat. No. 9,760,827.

(60) Provisional application No. 62/365,629, filed on Jul. 22, 2016.

(56) References Cited

U.S. PATENT DOCUMENTS

| | | | | |
|---|---|---|---|---|
| 8,818,716 | B1 | 8/2014 | El Dokor | |
| 8,874,301 | B1 | 10/2014 | Rao | |
| 9,315,190 | B2 | 4/2016 | Yu | |
| 9,760,827 | B1 | 9/2017 | Lin | |
| 9,965,720 | B2 | 5/2018 | In | |
| 10,204,302 | B2 | 2/2019 | Lin | |
| 10,210,451 | B2 | 2/2019 | Lin | |
| 10,803,334 | B1 | 10/2020 | Lin | |
| 10,854,202 | B2 | 12/2020 | Yamasaki | |
| 10,872,379 | B1 | 12/2020 | Nepomuceno | |
| 10,913,463 | B2 | 2/2021 | Herz | |
| 11,461,636 | B2 * | 10/2022 | Lin | G06N 3/04 |
| 12,227,201 | B2 | 2/2025 | Lu | |
| 12,269,462 | B1 | 4/2025 | Garimella | |
| 2004/0169617 | A1 | 9/2004 | Yelton | |
| 2008/0144944 | A1 | 6/2008 | Breed | |
| 2009/0055180 | A1 | 2/2009 | Coon | |
| 2010/0033333 | A1 | 2/2010 | Victor et al. | |
| 2010/0274480 | A1 | 10/2010 | Mccall | |
| 2011/0125500 | A1 | 5/2011 | Talwar | |
| 2012/0089299 | A1 | 4/2012 | Breed | |
| 2014/0063064 | A1 | 3/2014 | Seo | |
| 2014/0236430 | A1 | 8/2014 | Kim | |
| 2014/0309833 | A1 | 10/2014 | Ferguson | |
| 2014/0309839 | A1 | 10/2014 | Ricci | |
| 2014/0330515 | A1 | 11/2014 | El Dokor | |
| 2014/0335902 | A1 | 11/2014 | Guba et al. | |
| 2015/0057885 | A1 | 2/2015 | Brady | |
| 2015/0178556 | A1 | 6/2015 | Perski | |
| 2015/0179062 | A1 | 6/2015 | Ralston et al. | |
| 2015/0239467 | A1 | 8/2015 | Wang | |
| 2015/0362988 | A1 | 12/2015 | Yamamoto | |
| 2016/0001781 | A1 | 1/2016 | Fung et al. | |
| 2016/0034809 | A1 | 2/2016 | Trenholm et al. | |
| 2016/0205238 | A1 | 7/2016 | Abramson et al. | |
| 2016/0347310 | A1 | 12/2016 | Moran et al. | |
| 2016/0355133 | A1 | 12/2016 | Kim | |
| 2017/0001650 | A1 | 1/2017 | Park | |
| 2017/0045890 | A1 | 2/2017 | Gurin | |
| 2017/0178498 | A1 | 6/2017 | Mcerlean | |
| 2017/0187963 | A1 | 6/2017 | Lee | |
| 2017/0206440 | A1 | 7/2017 | Schrier | |
| 2018/0048801 | A1 | 2/2018 | Kiser | |
| 2018/0078444 | A1 | 3/2018 | Gamerman | |
| 2018/0079284 | A1 | 3/2018 | Choi | |
| 2018/0079427 | A1 | 3/2018 | Herz | |
| 2019/0009786 | A1 | 1/2019 | Liu | |
| 2019/0047582 | A1 | 2/2019 | Anderson | |
| 2019/0077398 | A1 | 3/2019 | Kusano | |
| 2019/0095725 | A1 | 3/2019 | Kalghatgi | |
| 2019/0122044 | A1 | 4/2019 | Noble | |
| 2019/0122689 | A1 | 4/2019 | Jain | |
| 2019/0171937 | A1 | 6/2019 | Lin | |
| 2019/0171938 | A1 | 6/2019 | Lin | |
| 2019/0325219 | A1 | 10/2019 | Lin | |
| 2019/0359169 | A1 | 11/2019 | Schutera | |
| 2019/0391581 | A1 | 12/2019 | Vardaro | |
| 2019/0392852 | A1 | 12/2019 | Hijazi | |
| 2020/0254997 | A1 | 8/2020 | Mueller | |
| 2020/0293815 | A1 | 9/2020 | Pfeifle | |
| 2020/0377107 | A1 | 12/2020 | Fung | |
| 2021/0012127 | A1 | 1/2021 | Chen | |
| 2021/0081689 | A1 | 3/2021 | Weyers | |
| 2021/0082434 | A1 | 3/2021 | Yamasaki | |
| 2021/0142080 | A1 | 5/2021 | Lin | |
| 2021/0194960 | A1 | 6/2021 | Ventimiglia | |
| 2025/0259455 | A1 | 8/2025 | Das | |

OTHER PUBLICATIONS

Dong et al., "Driver Inattention Monitoring System for Intelligent Vehicles: A Review", Jun. 2011, IEEE Transactions on Intelligent Transportation Systems, vol. 12, No. 2, pp. 596-614.

Molchanov et al., "Multi-Sensor System for Driver's Hand-Gesture Recognition"; IEEE 2015 (Year: 2015); 8 pages.

Ohn-Bar et al., "On Surveillance for Safety Critical Events: In-Vehicle Video Networks for Predictive Driver Assistance Systems", 2015, Computer Vision and Image Understanding, vol. 134, pp. 130-140.

Toshev et al., "Deep Pose: Human Pose Estimation via Deep Neural Networks"; Proceedings of the IEEE Conference on Computer Vision and Pattern Recognition (CVPR), 2014 (Year: 2014) 8 pages.

* cited by examiner

511

521

501

2604

2602

2700

3006

3004

3002

4000

Keypoints

Keypoints

Click on the image to add points

| # | x | y |
|---|---|---|
| 1 | 224 | 72 |
| 2 | 174 | 249 |
| 3 | 269 | 254 |
| 4 | 119 | 103 |
| 5 | 251 | 151 |
| 6 | 239 | 112 |

4100

DISTRIBUTED NEURAL NETWORK SYSTEM FOR VEHICLE OCCUPANT MONITORING AND CONTROL

CROSS REFERENCE TO RELATED APPLICATIONS

This application is a continuation of U.S. patent Ser. No. 16/267,317, filed Feb. 4, 2019, entitled "NEURAL NETWORK APPLICATIONS IN RESOURCE CONSTRAINED ENVIRONMENTS", which is a continuation of U.S. patent application Ser. No. 15/947,295, filed on Apr. 6, 2018, entitled "NEURAL NETWORK APPLICATIONS IN RESOURCE CONSTRAINED ENVIRONMENTS", now U.S. Pat. No. 10,210,451, which is a continuation-in-part of U.S. application Ser. No. 15/699,298, filed on Sep. 8, 2017, entitled "NEURAL NETWORK APPLICATIONS IN RESOURCE CONSTRAINED ENVIRONMENTS," now U.S. Pat. No. 9,965,720, which is a continuation of U.S. application Ser. No. 15/397,715, filed on Jan. 3, 2017, entitled "NEURAL NETWORK APPLICATIONS IN RESOURCE CONSTRAINED ENVIRONMENTS," now U.S. Pat. No. 9,760,827, which claims priority to U.S. Provisional Application 62/365,629 filed on Jul. 22, 2016 entitled "NEURAL NETWORKS FOR USE IN AUTOMOTIVE SYSTEMS", which are incorporated herein in their entirety.

TECHNICAL FIELD

This patent document relates to systems, devices, and processes that use neural networks in resource-constrained environments.

BACKGROUND

Artificial neural networks are processing devices that are somewhat modeled after the neural structure of a cerebral cortex. Neural networks perform a type of supervised learning, using known inputs and known outputs to develop a model to categorize, classify, or predict something about a future input. Neural networks are highly adaptable and thus have been employed in many different domains.

SUMMARY

According to some embodiments of the present disclosure, a system is provided. The system includes a sensor located in a resource-constrained environment configured to generate sensor data of the resource-constrained environment. The system further includes a first computing device not located in the resource-constrained environment configured to produce a neural network structure based on the sensor data. The system further includes a second computing device located in the resource-constrained environment configured to provide the sensor data as input to the neural network structure. The second computing device is further configured to determine a state of the resource-constrained environment based on the input of the sensor data to the neural network structure.

In some embodiments, the system further includes a controller located in the resource-constrained environment configured to control an element in the resource-constrained environment based on the state of the resource-constrained environment determined by the second computing device.

In some embodiments, the system further includes a transceiver located in the resource-constrained environment configured to transmit the sensor data from the sensor to the first computing device.

In some embodiments, the transceiver is configured to transmit the sensor data from the sensor to the first computing device using a wireless communications link.

In some embodiments, the wireless communications link provides intermittent communications between the transceiver and the first computing device.

In some embodiments, the sensor is located in or next to a rearview mirror of an automobile.

In some embodiments, the sensor includes a camera and the sensor data includes visual images of the resource-constrained environment.

In some embodiments, the first computing device is configured to produce the neural network structure based in part on labels associated with the sensor data.

In some embodiments, the labels associated with the sensor data identify one or more states of the resource-constrained environment as captured by the sensor data.

In some embodiments, the system further includes an automobile controller located in the resource-constrained environment configured to control a self-driving mode of an automobile based on the state of the resource-constrained environment determined by the second computing device.

In some embodiments, the second computing device is configured to determine whether a driver in the resource-constrained environment is in a safe driving state based on the input of the sensor data to the neural network structure.

In some embodiments, the system further includes an automobile controller located in the resource-constrained environment configured to control an indicator device of an automobile based on the state of the resource-constrained environment determined by the second computing device.

In some embodiments, the second computing device is configured to determine whether an adult is present in the resource-constrained environment based on the input of the sensor data to the neural network structure. In such embodiments, the second computing device is further configured to determine whether a child is present in the resource-constrained environment based on the input of the sensor data to the neural network structure.

In some embodiments, the second computing device is configured to determine whether a child is restrained in a child safety seat in the resource-constrained environment based on the input of the sensor data to the neural network structure.

In some embodiments, the second computing device is configured to determine whether an item has been abandoned in the resource-constrained environment based on the input of the sensor data to the neural network structure.

According to some embodiments of the present disclosure, a method is provided. The method includes generating sensor data of a resource-constrained environment using a sensor located in the resource-constrained environment. The method further includes producing a neural network structure based on the sensor data using a first computing device not located in the resource-constrained environment. The method further includes inputting the sensor data to the neural network structure using a second computing device located in the resource-constrained environment. The method further includes determining a state of the resource-constrained environment based on a result of the inputting of the sensor data to the neural network structure.

According to some embodiments of the present disclosure, a system is provided. The system includes a sensor located in an automobile. In such embodiments, the sensor is configured to produce first sensor data related to an image of an interior of the automobile and second sensor data related to an image of the interior of the automobile. The system further includes a local transceiver device located in the automobile. In such embodiments, the local transceiver device is configured to receive the first sensor data from the sensor. The system further includes a remote computing device located remote from the automobile. In such embodiments, the remote computing device is configured to apply a neural network to the first sensor data in order to produce neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to receive the neural network configuration parameters over the communication link from the remote computing device. The system further includes a local computing device located in the automobile. In such embodiments, the local computing device is configured to receive the neural network configuration parameters from the local transceiver device. In such embodiments, the local computing device is configured to receive the second sensor data from the sensor. In such embodiments, the local computing device is configured to determine whether a driver of the automobile is in a distracted state based on the neural network configuration parameters and the second sensor data. The system further includes an automobile controller located in the automobile. In such embodiments, the automobile controller is configured to control a transition of the automobile between a self-driving mode and a non-self-driving mode. In such embodiments, the automobile controller is configured to receive an output of the distracted state determination from the local computing device. In such embodiments, the automobile controller is configured to restrict the transition of the automobile between the self-driving mode and the non-self-driving mode based on the output of the distracted state determination.

According to some embodiments of the present disclosure, a system is provided. The system includes a sensor located in an automobile. In such embodiments, the sensor is configured to produce first sensor data related to an image of an interior of the automobile and second sensor data related to an image of the interior of the automobile. The system further includes a local transceiver device located in the automobile. In such embodiments, the local transceiver device is configured to receive the first sensor data from the sensor. The system further includes a remote computing device located remote from the automobile. In such embodiments, the remote computing device is configured to apply a neural network to the first sensor data in order to produce neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to receive the neural network configuration parameters over the communication link from the remote computing device. The system further includes a local computing device located in the automobile. In such embodiments, the local computing device is configured to receive the neural network configuration parameters from the local transceiver device. In such embodiments, the local computing device is configured to receive the second sensor data from the sensor. In such embodiments, the local computing device is configured to determine whether a child is present in a child seat and whether an adult is present in a car seat based on the neural network configuration parameters and the second sensor data. The system further includes an automobile controller located in the automobile. In such embodiments, the automobile controller is configured to control an indicator device. In such embodiments, the automobile controller is configured to receive an output of the determination of whether a child is present in the child seat and whether an adult is present in the car seat. In such embodiments, the automobile controller is configured to cause the indicator device to output an alert based on the determination of whether a child is present in the child seat and whether an adult is present in the car seat.

According to some embodiments of the present disclosure, a system is provided. The system includes a first sensor located in an automobile. In such embodiments, the first sensor is configured to produce first sensor data related to an image of an interior of the automobile and second sensor data related to an image of the interior of the automobile. The system further includes a second sensor located in an automobile. In such embodiments, the second sensor is configured to produce third sensor data related to an image of an interior of the automobile and fourth sensor data related to an image of the interior of the automobile. The system further includes a local transceiver device located in the automobile. In such embodiments, the local transceiver device is configured to receive the first sensor data from the first sensor. In such embodiments, the local transceiver device is configured to receive the third sensor data from the second sensor. The system further includes a remote computing device located remote from the automobile. In such embodiments, the remote computing device is configured to apply a neural network to the first sensor data in order to produce first neural network configuration parameters. In such embodiments, the remote computing device is configured to apply a neural network to the third sensor data in order to produce second neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to transmit the third sensor data over the communication link to the remote computing device. In such embodiments, the local transceiver device is configured to receive the first neural network configuration parameters over the communication link from the remote computing device. In such embodiments, the local transceiver device is configured to receive the second neural network configuration parameters over the communication link from the remote computing device. The system further includes a local computing device located in the automobile. In such embodiments, the local computing device is configured to receive the first neural network configuration parameters from the local transceiver device. In such embodiments, the local computing device is configured to receive the second neural network configuration parameters from the local transceiver device. In such embodiments, the local computing device is configured to receive the second sensor data from the first sensor. In such embodiments, the local computing device is configured to receive the fourth sensor data from the second sensor. In such embodiments, the local computing device is configured to determine whether an adult of the automobile is in a present state or an absent state based on the first neural network configuration parameters and the second sensor data. In such embodiments, the local computing device is configured to determine whether a child is in a present state or an absent state based on the second neural network configuration parameters and the fourth sensor data. The system further includes an automobile controller located in the automobile. In such embodiments, the automobile controller is configured to control an indicator device. In such embodiments, the automobile controller is configured to receive an output of the adult present or absent determination from the local computing device. In such embodiments, the automobile. In such embodiments, the automobile controller is configured to receive an output of the child present or absent determination from the local computing device. In such embodiments, the automobile controller is configured to cause the indicator device to output an alert based on the output of the child present or absent determination indicating that the child is in a present state and based on the output of the adult present or absent determination indicating that the adult was in a present state previously and is now in a present state.

According to some embodiments of the present disclosure, a system is provided. The system includes a first sensor located in an automobile. In such embodiments, the first sensor is configured to produce first sensor data related to an image of an interior of the automobile and second sensor data related to an image of the interior of the automobile. The system further includes, a second sensor located in the automobile. In such embodiments, the second sensor is configured to produce third sensor data indicating a gear of a transmission of the automobile. The system further includes a local transceiver device located in the automobile. In such embodiments, the local transceiver device is configured to receive the first sensor data from the first sensor. The system further includes a remote computing device located remote from the automobile. In such embodiments, the remote computing device is configured to apply a neural network to the first sensor data in order to produce neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to receive the neural network configuration parameters over the communication link from the remote computing device. The system further includes a local computing device located in the automobile. In such embodiments, the local computing device is configured to receive the neural network configuration parameters from the local transceiver device. In such embodiments, the local computing device is configured to receive the second sensor data from the first sensor. In such embodiments, the local computing device is configured to determine whether a child is in a restrained state or a not restrained state based on the neural network configuration parameters and the second sensor data. The system further includes an automobile controller located in the automobile. In such embodiments, the automobile controller is configured to control an indicator device. In such embodiments, the automobile controller is configured to receive an output of the determination of whether the child is in a restrained state or a not restrained state. In such embodiments, the automobile controller is configured to receive the third sensor data from the second sensor. In such embodiments, the automobile controller is configured to cause the indicator device to output an alert based on the output of the determination of whether the child is in a restrained state or a not restrained state indicating that the child is in a not restrained state and based on the third sensor data indicating that the automobile is in a gear that is not the park gear.

According to some embodiments of the present disclosure, a system is provided. The system includes a first sensor located in an automobile. In such embodiments, the first sensor is configured to produce first sensor data related to an image of an interior of the automobile and second sensor data related to an image of the interior of the automobile. The system further includes a second sensor located in the automobile. In such embodiments, the second sensor is configured to produce third sensor data indicating a velocity of the automobile. The system further includes a local transceiver device located in the automobile. In such embodiments, the local transceiver device is configured to receive the first sensor data from the first sensor. The system further includes a remote computing device located remote from the automobile. In such embodiments, the remote computing device is configured to apply a neural network to the first sensor data in order to produce neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to receive the neural network configuration parameters over the communication link from the remote computing device. The system further includes a local computing device located in the automobile. In such embodiments, the local computing device is configured to receive the neural network configuration parameters from the local transceiver device. In such embodiments, the local computing device is configured to receive the second sensor data from the first sensor. In such embodiments, the local computing device is configured to determine whether a child is in a restrained state or a not restrained state based on the neural network configuration parameters and the second sensor data. The system further includes an automobile controller located in the automobile. In such embodiments, the automobile controller is configured to control an indicator device. In such embodiments, the automobile controller is configured to receive an output of the determination of whether the child configured to receive the third sensor data from the second sensor. In such embodiments, the automobile controller is configured to cause the indicator device to output an alert based on the output of the determination of whether the child is in a restrained state or a not restrained state indicating that the child is in a not restrained state and based on the third sensor data indicating that the automobile has a velocity that is greater than zero.

According to some embodiments of the present disclosure, a system is provided. The system includes a sensor located in an automobile. In such embodiments, the sensor is configured to produce first sensor data related to an image of an interior of the automobile and second sensor data related to an image of the interior of the automobile. The system further includes a local transceiver device located in the automobile. In such embodiments, the local transceiver device is configured to receive the first sensor data from the sensor. The system further includes a remote computing device located remote from the automobile. In such embodiments, the remote computing device is configured to apply a neural network to the first sensor data in order to produce neural network configuration parameters. The system further includes a communication link provided between the local transceiver device and the remote computing device. In such embodiments, the local transceiver device is configured to transmit the first sensor data over the communication link to the remote computing device. In such embodiments, the local transceiver device is configured to receive the neural network configuration parameters over the communication link from the remote computing device. The system further includes a local computing device located in the automobile. In such embodiments, the local computing device is configured to receive the neural network configuration parameters from the local transceiver device. In such embodiments, the local computing device is configured to receive the second sensor data from the sensor. In such embodiments, the local computing device is configured to determine whether an abandoned item is present in the automobile based on the neural network configuration parameters and the second sensor data. The system further includes an automobile controller located in the automobile. In such embodiments, the automobile controller is configured to control an indicator device. In such embodiments, the automobile controller is configured to receive an output of the determination of whether an abandoned item is present in the automobile. In such embodiments, the automobile controller is configured to cause the indicator device to output an alert based on the output of the determination of whether an abandoned item is present in the automobile.

In some embodiments, the sensor generates the first sensor data when the automobile is in an unoccupied state. In such embodiments, the sensor generates the second sensor data after the automobile transitions from an occupied state to an unoccupied state.

DETAILED DESCRIPTION

Figure 1:
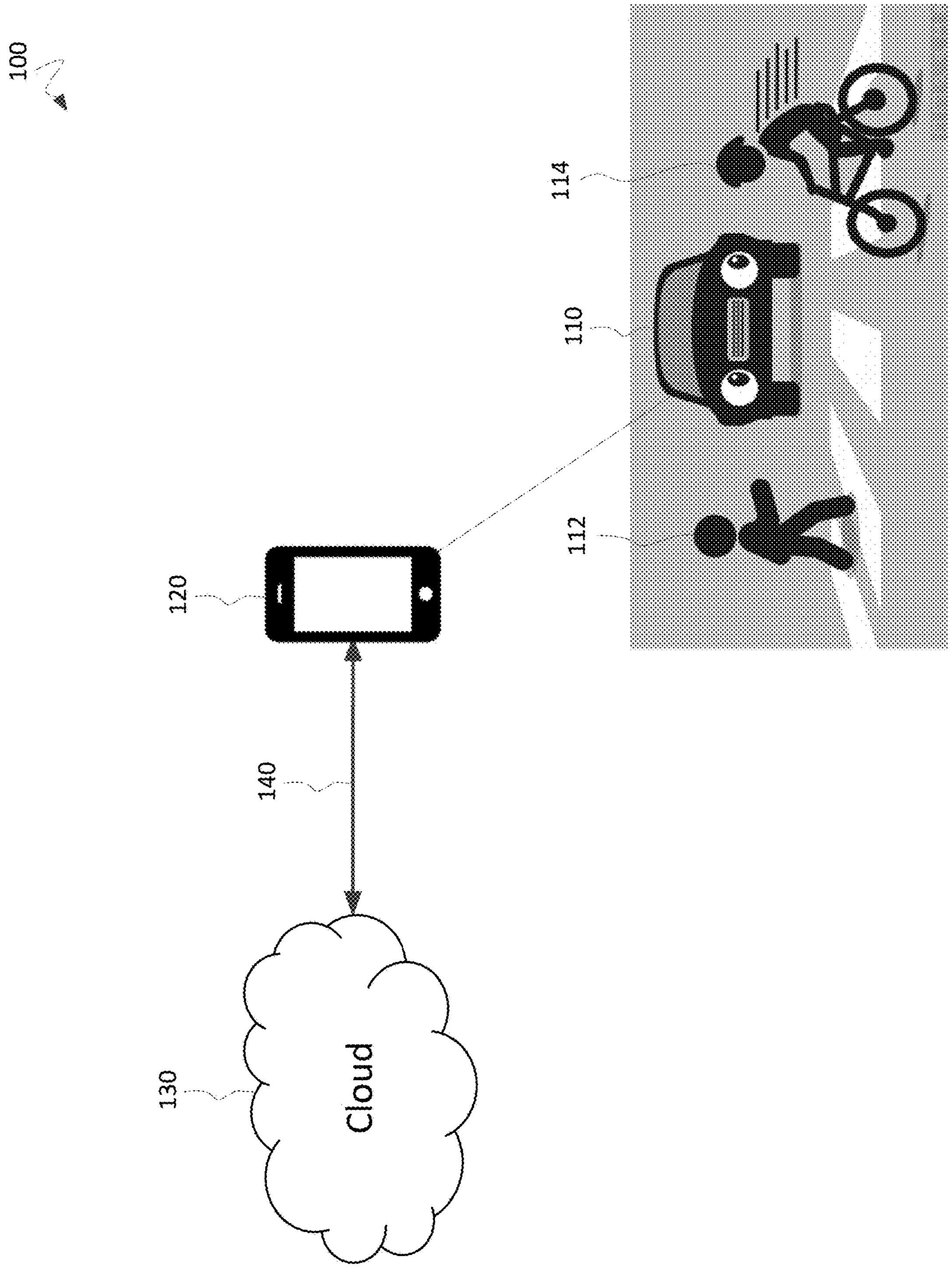
FIG. 1 is a diagram of a resource-constrained environment in which a neural network may be employed.

While neural networks are versatile and have been employed in many domains, there are significant challenges to deploying them in certain environments. This is because neural networks traditionally require significant processing power to train (i.e., to initially setup) and even to use.

As with other types of machine learning, neural networks leverage large volumes of input data in order to learn patterns about an environment. Also, as with other forms of machine learning, this process of learning patterns from large volumes of data ("training") can require both significant data storage resources and significant computer processing resources. While efficient algorithms have been developed to perform this training of the neural network, the training nonetheless requires many steps of data processing. As such, significant processing power is often used to speed up this training, such as with multi-core processors, multiple computers operating concurrently, and other forms of high-powered computing.

The output of the training process for a neural network is a set of configuration parameters that define the neural network and that reflect a model of the environment which the input data describes. The neural network defined by these configuration parameters can then be used with new input data in order to classify, categorize, or predict some value for the new input data.

Contrary to some other types of machine learning, neural networks can also require significant computing resources to use on new input data, even after having been trained. With many types of machine learning, the training of the model requires significant computing resources. But, the use of that model on new input data can be done with very little processing power. To the contrary, a neural network can require significant computing resources to use even after the configuration parameters are determined during the training process.

Therefore, an impediment exists to using neural networks in environments where significant processing power is not available, that is, in resource-constrained environments. Resource-constrained environments may include environments where embedded devices are used (e.g., embedded processing devices in an automobile), in mobile environments (e.g., a smartphone), in an Internet of Things environment (e.g., a networked controller for a refrigerator), and in a ubiquitous computing environment (e.g., a networked headset like GOOGLE GLASS). Because the devices in these environments may only have minimal processing power, these devices have typically not been able to make use of neural networks.

However, the present inventors recognized that these same resource-constrained environments may be greatly improved by the use of neural networks. For instance, the aforementioned examples of resource constrained environments involve high levels of human involvement, much more so than a typical high-powered computing environment. Due to the strength of neural networks to learn patterns in human environments, the present inventors recognized that neural networks could effect significant improvements to the computing devices and systems deployed in these resource-constrained environments.

Resource-constrained environments have also been considered inappropriate environments for application of neural networks due to the intermittent communications often associated with such environments. Because a computing device in a resource-constrained environment may operate on low power, it may not be feasible to have an always-available communications link between the resource-constrained computing device and other computing devices. Further, because a computing device in a resource-constrained environment may be a low cost embedded device, it may not be desirable to incur the financial cost and technical overhead of establishing an always-available communications link between the computing device and other computing devices. Further, because a computing device in a resource-constrained environment may move around widely, it may enter areas with reduced telecommunications infrastructure (e.g., lack of Wi-Fi and/or cellular networks) or areas with no authorized telecommunications infrastructure (e.g., outside the range of recognized Wi-Fi networks). This intermittent communications availability common in many resource-constrained environments has been considered an impediment to deploying neural networks, at least because it obstructed the ability to receive training data from the environment and then provide a trained neural network structure to the environment.

However, the present inventors recognized that this obstacle of intermittent communications in resource-constrained environments could be overcome with a variety of techniques. The present inventors recognized ways to not only deploy, but also to update, neural networks deployed in resource-constrained environments.

For the purpose of clarity, several embodiments demonstrating these benefits of using neural networks in resource-constrained environments are now described. For these exemplary embodiments, an automotive environment is used.

FIG. 1 is a diagram of a resource-constrained environment 100 in which a neural network may be employed. The environment 100 includes an automobile 110, a pedestrian 112, and a bicyclist 114. In the environment 100, a driver may be operating the automobile 110. The driver may operate the automobile 110 so as to avoid safety hazards, such as a collision with the pedestrian 112 or a collision with the bicyclist 114. The driver may also manage various tasks within the automobile 110, such as controlling music playback over the audio system of the automobile 110 or assuring that other passengers of the automobile 110 are securely fastened into a seat. The automobile 110 may have a self-driving or autopilot mode that allows the automobile 110 and/or a controller thereof to perform some of the operating tasks generally performed by the driver. In some situations, this self-driving or autopilot mode may provide a degree of autonomous driving by the automobile 110. The automobile 110 may have various indicator systems (e.g., audible alarms, visual indicators in the instrument cluster) in order to alert the driver to conditions or hazards in the environment 100 (e.g., presence of pedestrian 112, failure of the driver to fasten his seat belt).

The driver of the automobile 110 may possess a mobile device 120. The mobile device 120 may be present in the automobile 100 while the driver is operating the automobile 110. The mobile device 120 may communicate over a communication link 140 with remote networks and computing devices denoted by cloud 130. In some embodiments, a neural network may be trained in the cloud 130 and used in the automobile 110 in order to assist the driver in operating the automobile 110 and/or to assist the automobile 110 in operating in a self-driving or autopilot mode.

Figure 2:
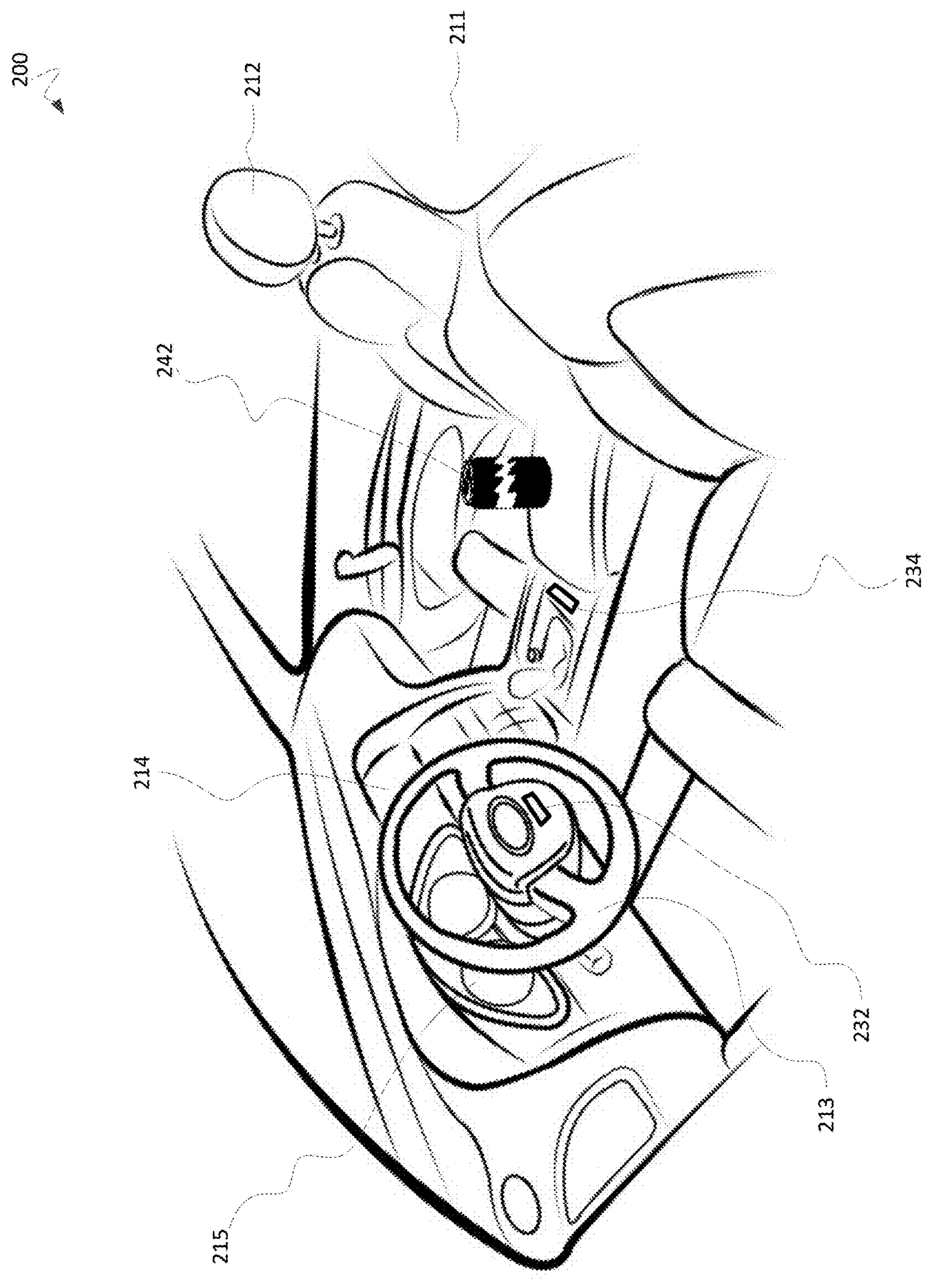
FIG. 2 is a diagram of the interior of an automobile in which a neural network may be employed according to some embodiments of the present disclosure.

FIG. 2 is a diagram of the interior 200 of an automobile in which a neural network may be employed according to some embodiments of the present disclosure. The interior 200 may include a driver's seat 211, a passenger's seat 212, and a steering wheel 213. The interior 200 may further include an infotainment display 214 and an instrument cluster 215. The driver of the automobile in which interior 200 is situated may sit in the driver's seat 211 and use the steering wheel 213, infotainment display 214, instrument cluster 215, and other elements in the interior 200 to operate the automobile.

The interior 200 may further include sensor 232 and sensor 234. Sensor 232 may be provided built into the steering wheel 213. Sensor 234 may be provided built into a center console of the interior 200. The sensors 232 and 234 may be configured to sense the interior 200. For instance, the sensors may sense the presence or absence of a driver in the driver's seat 211, the presence or absence of a passenger in the passenger's seat 212, the position of the arms and hands of a driver seated in the driver's seat 211, the orientation of the head of a driver seated in the driver's seat 211, and the presence of an object present in the interior 200 (e.g., soda can 242). The sensors 232 and 234 may be provided in a variety of forms, such as a video camera, an infrared emitter and sensor, and/or an ultrasound emitter and sensor.

Figure 3:
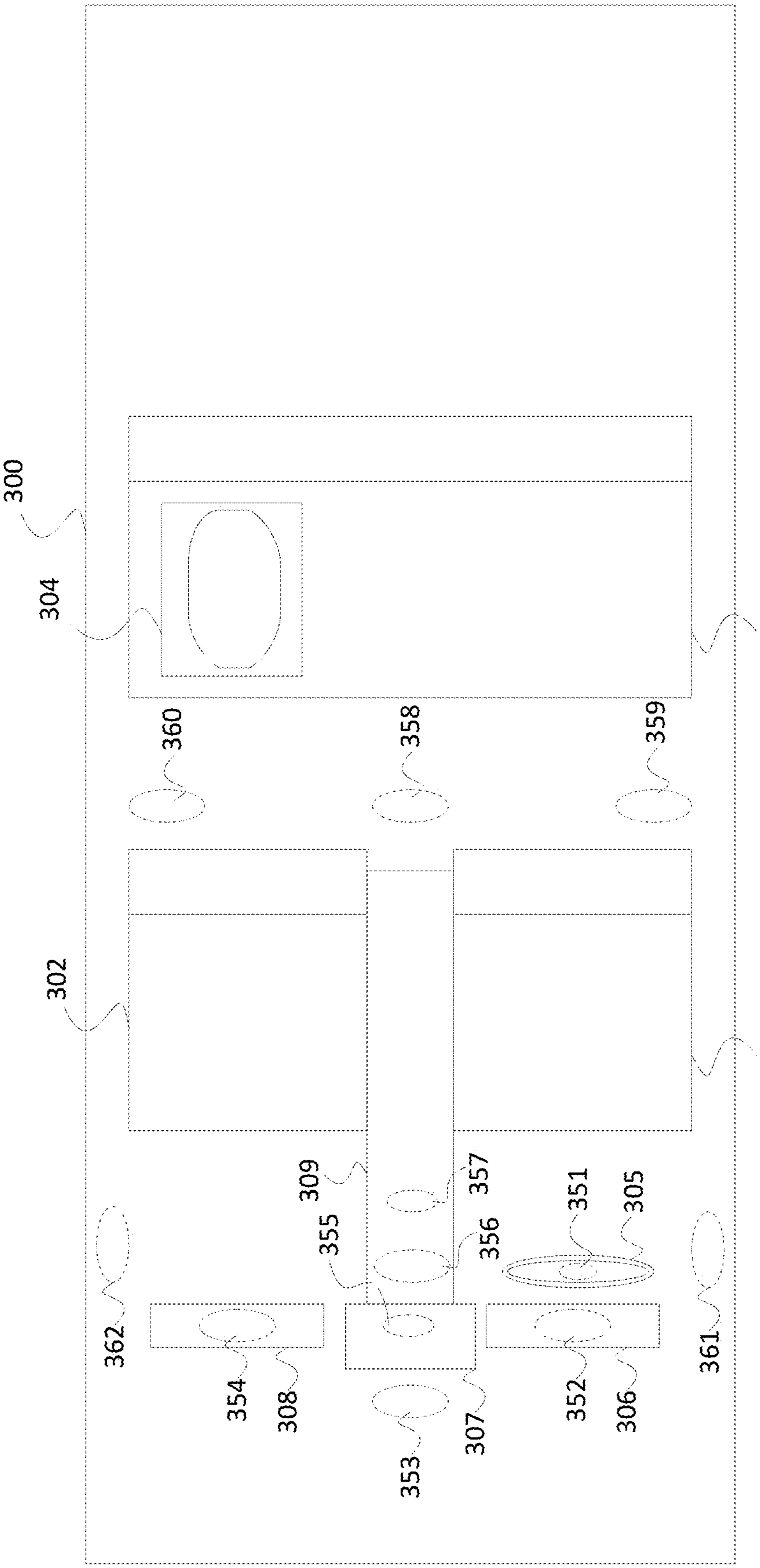
FIG. 3 is a schematic diagram from an overhead view of an automobile in which a neural network may be employed according to some embodiments of the present disclosure.

FIG. 3 is an schematic diagram from an overhead view of an automobile 300 in which a neural network may be employed according to some embodiments of the present disclosure. The automobile 300 may include a driver's seat 301, a passenger's seat 302, a rear seat 303, a child safety seat 304, a steering wheel 305, an instrument cluster 306, an infotainment display 307, a dashboard 308, and a center console 309. These features may be provided as described previously and as used in ordinary automobile environments.

The automobile 300 may further include various locations at which sensors may be located. A sensor may be located at location 351 built into the steering wheel 305. A sensor may be located at location 352 built into the instrument cluster 306. A sensor may be located at location 353 provided on or under a rearview mirror. A sensor may be located at location 354 built into the dashboard 308. A sensor may be provided at location 355 built into the infotainment display 307. A sensor may be provided at location 356 built into a dome light unit on the interior ceiling of the automobile 300. A sensor may be provided at location 357 built into the center console 309. A sensor may be provided at location 358 built into a dome light unit on the interior ceiling the automobile 300. A sensor may be provided at location 359 affixed to the interior ceiling the automobile 300. A sensor may be provided at location 360 affixed to the interior ceiling the automobile 300. A sensor may be provided at location 361 affixed to the interior of a driver-side A-pillar of the automobile 300. A sensor may be provided at location 362 affixed to the interior of a passenger-side A-pillar of the automobile 300. A sensor may be provided at other locations in the automobile 300 beyond those locations just described.

The sensors provided at these one or more locations may be provided as described previously. In some embodiments, a single sensor may be used at one of the aforementioned locations. In some embodiments, multiple sensors may be used at one of the aforementioned locations. In some embodiments, multiple sensors may be used at more than one of the aforementioned locations. In some embodiments, multiple sensors may be used with each sensor provided at a different one of the aforementioned locations.

Figure 4A:
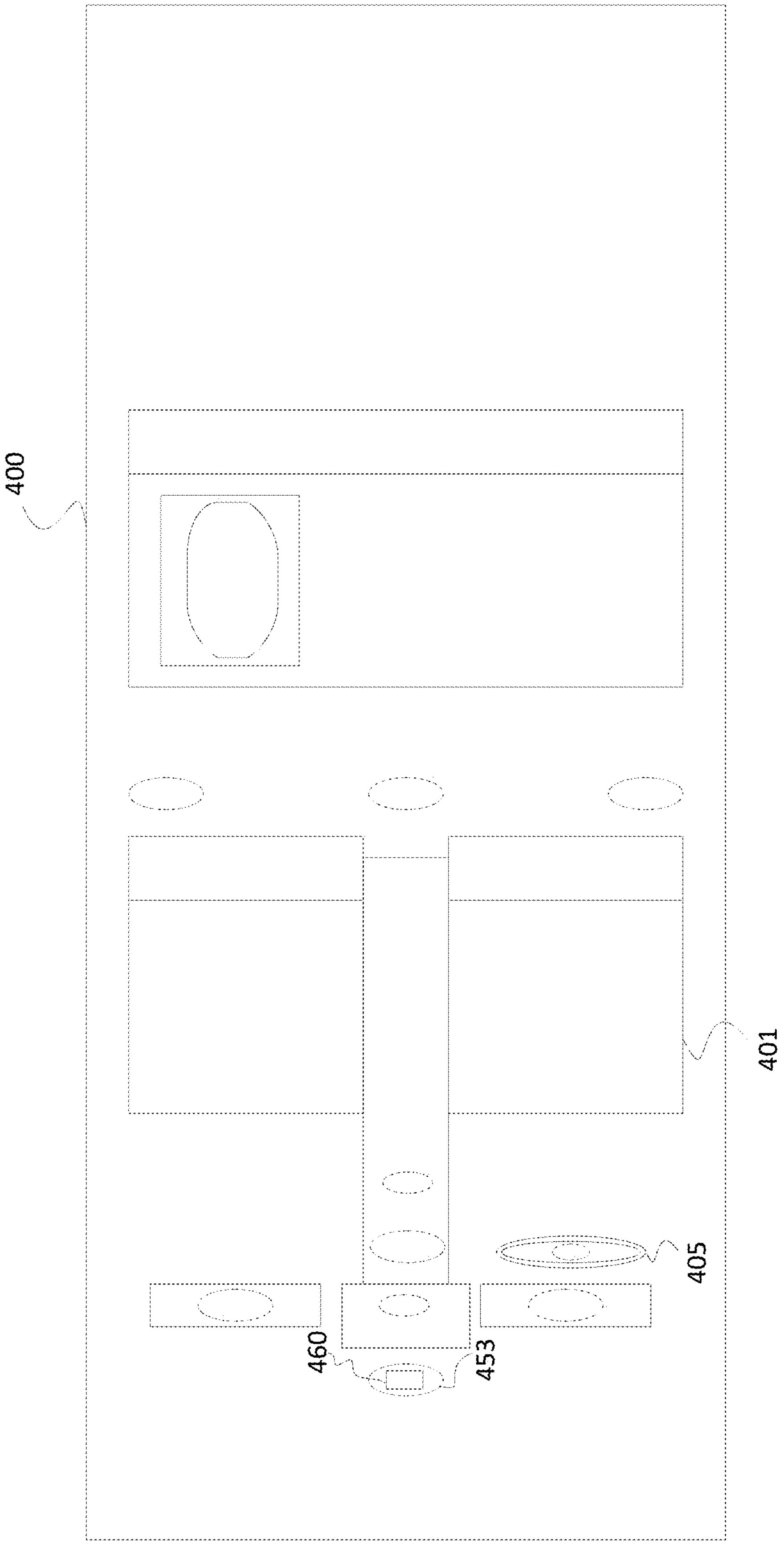
FIG. 4A is a schematic diagram from an overhead view of an automobile in which a neural network may be employed according to some embodiments of the present disclosure.

FIG. 4A is an schematic diagram from an overhead view of an automobile 400 in which a neural network may be employed according to some embodiments of the present disclosure. Automobile 400 may include a driver's seat 401 and a steering wheel 405, which may be provided as described previously and as used in ordinary automobile environments.

Automobile 400 may include a sensor 460 provided at location 453. Location 453 may be a location for a sensor provided on or under a rearview mirror. Therefore, sensor 460 may be provided as a sensor built into the a rearview mirror. Alternatively, sensor 460 may be provided separate from a rearview mirror but affixed to the interior of the automobile 300, near the rearview mirror.

Figure 4B:
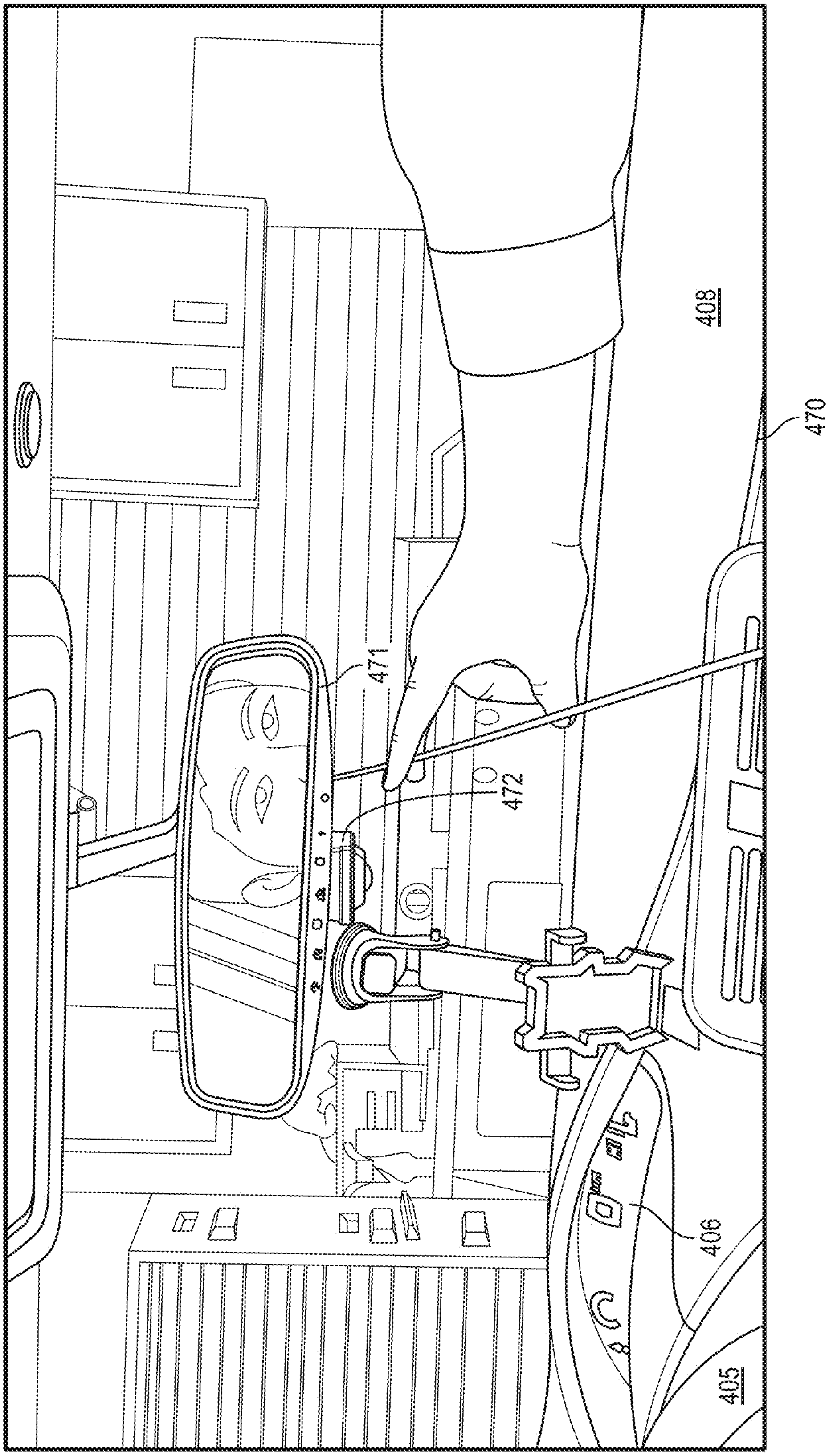
FIGS. 4B and 4C are illustrations of an interior of an automobile showing the location of a sensor according to some embodiments of the present disclosure.
Figure 4C:
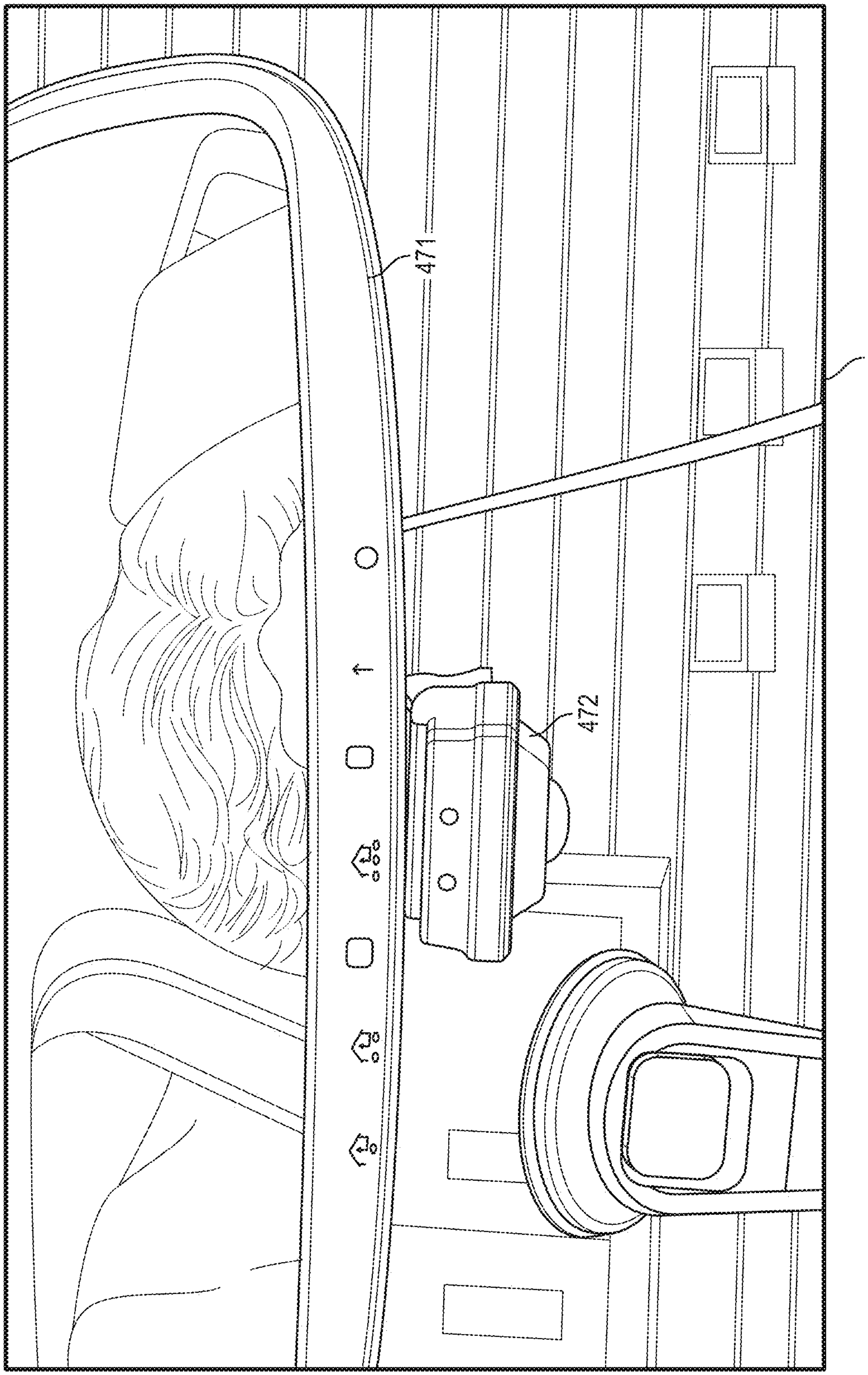

FIGS. 4B and 4C are illustrations of an interior 470 of an automobile showing the location of a sensor according to some embodiments of the present disclosure. FIG. 4B shows the interior 470 of an automobile such as that described for automobile 400. In particular, the interior 470 includes a steering wheel 405, an instrument cluster 406, and a dashboard 408. The interior 470 further includes a rearview mirror 471 and a sensor 472. The sensor 472 may be provided as described with respect to the sensor 460. FIG. 4C shows the interior 470 in further detail, including the rearview mirror 471 and the sensor 472. In the illustrations of FIGS. 4B and 4C, the sensor 472 may be affixed to the inside of the windshield so that the sensor 472 is located just below the rearview mirror 471. The sensor 472 may be video camera directed at the driver's seat.

Referring back to FIG. 4A, use of sensor 460 at location 453 may be advantageous for embodiments that involve detecting some state of a person present or absent in driver's seat 401. Location 453 may be advantageous for such embodiments because sensor 460 mounted at location 453 and aimed downward toward the driver's seat 401 may be capable of sensing the position of substantially all of the driver's body from the knees to the head and including the arms and hands. By sensing the position of the driver's body or alternatively the presence/absence of a driver, a neural network using the sensor data as input may be able to categorize the state of the driver into one or more of various categories, such as: distracted, not distracted, safe, unsafe, both hands on the steering wheel, one hand on the steering wheel, no hands on the steering wheel, looking forward, not looking forward, mobile device in hand, texting on a mobile device, talking on a mobile device, present, and absent. Other categorizations of the driver's state may be possible using a neural network and sensor 460.

FIGS. 5A, 5B, 5C, 5D, and 5E are example images of a driver of an automobile as captured by a sensor in an automobile according to some embodiments of the present disclosure.

Figure 5B:
FIGS. 5A, 5B, 5C, 5D, and 5E are example images of a driver of an automobile as captured by a sensor in an automobile according to some embodiments of the present disclosure.
Figure 5C:
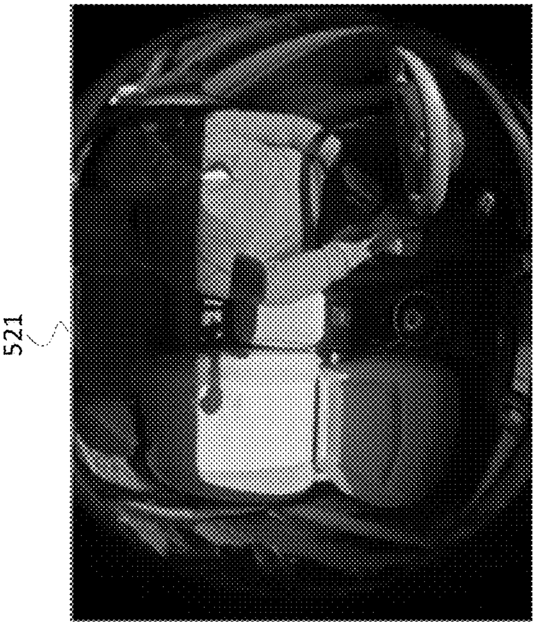
Figure 5A:

Image 501 of FIG. 5A, image 511 of FIG. 5B, and image 521 of FIG. 5C may be captured by a sensor (e.g., sensors 460, 472) provided built into or affixed adjacent to a rearview mirror (e.g., rearview mirror 471). Image 501 demonstrates that a sensor provided near the rearview mirror may capture the state of a person in the driver's seat (e.g., distracted, unsafe, texting, one hand on the steering wheel, not looking forward) as well as the state of a person in the passenger's seat (e.g., present). Image 511 demonstrates that a sensor provided near the rearview mirror may capture the state of a person in the driver's seat (e.g., distracted, unsafe, no hands on the steering wheel, not looking forward) as well as the state of a person in the passenger's seat (e.g., not present). Image 521 demonstrates that a sensor provided near the rearview mirror may capture the state of a person in the driver's seat (e.g., not distracted, unsafe, no hands on the steering wheel, looking forward, seatbelt buckled, seatbelt not buckled) as well as the state of a person in the passenger's seat (e.g., not present, seatbelt buckled, seatbelt not buckled).

Figure 5D:
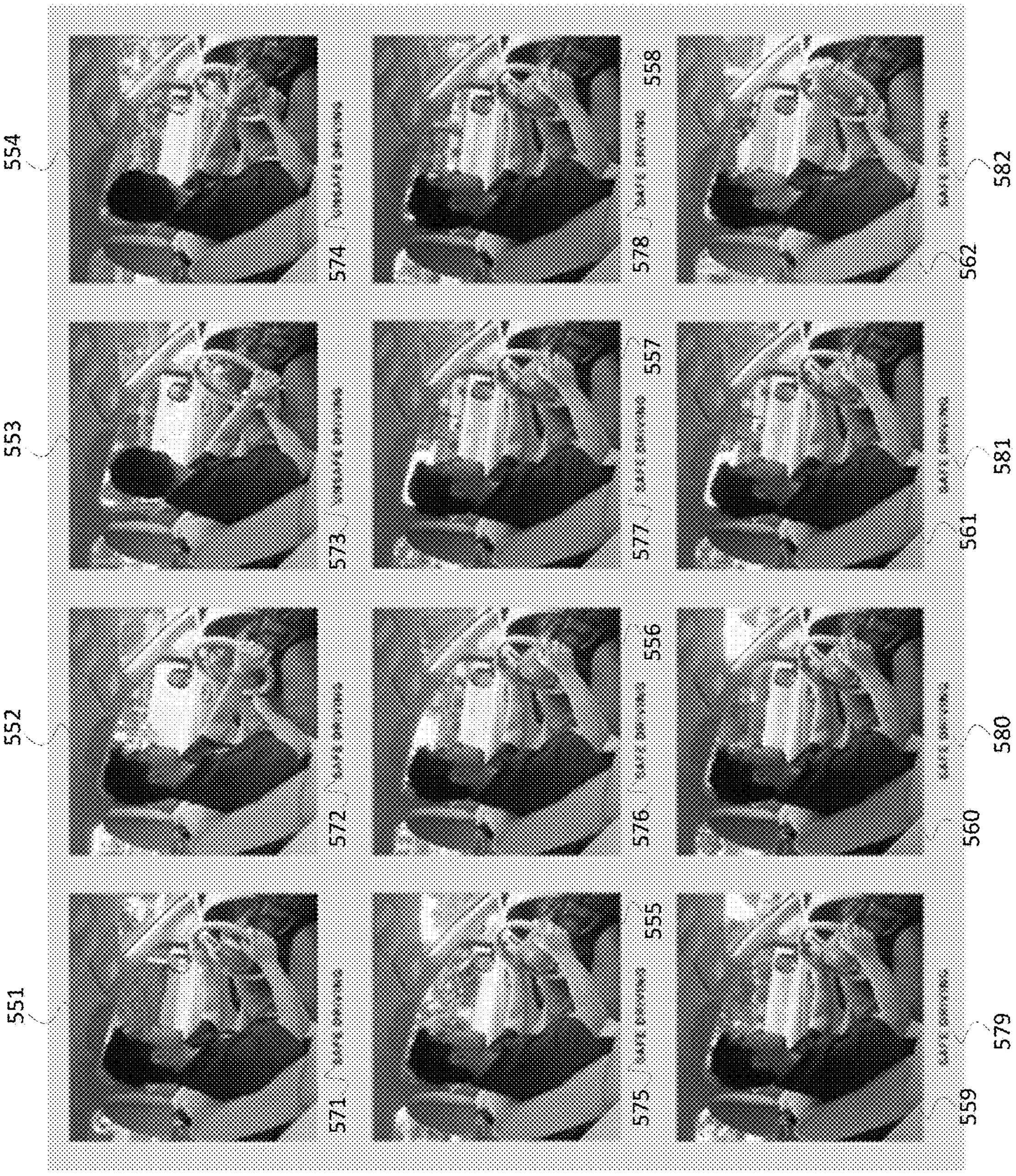

Images 551, 552, 553, 554, 555, 556, 557, 558, 559, 560, 561, and 562 of FIG. 5D may be captured by a sensor provided in or near a passenger seat (e.g., passenger seat 302). Each of the images of FIG. 5D may be labeled with a category based on the state of the driver. For instance, because the driver in images 551, 552, 555, 556, 557, 558, 559, 560, 561, and 562 is looking forward and has two hands on the steering wheel, each of those images may be categorized as "safe driving," as indicated with labels 571, 572, 575, 576, 577, 578, 579, 580, 581, and 582. But, because the driver in images 573 and 574 is not looking forward, each of those images may be categorized as "unsafe driving," as indicated with labels 573 and 574.

Figure 5E:
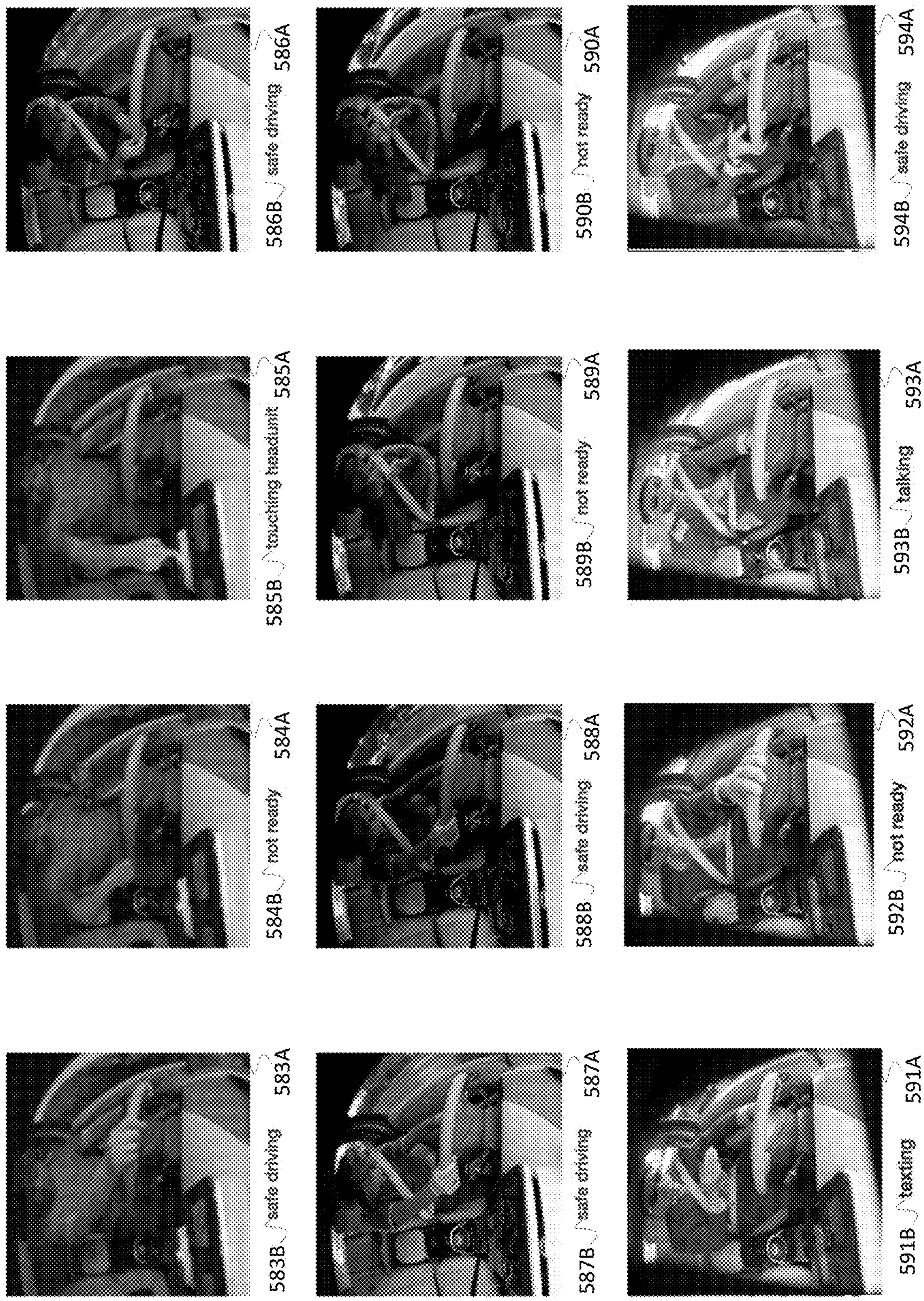

Images 583A, 584A, 585A, 586A, 587A, 588A, 589A, 590A, 591A, 592A, 593A, and 594A of FIG. 5E may be captured by a sensor provided near the rearview mirror. Each of the images of FIG. 5E may be labeled with a category based on the state of the driver, as illustrated by labels 583B, 584B, 585B, 586B, 587B, 588B, 589B, 590B, 591B, 592B, 593B, and 594B, respectively.

Figure 6A:
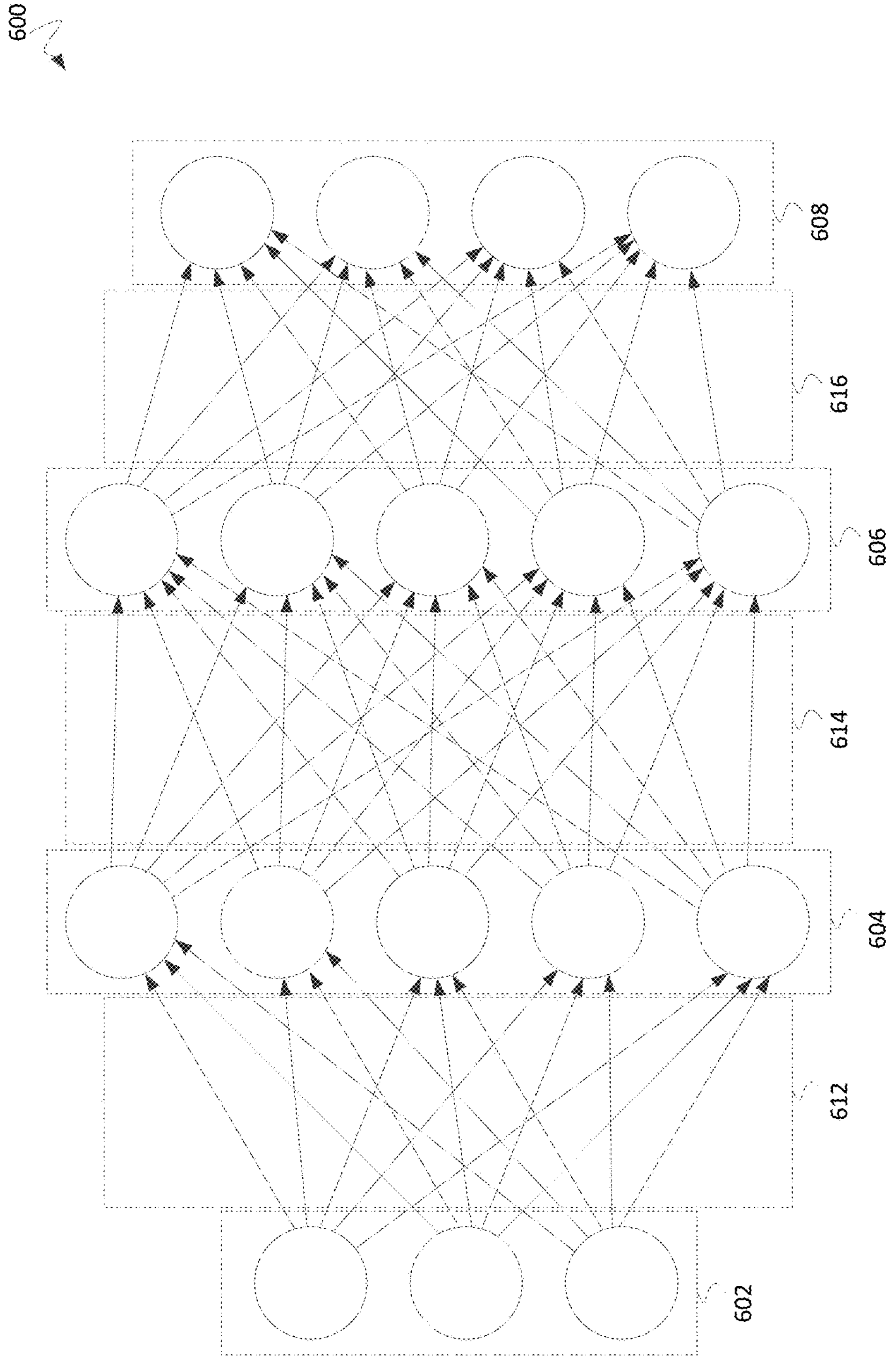
FIGS. 6A, 6B, and 6C are diagrams of exemplary neural network structures according to some embodiments of the present disclosure.

FIG. 6A is a diagram of an exemplary neural network structure 600 according to some embodiments of the present disclosure. Neural network structure 600 includes layers 602, 604, 606, and 608. Neural network structure 600 includes connections 612, 614, and 616.

Neural network structure 600 receives input values at input layer 602. Neural network structure 600 then propagates those values through connections 612 to layer 604. Each of the connections of connections 612 may include a numerical weighting value (e.g., a value between −1 and 1) that is used to modify the original value (e.g., propagated value=original value*weight). The nodes of layer 604 receive these propagated values as input. Each node of layer 604 may include a function that combine the received input values (e.g., summing all received inputs). Each node of nodes 604 may further contain one or more activation functions that determines when a value will be output on a connection of connections 614 (e.g., output+1 if the combined value of the inputs is >0 and output−1 if the combined value of the inputs is <0, and output 0 if the combined value of the inputs is =0). The output values of the nodes of layer 604 may then be propagated by connections 614. Each connection of connections 614 may have a weight value as described with respect to connections 612. The nodes of layer 606 may combine the received input values and use one or more activation functions as described with respect to the nodes of layer 604. The output values of the nodes of layer 606 may then be propagated by connections 616. Each connection of connections 616 may have a weight value as described with respect to connections 612. The nodes of output layer 608 may combine the received input values from the connections 616. Each node of output layer 608 may correspond to a predefined category for the input values. The combined input values for each node of the output layer 608 may determine a category determined for the input (e.g., the category for the output node that has the largest combined input values). In this way, neural network structure 600 may be used to determine a category for some input.

The neural network structure 600 may be configured to accurately determine a category for some input through a process called training. For training, numerous inputs are labeled with their correct categories by a user or some other actor. The weights for connections 612, 614, and 616 may be provided with default and/or random values to start. The inputs are then provided to the neural network structure 600 through input layer 602, and the determined categories for the inputs (e.g., based on highest combined input values at the nodes of output layer 608) are observed and compared to the correct categories as previously labeled. The weights for connections 612, 614, and 616 are then repeatedly modified until the neural network structure 600 correctly determines the correct categories for all of the inputs, or at least for an acceptable portion of all of the inputs.

When a new input is received without a correct category previously determined, that input can be provided to the neural network structure 600 to determine the most likely category for that input.

Figure 6B:
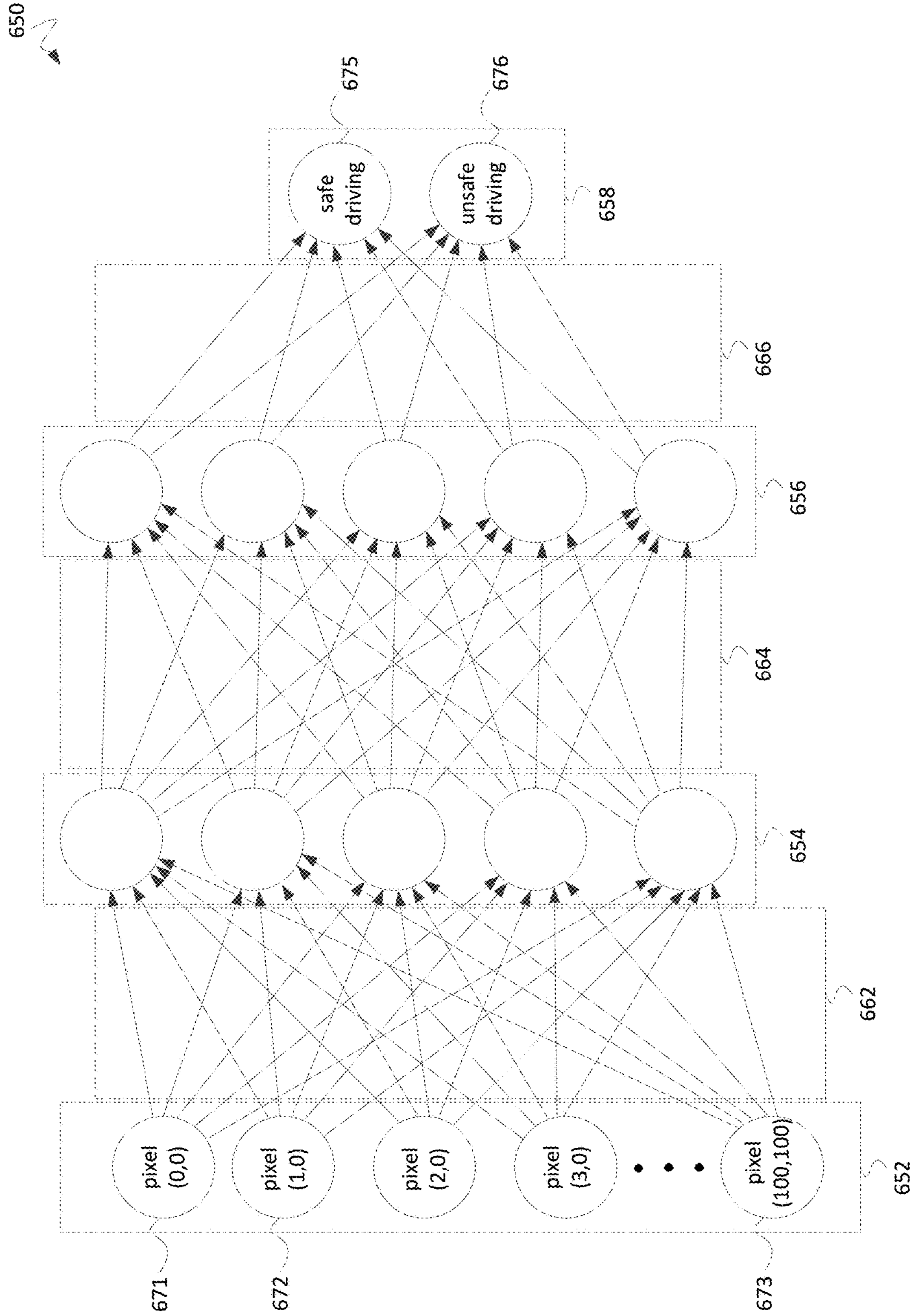

FIG. 6B is a diagram of an exemplary neural network structure 650 according to some embodiments of the present disclosure. In some embodiments, neural network structure 650 may be used to categorize the state of a driver of an automobile as "safe" or "unsafe" based on an image of the driver. Neural network structure 650 includes layers 652, 654, 656, and 658, which may be provided as described with respect to layers 602, 604, 606, and 608, respectively. Neural network structure 650 includes connections 662, 664, and 666, which may be provided as described with respect to connections 612, 614, and 616, respectively.

The input to neural network structure 650 may be an image of the driver of the automobile. The image of the driver (e.g., images 501, 511, 521) may be captured using a sensor (e.g., sensors 460, 472) located near a rearview mirror (e.g., rearview mirror 471) of the automobile. The image of the driver may be converted from its raw captured format (e.g., 8-megapixel color phot) to a compressed format (e.g., 100 pixel×100 pixel grayscale image). A numerical value for each pixel (e.g., integer grayscale value between 0 ("black") and 255 ("white")) may be inputted to a separate node of the input layer 652. For example, input node 671 may receive the numerical pixel value for the pixel in the topmost and leftmost pixel. Input node 672 may receive the numerical pixel value for the pixel in the topmost and second-to-leftmost pixel. The numerical pixel values may be assigned to input nodes of layer 652 continuing in this left-to-right fashion across the topmost row of pixels, then continuing with the subsequent rows, until the numerical pixel value for the bottommost and rightmost pixel is assigned to input node 673.

The output nodes of layer 658 of the neural network structure 650 may include output node 675 and output node 676. Output node 675 may correspond to a "safe driving" category, while output node 676 may correspond to an "unsafe driving" category.

In order to train the neural network structure 650, driver images captured by an in-automobile sensor may be captured (e.g., as shown in FIGS. 5A, 5B, and 5C), compressed (e.g., as described previously), and labeled (e.g., as shown in FIG. 5D). The weights for each of the connections of connections 662, 664, and 666 may be randomly set to a value between −1 and +1. Each node of layers 654 and 656 may be configured to use a combination function (e.g., summation) and an activation function (e.g., sign of the combined input values) as described previously or otherwise known in the art. The compressed driver images may then be input to the neural network structure 650 (e.g., using the pixel numerical values as inputs to the input layer 652). The input values may be propagated through the neural network structure 650 as described with respect to the neural network structure 600. The category for each input image may be determined as "safe driving" if output node 675 has a combined input values greater than the combined input values of output node 676. The category for each input image may be determined as "unsafe driving" if output node 675 has a combined input values less than or equal to the combined input values of output node 676. These determined categories can be compared to the correct categories labeled previously. Using any optimization algorithm known in the art, the weights of the connections 662, 664, and 666 can be repeatedly modified until the neural network structure 650 accurately determines the categories for all or at least an acceptable portion of the input images.

The neural network structure 650, thus trained, may then be used to determine the state of the driver (i.e., "safe driving" or "unsafe driving") at points in the future. This may be accomplished by providing the neural network structure 650 at a computing device in the automobile. Then, when the sensor (e.g., sensors 460, 472) located near a rearview mirror (e.g., rearview mirror 471) of the automobile captures an image of the driver, that image can be compressed and input into the trained neural network structure 650. The category determined by the trained neural network structure 650 (i.e., "safe driving" or "unsafe driving") can then be used as the most likely state of the driver at the moment the driver image was captured.

The foregoing disclosure of neural network structures 600 and 650 was intended to be exemplary, and neural network structures may be provided in different forms in various embodiments. For example, while neural network structures 600 and 650 include four layers of nodes, more or fewer layers of nodes may be used in some embodiments. As another example, more output nodes in the output layer may be used in some embodiments (e.g., four nodes representing "safe driving," "texting," "touching headunit," and "talking." As another example, while neural network structures 600 and 650 include connections from every node in one layer to every node in the next layer ("fully connected"), fewer connections may be used in some embodiments. As another example, the number of nodes per layer (e.g., more or less than five nodes in layer 654) may be different in some embodiments. As another example, while neural network structures 600 and 650 were described as using weight values for each connection and combination and activation functions for each node, other configurations including more or fewer elements for the neural network structure may be used in some embodiments. As another example, compression of the image captured by the in-automobile sensor may not be used in some embodiments. As another example, conversion to grayscale of the image captured by the in-automobile sensor may not be used in some embodiments. Other modifications of neural network structures 600 and 650 in accordance with the present disclosure are possible in various embodiments.

Figure 6C:
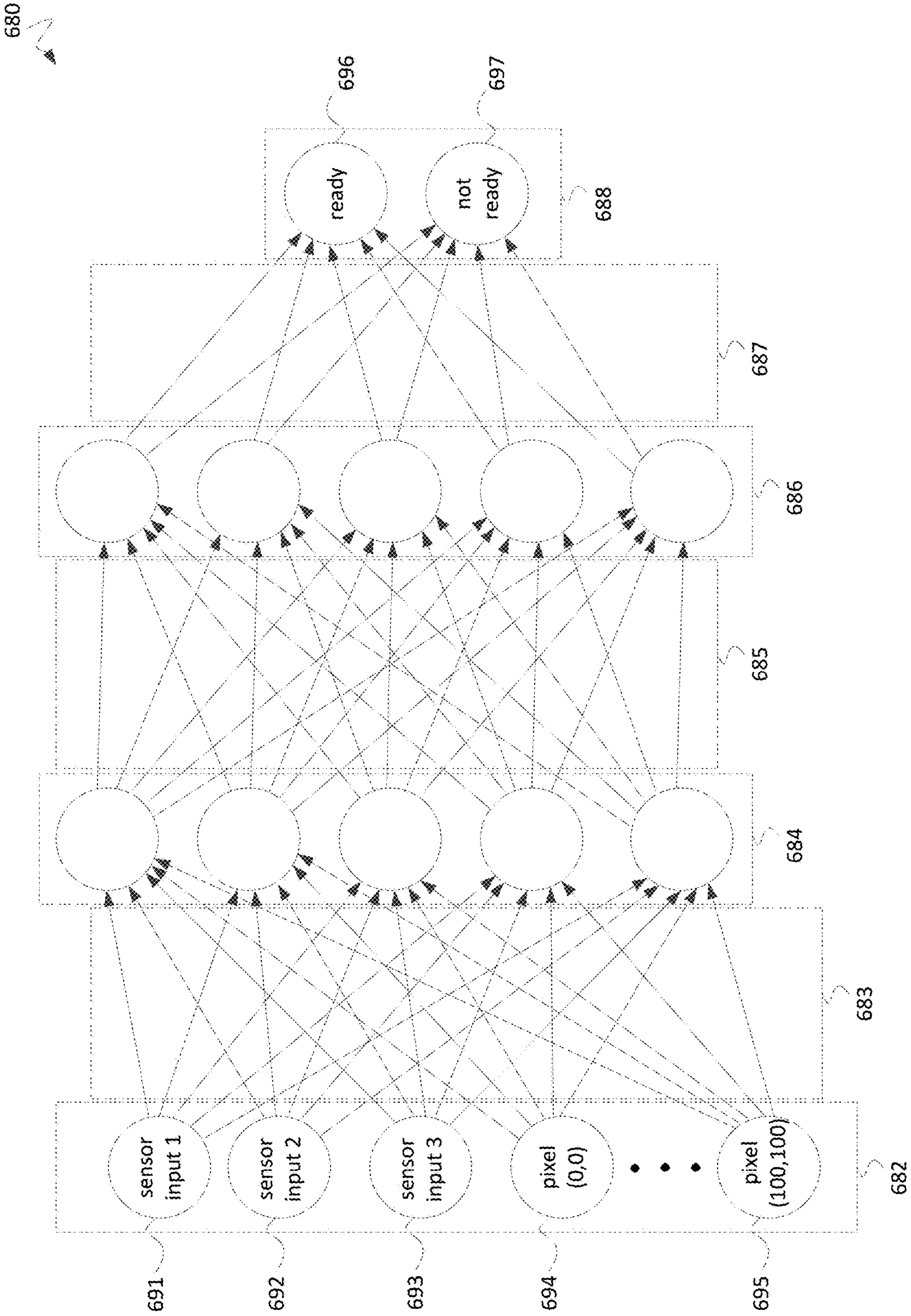

FIG. 6C is a diagram of an exemplary neural network structure 680 according to some embodiments of the present disclosure. In some embodiments, neural network structure 680 may be used to categorize the state of a driver of an automobile as "safe" or "unsafe" based on an image of the driver. Neural network structure 680 includes layers 682, 684, 686, and 688, which may be provided as described with respect to layers 652, 654, 656, and 658, respectively. Neural network structure 680 includes connections 681, 683, and 685, which may be provided as described with respect to connections 662, 664, and 666, respectively.

The input to neural network structure 680 may be an image of the driver of the automobile in addition to other sensor data. The image of the driver may be provided as input to the neural network structure 680 using input node 694, input node 695, and other input nodes of input layer 682, as described for neural network structure 650 and input layer 652 of FIG. 6B. Additional data may be provided to input nodes 691, 692, and 693. For example, a steering wheel angle value (e.g., degrees of angular displacement from "wheels-forward" steering wheel position) may be input into input node 691. An automobile velocity value (e.g., velocity of the automobile along a roadway) may be input into input node 692. A user biometric value (e.g., heartrate of the driver) may be input into input node 693. Other image and non-image sensor inputs may be used in various embodiments.

The output nodes of layer 688 of the neural network structure 680 may include output node 696 and output node 697. Output node 696 may correspond to a "ready" category (e.g., the driver is ready to receive control of the automobile as part of a transition from a self-driving mode to an manual driving mode), while output node 697 may correspond to an "not ready" category (e.g., the driver is not ready to receive control of the automobile as part of a transition from a self-driving mode to an manual driving mode).

The neural network structure 680 may be trained as described with respect to neural network structure 650. With neural network structure 680, though, a label applied to input data may be applied to a tuple of input data: <image, sensor data 1, sensor data 2, sensor data 3>. That is, a label provided for the input data may not be specific to just an image provided as input. Rather, the label may be provided as applicable to the entire situation in the automobile as described by the image, the sensor data 1, the sensor data 2, and the sensor data 3. In some embodiments, the image, sensor data 1, and sensor data 2, and sensor data 3 may all be captured in the same automobile at approximately the same time. As an example, while an image input for a time t1 may show the driver to have both hands on the wheel and facing forward, if the steering wheel angle value is 180 degrees at time t1, then the tuple for time t1 may be labeled "not ready," reflecting the fact that the automobile is in a sharp turn and thus the driver may not be ready to receive control of the automobile. With this clarification, the neural network structure 680 may be trained using the techniques described with respect to neural network structure 600 and/or 650.

The neural network structure 680, thus trained, may then be used to determine the state of the driver (i.e., "ready" or "not ready") at points in the future. This may be accomplished by providing the neural network structure 680 at a computing device in the automobile. Then, when the sensor (e.g., sensors 460, 472) located near a rearview mirror (e.g., rearview mirror 471) of the automobile captures an image of the driver, that image and sensor data captured by other sensors can be input into the trained neural network structure 680. The category determined by the trained neural network structure 680 (i.e., "ready" or "not ready") can then be used as the most likely state of the driver at the moment the driver image was captured.

Figure 7A:
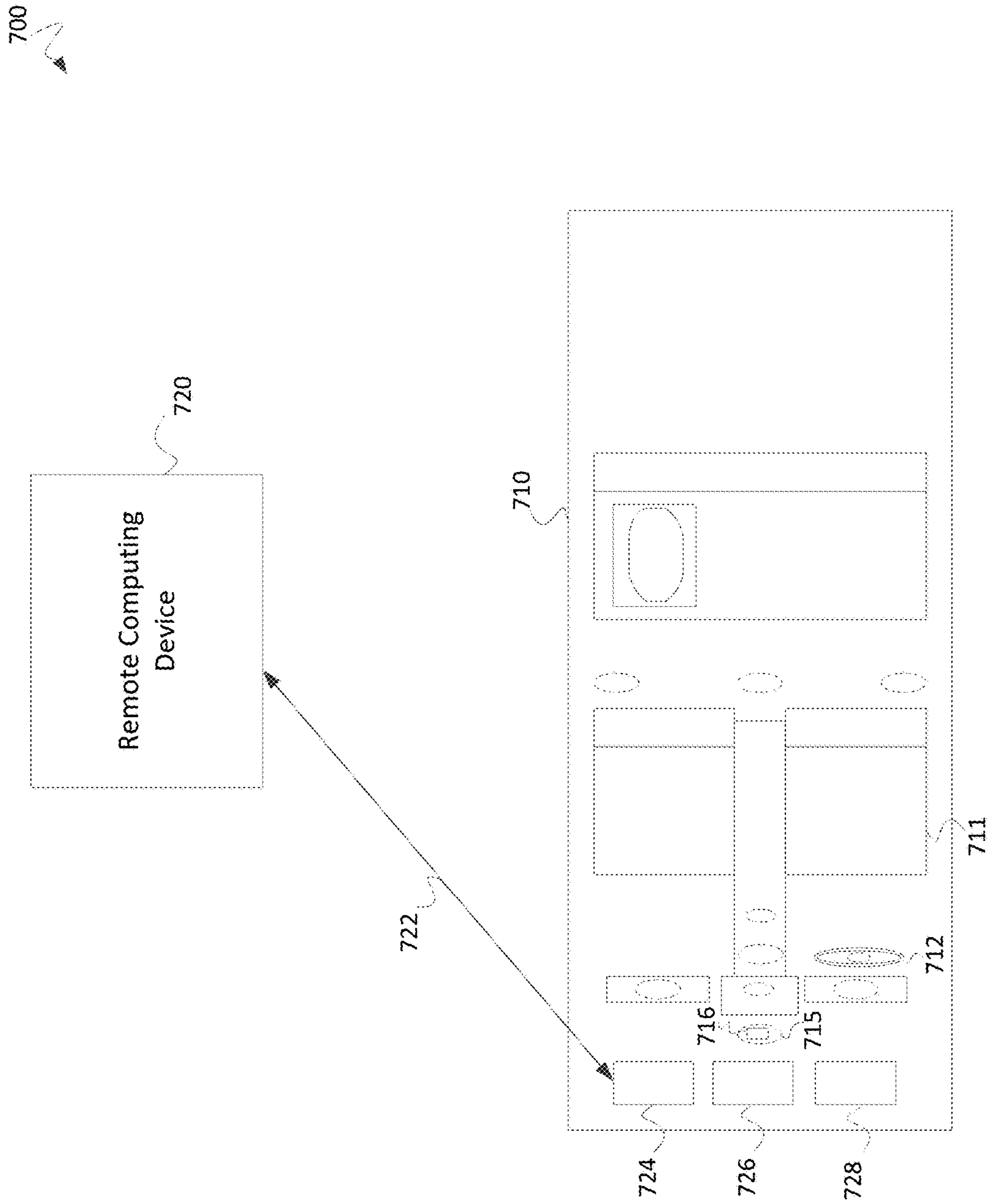
FIG. 7A is a system diagram of a system employing a neural network in an automotive environment according to some embodiments of the present disclosure.

FIG. 7A is a system diagram of a system 700 employing a neural network in an automotive environment according to some embodiments of the present disclosure. The system 700 includes an automobile 710, a sensor 716, a remote computing device 720, a communication link 722, a local transceiver 724, a local computing device 726, and an automobile controller 728.

The automobile 710 may be an automobile as described previously with respect to automobiles 110, 300, and/or 400. The automobile 710 may be operated by a driver seated in driver's seat 711. The driver may operate the automobile 710 using the steering wheel 712 and other control devices. In some embodiments, the automobile 710 may be configured to operate in a self-driving or autopilot mode. For example, the automobile may be configured to cause the automobile 710 to accelerate or decelerate automatically and without control by the driver (e.g., based on detection of surrounding hazards). As another example, the automobile may be configured to steer the automobile 710 (e.g., based on detecting lane lines on a road on which the automobile 710 is travelling). The operation of the self-driving or autopilot mode may be controlled by the automobile controller 728. The automobile controller 728 may be configured to control one or more elements in the automobile 710 in order to control aspects of the operation of the automobile 710. For example, the automobile controller 728 may be configured to control: a throttle body, a carburetor, a brake, a transmission, a steering mechanism, an electronic control module, or other elements.

The sensor 716 may be provided in whole or in part as described previously with respect to sensors 232, 234, 460, and/or 472. The sensor 716 may be provided at a location 715, such as in a location built into or in the vicinity of a rearview mirror.

In some embodiments, system 700 may employ a neural network in the following way.

Sensor 716 may sense the position of the driver seated in driver's seat 711. Sensor 716 may produce sensor data based on this sensing. For example, if sensor 716 is a video camera, the sensor data may be an image of the interior of the automobile 710, including the driver, if present.

The sensor 716 may transmit the image of the interior of the automobile 710 to transceiver 724. This transmission may be performed using a shared communications bus, using a dedicated physical cable, using a short-range wireless link, or in some other way.

The transceiver 724 may transmit the image of the interior of the automobile 710 to the remote computing device 720 using the communication link 722. In some embodiments, the communication link 722 may be a dedicated long-range wireless communication link. In some embodiments, the communication link 722 may be a long-range wireless communication link shared with an emergency and navigation service. In some embodiments, the communication link 722 may be a wired communication link. In some embodiments, the communication link 722 may be a continuously active communication link. In some embodiments, the communication link 722 may be an intermittent communication link.

The remote computing device may save the received image of the interior of the automobile 710 for later processing. In some embodiments, the remote computing device 720 may transform the image of the interior of the automobile 710 (e.g., compressing the image, transforming the image to grayscale, enhancing brightness, enhancing contrast). In some embodiments, the sensor 716, the transceiver 724, or some other computing device located in the automobile 710 (e.g., local computing device 726) may transform the image of the interior of the automobile 710 (e.g., compressing the image, transforming the image to grayscale, enhancing brightness, enhancing contrast) prior to transmitting the image of the interior of the automobile 710 to the remote computing device 720.

The sensor 716, the transceiver 724, and the remote computing device 720 may repeat this process of image capture, transmission, and storage numerous times until a large quantity of images are stored by the remote computing device 720. In some embodiments, the large quantity of images may be 100 images. In some embodiments, the large quantity of images may be 1,000 images. In some embodiments, the large quantity of images may be 10,000 images. In some embodiments, the large quantity of images may be 100,000 images.

One or more users may label the images based on predefined categories (e.g., "safe driving" and "unsafe" driving). The remote computing device 720 may store these category labels with the images to which they pertain. In some embodiments, a user located in the automobile 710 (e.g., the driver, a passenger) may perform the labelling prior to transmitting the corresponding image to the remote computing device 720. The one or more users may label the images while the remote computing device 720 is still waiting to finish storage a large quantity of images, after completing storage of a large quantity of images, or at some other time. In some embodiments, the one or more users may label the images using a user interface (not pictured) communicatively coupled to the remote computing device 720 (e.g., the user interface of a laptop with the laptop communicating with the remote computing device 720).

Once a large quantity of images and associated category labels are stored by the remote computing device 720, the remote computing device 720 may train a neural network structure (e.g., neural network structures 600, 650) based on the images and corresponding labels. For example, if the images are images of the interior of the vehicle 710 including the position of the driver's upper legs, torso, arms, hands, and head, and the category labels are each selected from "safe driving" and "unsafe driving," the remote computing device 720 may train a neural network structure to accurately categorize the state of the driver as "safe driving" or "unsafe driving" based on the driver's body position.

Once the remote computing device 720 trains the neural network structure, the remote computing device 720 may transmit parameters defining the neural network structure (also referred to herein as "neural network configuration parameters") (e.g., specification of nodes, specification of combination functions for nodes, specification of activation functions for nodes, specification of connections, and/or specification of weights for connections) to the local transceiver 724 using the communication link 722. In some embodiments, the remote computing device 720 may transmit the parameters defining the neural network structure to the local transceiver 724 using a communication link other than communication link 722.

The local transceiver 724 may transmit the parameters defining the neural network structure to the local computing device 726. The local computing device 726 may be configured to receive the parameters defining the neural network structure from the local transceiver. The local computing device 726 may also be configured to receive an image of the interior of the automobile 710 from the sensor 716. This reception from the local transceiver 724 and the sensor 716 may be performed using any of a variety of communication mediums, such as those described previously for communication between the sensor 716 and the local transceiver 724.

The local computing device 726 may be configured to create the fully-trained neural network structure (e.g., recreate the structure in local memory) based on the parameters defining the neural network structure. Once the local computing device 726 receives the parameters defining the neural network structure, the local computing device 726 may provide an image of the interior of the automobile 710 as input to the neural network structure in real-time. The local computing device 726 may thereby determine a category for the an image of the interior of the automobile 710 (e.g., "safe driving" or "unsafe driving") which indicates the most likely state of the driver of the automobile 710 when the image was captured. If the images of the interior of the automobile 710 is provided to the local computing device 726 in substantially real-time, then the local computing device 726 may be able to determine whether the driver is in an unsafe driving state or a safe driving state at substantially the present time.

The local computing device 726 may transmit the determined state of the driver (e.g., "safe driving" or "unsafe driving") to the automobile controller 728. This transmission to the automobile controller 728 may be performed using any of a variety of communication mediums, such as those described previously for communication between the sensor 716 and the local transceiver 724.

The automobile controller 728 may be configured to control whether the automobile 710 automatically transitions from a self-driving or autopilot mode to a manual mode based on the state of the driver determination received from the local computing device 726. For example, the automobile controller 728 may be configured to operate in a self-driving or autopilot mode while on an interstate. But, the automobile controller 728 may be configured to transition to a manual mode (e.g., with full control of the vehicle by the driver) when the automobile 710 exits the interstate. However, the automobile controller 728 may determine to restrict transition from a self-driving or autopilot mode to a manual mode even if the automobile 710 is exiting an interstate, if the local computing device 726 determines that the driver is presently in an "unsafe driving" state.

The automobile controller 728 may be configured to control whether the automobile 710 automatically transitions from a manual mode to a self-driving or autopilot mode based on the state of the driver determination received from the local computing device 726. For example, the automobile controller 728 may be configured to automatically transition to self-driving or autopilot mode that includes a self-steering operation if the automobile 710 is on an interstate and the local computing device 726 determines that the driver is presently in an "unsafe driving" state.

In some embodiments of the present disclosure, different categories than those just described for system 700 may be used to categorize a state of the driver. For example, the system 700 may include a neural network structure trained to determine a driver state as one of the following: "safe driving," "texting," "talking," and "headunit." In such embodiments, the images used by the remote computing device 720 to train the neural network structure may be labeled with these categories so that the trained neural network structure may accurately determine the driver's state from these categories. In such embodiments, the automobile controller 728 may be configured to restrict a transition from a self-driving mode to a manual mode for only some of the driver states (e.g., for "texting" and "talking" but not "safe driving" and "headunit").

Other categories of driver state are possible in various embodiments of the present disclosure. For example, the system 700 may include a neural network structure trained to determine a driver state as one of the following: "looking forward," "looking down," "looking at mobile device," "looking at front passenger seat," "looking at rear passenger seat," "looking in rearview mirror," "looking in left side-view mirror," "looking in right side-view mirror," "looking at left blindspot," and "looking at right blindspot." Other categories of driver state may be used in accordance with various embodiments of the present disclosure.

In some embodiments of the present disclosure, the images used by the remote computing device 720 to train the neural network structure may be captured in one or more first automobiles, while the trained neural network structure may be used by a local computing device 726 in a second, different automobile 710. For example, the images captured for training of the neural network structure may be captured during a setup period (e.g., by sensors deployed in tens or even hundreds of automobiles, prior to installation of a local computing device capable of using a neural network structure in an automobile). These images captured during the setup period may be captured so as to cover a wide range of drivers (e.g., tall people, short people, thin people, thick people, men, women). This may allow the remote computing device 720 to train a neural network structure that can accurately determine a driver's state regardless of the type of driver. That is, the remote computing device 720 may be capable of training a generic neural network structure for use with many different drivers. A generic neural network structure so trained may then be provided pre-installed on the local computing device 726 when the local computing device 726 is first installed in the automobile 710 and/or when the automobile 710 is first sold to an end user. Other approaches to training and then implementing the neural network structure in an automotive environment may be used in accordance with various embodiments of the present disclosure.

In some embodiments of the present disclosure, the remote computing device 720 may train more than one neural network structure to categorize a driver state. For example, a first set of driver images may be captured of numerous drivers (e.g., a sensor 716 installed in each of ten cars). A second set of driver images may be captured of numerous other drivers (e.g., a sensor 716 installed in each of ten other cars). The first set of driver images and the second set of driver images may be labeled (e.g., as "safe driving" and "unsafe driving"). The remote computing device 720 may train a first neural network structure using the first set of driver images and second neural network structure using the second set of driver images. The remote computing device 720 may then transmit the first neural network structure, the second neural network structure, or both to the local transceiver 724. The local computing device may then use either or both of the neural network structures in real-time to determine a state of the driver.

The aforementioned training of multiple neural network structures to perform the same categorization may be advantageous in a number of situations. For example, the first set of driver images may be captured of drivers sharing similar first physical appearances (e.g., tall people with short hair), while the second set of driver images may be captured of drivers sharing similar second physical appearances different from those of the first set of drivers (e.g., short people with long hair). Because the neural network structures are trained on images in some embodiments, these differences in physical appearances can affect the accuracy of the neural network structures' categorization. Therefore, the first neural network structure may be highly accurate for the first physical appearances but less so for the second physical appearances (e.g., highly accurate at categorizing as "safe driving" or "unsafe driving" a tall driver with short hair, but not so for a short driver with long hair), and vice versa for the second neural network structure. In such embodiments, the remote computing device 720 may only transmit and/or the local transceiver 724 may only receive the neural network structure that is best suited for the driver of the automobile 710 (e.g., if the driver of the automobile 710 is a tall person with short hair, then only transmit/receive the first neural network structure). Alternatively, the remote computing device 720 may transmit both neural network structures to the automobile 710, and the two neural network structures may be evaluated in the automobile 710 and with its driver in order to determine which is more accurate (e.g., which more frequently determines the correct category, or which determines the correct category with a higher confidence level). In other embodiments, more than two neural network structures may be trained to perform the same categorization.

In some embodiments of the present disclosure, the remote computing device 720 may provide the parameters defining the neural network structure to the local transceiver 724 by recording the parameters in a blockchain. For example the remote computing device 720 may record the parameters defining the neural network structure in a local block (i.e., local to the remote computing device 720) of the blockchain. The blockchain may then promulgate the local block to other computing devices. The local transceiver 724 may then read the parameters defining the neural network structure from one of these blocks located on one of the other computing devices. The use of a blockchain to transmit the parameters defining the neural network structure to the local transceiver 724 may be advantageous because it may guarantee the authenticity of those parameters (e.g., guaranteeing that a third-party has not tampered with the parameters for malicious purposes or otherwise).

In some embodiments of the present disclosure, the remote computing device 720 may train the neural network structure using a stereovision approach. For example, the system 700 may use the sensor 716 located at location 715 near the rearview mirror, and a second sensor affixed to the driver-side A-frame of the automobile 710 (e.g., at location 361 of FIG. 3). In such embodiments, both the images captured by the sensor 716 and the images captured by the A-frame sensor may be transmitted to the remote computing device 720. The remote computing device 720 may then combine each image captured by sensor 716 with a corresponding image from the A-frame sensor. This correspondence relationship may be determined as a rearview mirror image and an A-frame image that were both captured at the same time. The combining of the images may include overlaying one of the images over part of the other image (e.g., based on overlapping fields of view captured by the images) so as to form a single image. The remote computing device 720 may then use this combined stereovision image to train the neural network structure. The local computing device 726 may then perform the same image combining so as to provide a combined sterevision image as input to the neural network structure in real-time. This stereovision image approach may be advantageous as capturing a more comprehensive view of the driver. In some embodiments, more than two images may be combined to form the stereovision image. In some embodiments, images from sensors not located at a rearview mirror and/or an A-frame may be combined into a stereovision image. In some embodiments, other computing devices may perform the combining (e.g., the sensor 716). In some embodiments, the combining may be performed using techniques other than the overlaying technique just described (e.g., cropping and adding).

In some embodiments of the present disclosure, the system 700 may perform outlier reporting. For example, when applying a driver image as input to the neural network structure, the local computing device 726 may be unable to determine the state of the driver with a high degree of confidence (e.g., the neural network may report a 48% confidence that the driver is "unsafe driving" and a 52% confidence that the driver is "safe driving"). In such cases, the local computing device 726 may store the images that could not be categorized to a high degree of confidence. In some embodiments, the local computing device 726 may later transmit these outlier images to the remote computing device 720 (e.g., by way of the local transceiver 724). The remote computing device may then associate labels with these outlier images (e.g., based on a user input), combine these outlier images with other images captured by the sensor 716, a train an update neural network structure. The remote computing device 720 may then provide this update neural network structure (e.g., by transmission of parameters defining the neural network structure) to the local computing device 726 (e.g., by way of the local transceiver 724) for use. Such an outlier reporting and updating approach may be advantageous as allowing the system 700 to update the neural network structure over time in order to improve the accuracy of its ability to categorize the driver's state.

Figure 7B:
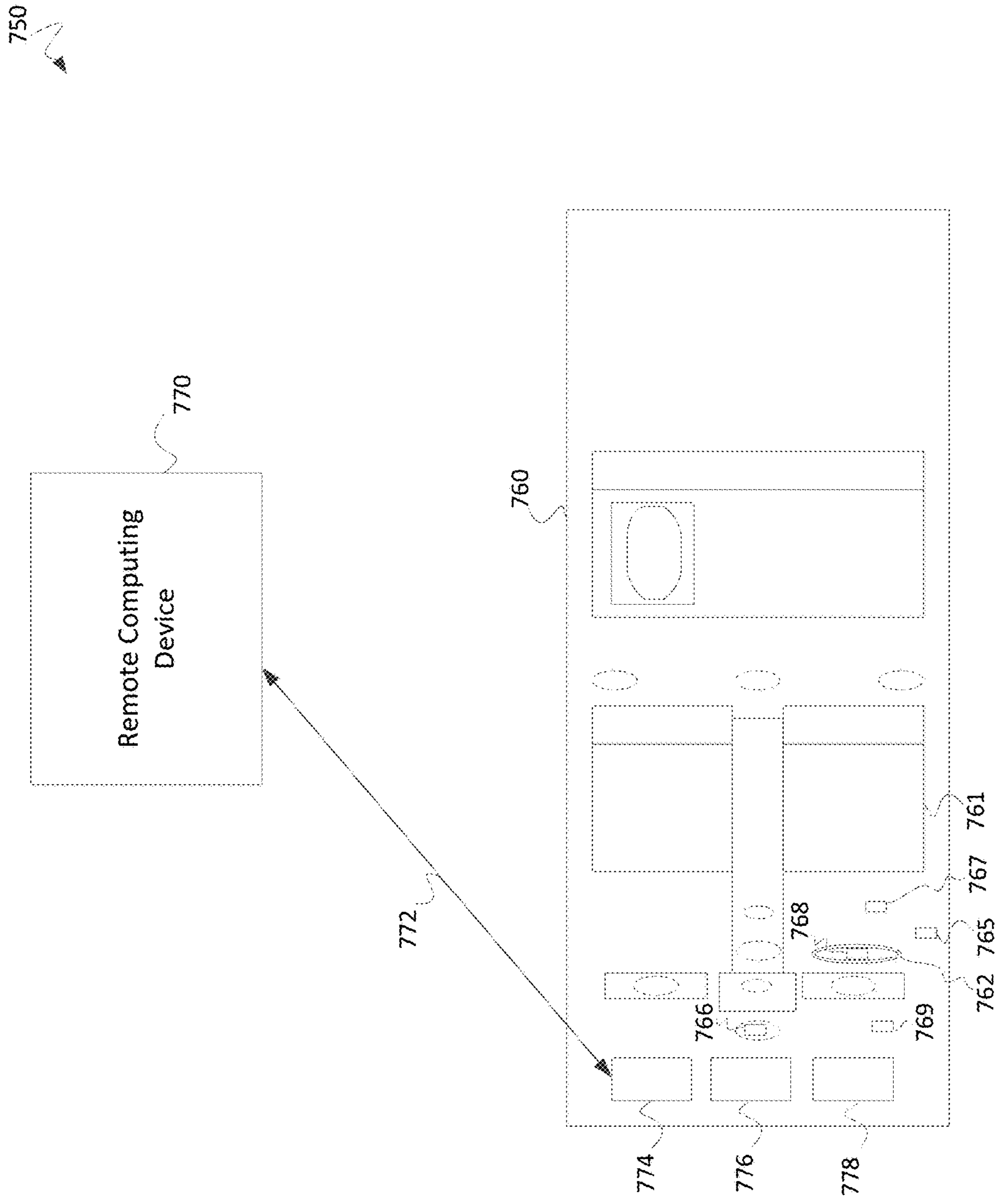
FIG. 7B is a system diagram of a system employing a neural network in an automotive environment according to some embodiments of the present disclosure.

FIG. 7B is a system diagram of a system 750 employing a neural network in an automotive environment according to some embodiments of the present disclosure. The system 750 includes an automobile 760, a sensor 765, a sensor 766, a sensor 767, a sensor 768, a sensor 769, a remote computing device 770, a communication link 772, a local transceiver 774, a local computing device 776, and an automobile controller 778.

The automobile 760 may be an automobile as described previously with respect to automobiles 110, 300, and/or 400. The automobile 760 may be operated by a driver seated in driver's seat 761. The driver may operate the automobile 760 using the steering wheel 762 and other control devices. In some embodiments, the automobile 760 may be configured to operate in a self-driving or autopilot mode. For example, the automobile may be configured to cause the automobile 760 to accelerate or decelerate automatically and without control by the driver (e.g., based on detection of surrounding hazards). As another example, the automobile may be configured to steer the automobile 760 (e.g., based on detecting lane lines on a road on which the automobile 760 is travelling). The operation of the self-driving or autopilot mode may be controlled by the automobile controller 778. The automobile controller 778 may be configured to control one or more elements in the automobile 760 in order to control aspects of the operation of the automobile 760. For example, the automobile controller 778 may be configured to control: a throttle body, a carburetor, a brake, a transmission, a steering mechanism, an electronic control module, or other elements.

The sensor 765 may be provided in whole or in part as described previously with respect to sensors 232, 234, 460, and/or 472. The sensor 765 may be an image capture device (e.g., a camera) in a location built into or in the vicinity of a driver's-side A-pillar.

The sensor 766 may be provided in whole or in part as described previously with respect to sensors 232, 234, 460, and/or 472. The sensor 766 may be an image capture device (e.g., a camera) in a location built into or in the vicinity of a rearview mirror.

The sensor 767 may be a sensor capable of detecting a biometric state of the driver of the automobile 760. For example, the sensor 767 may be a sensor configured to detect the heartrate of the driver. In such cases, the sensor 767 may be provided as a wrist watch, a chest strap, an electric circuit in the steering wheel with contact points for each of the driver's hands, etc. As another example, the sensor 767 may be a sensor configured to detect the blood pressure of the driver. In such cases, the sensor 767 may be provided as a wrist watch, an arm strap, etc. The sensor 767 may be provided to detect other biometric states of the driver of the automobile 760 in accordance with various embodiments of the present disclosure.

The sensor 768 may be a sensor capable of detecting a state of a component of the automobile 760. For example, the sensor 768 may be capable of detecting an angular displacement of the steering wheel 762 (e.g., degrees of rotation from a "wheels forward" position). The sensor 768 may be provided built into or attached to the steering wheel 762. In such cases, the sensor 768 may be provided as a gryroscope, a potentiometer, an optical sensor (e.g., detecting markings on a mounting point for the steering wheel 762), or in some other form. The sensor 768 may be provided to detect other states of components of the automobile 760 in accordance with various embodiments of the present disclosure.

The sensor 769 may be a sensor capable of detecting a state of the automobile 760. For example, the sensor 769 may be capable of detecting a velocity of the automobile 760 (e.g., a velocity along a roadway). In such cases, the sensor 760 may be provided as a Global Positioning System receiver and configured to detect the current velocity based on the rate of change of the position of the automobile 760, an optical sensor attached to a tire of the automobile 760 and configured to detect the current velocity based on the rate of revolution of the tire, etc. The sensor 769 may be provided to detect other states of the automobile 760 in accordance with various embodiments of the present disclosure.

In some embodiments, system 750 may employ a neural network in the following way.

Sensor 765 may sense the position of the driver seated in driver's seat 761. Sensor 765 may produce sensor data based on this sensing. For example, if sensor 765 is a video camera, the sensor data may be an image of the interior of the automobile 760, including the driver, if present. In some embodiments, the sensor 765 may be provided as a camera mounted on a driver-side A-pillar of the automobile 760. In such embodiments, the sensor 765 may be aimed at the lower portion of the driver's body, such as the arms, hands, torso, and upper legs.

The sensor 765 may transmit the image of the interior of the automobile 710 to transceiver 774. This transmission may be performed using a shared communications bus, using a dedicated physical cable, using a short-range wireless link, or in some other way.

Sensor 766 may sense the position of the driver seated in driver's seat 761. Sensor 766 may produce sensor data based on this sensing. For example, if sensor 766 is a video camera, the sensor data may be an image of the interior of the automobile 760, including the driver, if present. In some embodiments, the sensor 766 may be provided as a camera mounted in the vicinity of a rearview mirror of the automobile 760. In such embodiments, the sensor 766 may be aimed at the upper portion of the driver's body, such as neck and head.

The sensor 766 may transmit the image of the interior of the automobile 710 to transceiver 774. This transmission may be performed using a shared communications bus, using a dedicated physical cable, using a short-range wireless link, or in some other way.

Sensor 767 may sense a biometric state of the driver seated in driver's seat 761. Sensor 767 may produce sensor data based on this sensing. For example, if sensor 767 is a wristwatch with a built-in heartrate monitor, the sensor data may be an electronic signal identifying a number of beats per minute for the heart of the driver. The sensor 767 may transmit the sensor data of the biometric state of the driver to transceiver 774. This transmission may be performed using a shared communications bus, using a dedicated physical cable, using a short-range wireless link, using a Bluetooth Low Energy connection, or in some other way.

Sensor 768 may sense a state of a component of the automobile 760. Sensor 768 may produce sensor data based on this sensing. For example, if sensor 768 is a gyroscope built into the steering wheel 762, the sensor data may be an electronic signal identifying an angular displacement of the steering wheel 762 from a "wheels forward" position. The sensor 768 may transmit the sensor data of the state of the component of the automobile 760 to transceiver 774. This transmission may be performed using a shared communications bus, using a dedicated physical cable, using a short-range wireless link, or in some other way.

Sensor 769 may sense a state of the automobile 760. Sensor 769 may produce sensor data based on this sensing. For example, if sensor 769 is a Global Positioning System receiver, the sensor data may be an electronic signal identifying a velocity of the automobile 760. The sensor 769 may transmit the sensor data of the state of the automobile 760 to transceiver 774. This transmission may be performed using a shared communications bus, using a dedicated physical cable, using a short-range wireless link, or in some other way.

The transceiver 774 may transmit sensor data received from sensor 765, 766, 767, 768, and 769 to the remote computing device 770 using the communication link 772. In some embodiments, the communication link 772 may be a dedicated long-range wireless communication link. In some embodiments, the communication link 772 may be a long-range wireless communication link shared with an emergency and navigation service. In some embodiments, the communication link 772 may be a wired communication link. In some embodiments, the communication link 772 may be a continuously active communication link. In some embodiments, the communication link 772 may be an intermittent communication link.

The remote computing device 770 may save the received sensor data for later processing. In some embodiments, the remote computing device 770 may transform the sensor data (e.g., compressing an image, transforming an image to grayscale, enhancing brightness an image, enhancing contrast of an image, combining images from several sensor into a single stereovision image). In some embodiments, the sensor 765, the sensor 766, the sensor 767, the sensor 768, the sensor 769, the transceiver 774, or some other computing device located in the automobile 760 (e.g., local computing device 776) may transform the sensor data (e.g., compressing an image, transforming an image to grayscale, enhancing brightness of an image, enhancing contrast of an image, combining images from several sensor into a single stereovision image) prior to transmitting the sensor data to the remote computing device 770.

The remote computing device 770 may associate multiple elements of received sensor data into tuples. For example, the remote computing device 770 may associate an image captured by sensor 765 with an image captured by sensor 766, a biometric state captured by sensor 767, a state of a component of the automobile 760 captured by sensor 768, and a state of the automobile 760 captured by sensor 769. The remote computing device 770 may association sensor data into tuples using a timestamp associated with each element of sensor data. For example, the remote computing device 770 may associate an image captured by sensor 765 at time t1 with the sensor data captured by the other sensors at times closest to time t1 (e.g., the image captured by sensor 766 closest to time t1, the biometric state captured by sensor 767 closest to time t1, etc.). In some embodiments, the sensor 765, the sensor 766, the sensor 767, the sensor 768, the sensor 769, the transceiver 774, or some other computing device located in the automobile 760 (e.g., local computing device 776) may associate the sensor data prior to transmitting the sensor data to the remote computing device 770.

The sensor 765, the sensor 766, the sensor 767, the sensor 768, the sensor 769, the transceiver 774, and the remote computing device 770 may repeat this process of sensor data capture, transmission, and storage numerous times until a large quantity of sensor data are stored by the remote computing device 770. In some embodiments, the large quantity of sensor data may be 100 tuples of associated sensor data. In some embodiments, the large quantity of images may be 1,000 tuples of associated sensor data. In some embodiments, the large quantity of images may be 10,000 tuples of associated sensor data. In some embodiments, the large quantity of images may be 100,000 tuples of associated sensor data.

One or more users may label the tuples of sensor data based on predefined categories (e.g., "ready" and "not ready" driving). The remote computing device 770 may store these category labels with the tuples of sensor data to which they pertain. In some embodiments, a user located in the automobile 760 (e.g., the driver, a passenger) may perform the labelling prior to transmitting the corresponding tuple of sensor data to the remote computing device 770. The one or more users may label the tuples of sensor data while the remote computing device 770 is still waiting to finish storage a large quantity of sensor data, after completing storage of a large quantity of sensor data, or at some other time. In some embodiments, the one or more users may label the tuples of sensor data using a user interface (not pictured) communicatively coupled to the remote computing device 770 (e.g., the user interface of a laptop with the laptop communicating with the remote computing device 770).

Once a large quantity of tuples of sensor data and associated category labels are stored by the remote computing device 770, the remote computing device 770 may train a neural network structure (e.g., neural network structures 600, 650, 680) based on the tuples of sensor data and corresponding labels. For example, if the tuples of sensor data include are images of the interior of the vehicle 760, the state of the driver, the state of a component of the automobile 760, and the state of the automobile 760, and the category labels are each selected from "ready" and "not ready," the remote computing device 770 may train a neural network structure to accurately categorize the state of the driver as "ready" (e.g., to perform manual operation of the automobile 760, as a transition from a self-driving mode) or "not ready" (e.g., to perform manual operation of the automobile 760, as a transition from a self-driving mode) based on the driver's body position, the driver's biometric state, the state of the component of the automobile 760, and the state of the automobile 760.

Once the remote computing device 770 trains the neural network structure, the remote computing device 770 may transmit parameters defining the neural network structure (also referred to herein as "neural network configuration parameters") (e.g., specification of nodes, specification of combination functions for nodes, specification of activation functions for nodes, specification of connections, and/or specification of weights for connections) to the local transceiver 774 using the communication link 772. In some embodiments, the remote computing device 770 may transmit the parameters defining the neural network structure to the local transceiver 774 using a communication link other than communication link 772.

The local transceiver 774 may transmit the parameters defining the neural network structure to the local computing device 776. The local computing device 776 may be configured to receive the parameters defining the neural network structure from the local transceiver 774. The local computing device 776 may also be configured to receive an image of the interior of the automobile 760 from the sensor 765, an image of the interior of the automobile 760 from the sensor 766, a biometric state of the driver from the sensor 767, a state of a component of the automobile 760 from the sensor 768, and a state of the automobile 760 from the sensor 769. This reception from the local transceiver 774, the sensor 765, the sensor 766, the sensor 767, the sensor 768, and the sensor 769 may be performed using any of a variety of communication mediums, such as those described previously for communication between the sensor 765 and the local transceiver 774.

The local computing device 776 may be configured to create the fully-trained neural network structure (e.g., recreate the structure in local memory) based on the parameters defining the neural network structure. Once the local computing device 776 receives the parameters defining the neural network structure, the local computing device 776 may provide the sensor data received from each of the sensors 765, 766, 767, 768, and 769 as input to the neural network structure in real-time. The local computing device 776 may thereby determine a category for the input sensor data (e.g., "ready" or "not ready") which indicates the most likely state of the driver of the automobile 760 when the sensor data was captured. If the sensor data is provided to the local computing device 776 in substantially real-time, then the local computing device 776 may be able to determine whether the driver is in a ready state or a not ready state at substantially the present time.

The local computing device 776 may transmit the determined state of the driver (e.g., "ready" or "not ready") to the automobile controller 778. This transmission to the automobile controller 778 may be performed using any of a variety of communication mediums, such as those described previously for communication between the sensor 765 and the local transceiver 774.

The automobile controller 778 may be configured to control whether the automobile 760 automatically transitions from a self-driving or autopilot mode to a manual mode based on the state of the driver determination received from the local computing device 776. For example, the automobile controller 778 may be configured to operate in a self-driving or autopilot mode while on an interstate. But, the automobile controller 778 may be configured to transition to a manual mode (e.g., with full control of the vehicle by the driver) when the automobile 760 exits the interstate. However, the automobile controller 778 may determine to restrict transition from a self-driving or autopilot mode to a manual mode even if the automobile 760 is exiting an interstate, if the local computing device 726 determines that the driver is presently in a "not ready" state.

The automobile controller 778 may be configured to use images, driver biometric state information, automobile state information, and/or automobile component state information to control operation of the automobile 760 in other ways in accordance with various embodiments of the present disclosure.

Figure 8:
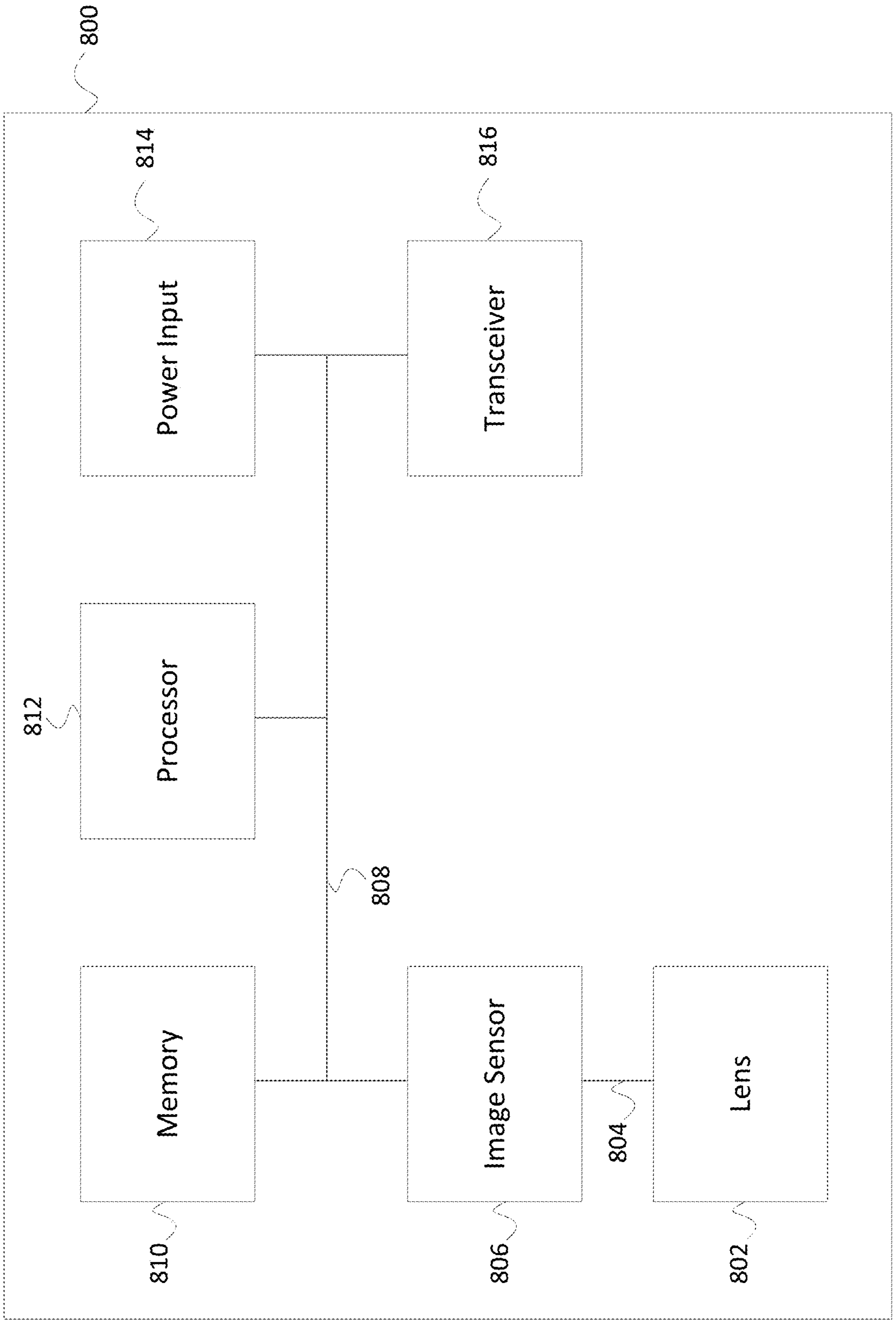
FIG. 8 is a diagram of a sensor device according to some embodiments of the present disclosure.

FIG. 8 is a diagram of a sensor device 800 according to some embodiments of the present disclosure. The sensor device 800 may be provided as a sensor (e.g., sensors 232, 234, 460, 472) in some embodiments of the present disclosure. The sensor device 800 includes a lens 802, an image sensor 806, a memory 810, a processor 812, a power input 814, and a transceiver 816.

The sensor device 800 may use the lens 802 and image sensor 806 to capture an image of the interior of an automobile (e.g., automobiles 110, 300, 400, 710). The lens 802 may be coupled to the image sensor by coupling 804 (e.g., a physical attachment) and used to focus light on the image sensor 806. The image sensor 806 may be configured to convert absorbed light into an analog or digital signal reflecting the absorbed light.

The image sensor 806 may be coupled to the memory 810, processor 812, power input 814, and transceiver 816 by coupling 808 (e.g., a wired communications bus). The memory 810 may be configured to temporarily store information pertaining to the image captured by the image sensor 806, either before or after processing by the processor 812. The processor 812 may be configured to process information stored by the memory 810 and/or generated by the image sensor 806 (e.g., image compression, analog to digital conversion).

The power input 814 may be configured to provide electric power to the image sensor 806, memory 810, processor 812, and/or transceiver 816. In some embodiments, the power input 814 may include an electrical coupling to each of the image sensor 806, memory 810, processor 812, and/or transceiver 816 apart from the coupling 808.

The transceiver 816 may be configured to transmit information pertaining to the image captured by the image sensor 806 to one or more external devices, such as a local transceiver (e.g., local transceiver 724) or a local computing device (e.g., local computing device 726). In some embodiments, the transceiver 816 may be configured to transmit information pertaining to information pertaining to the image captured by the image sensor 806 after the information has been processed by the processor 812. In some embodiments, the transceiver 816 may include a network adaptor configured to format information pertaining to the image captured by the image sensor 806 across a data communications network.

Figure 9:
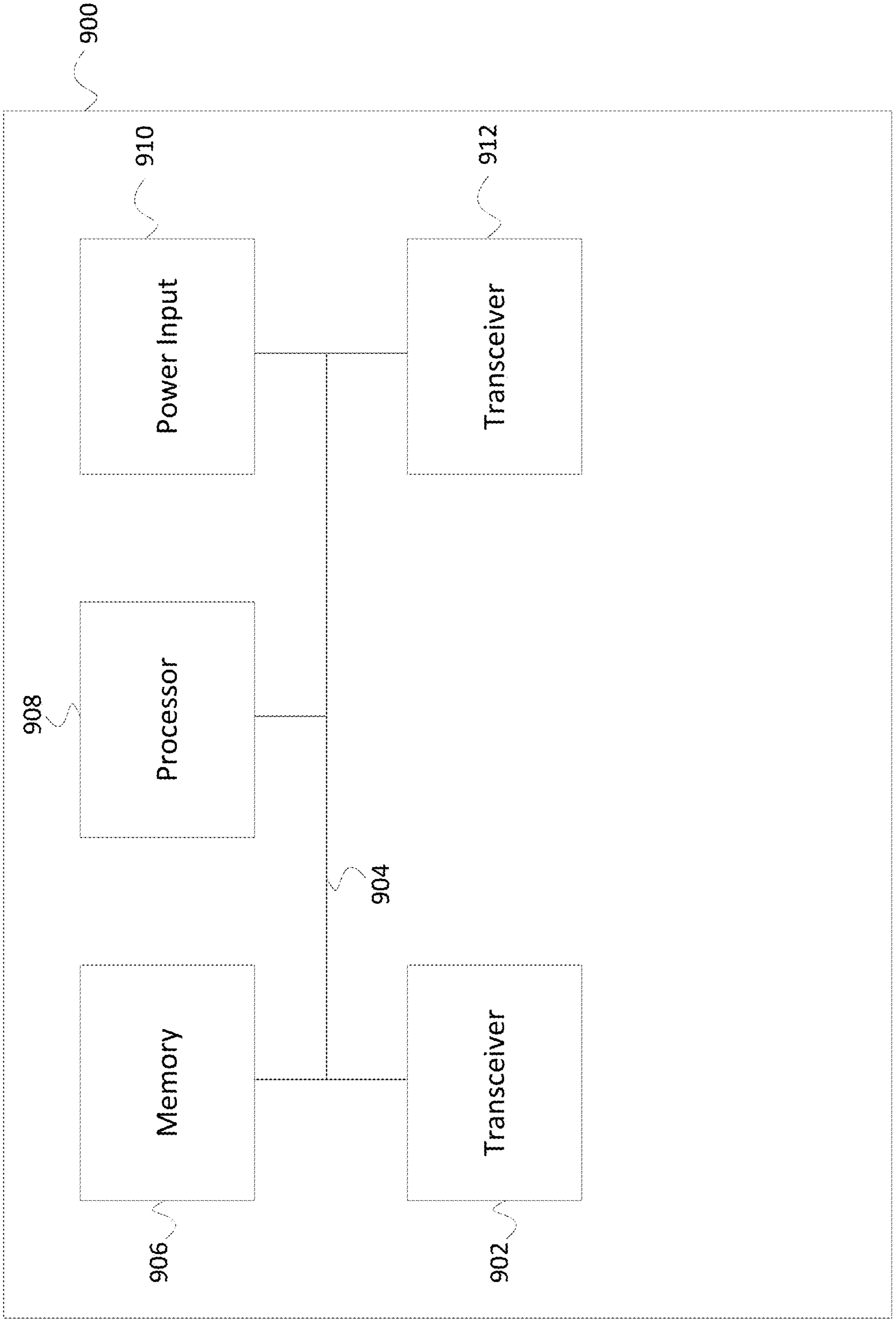
FIG. 9 is a diagram of a local transceiver according to some embodiments of the present disclosure.

FIG. 9 is a diagram of a local transceiver according to some embodiments of the present disclosure. The local transceiver 900 may be provided as a local transceiver (e.g., local transceiver 724) in some embodiments of the present disclosure. The local transceiver 900 includes a transceiver 902, a coupling 904, a memory 906, a processor 908, a power input 910, and a transceiver 912.

The transceiver 902, memory 906, processor 908, power input 910, and transceiver 912 may be coupled together by coupling 904 (e.g., a wired communications bus). In some embodiments, only a subset of transceiver 902, memory 906, processor 908, power input 910, and transceiver 912 may be coupled together by coupling 904.

The transceiver 902 may be configured to communicate with other devices co-located in an automobile (e.g., sensor 716, local computing device 726). For example, the transceiver 902 may be configured to receive information pertaining to an image captured by a sensor device (e.g., sensor device 800) co-located in an automobile. As another example, the transceiver 902 may be configured to transmit neural network configuration parameters to a computing device (e.g., local computing device 726, 1100) co-located in an automobile.

The memory 906 may be configured to temporarily store information pertaining to image information received by the transceiver 902 or neural network structure information received by the transceiver 912, either before or after processing by the processor 908. For example, the memory 906 may be configured to buffer image information after reception by transceiver 902 and prior to transmission by transceiver 912. As another example, the memory 906 may be configured to buffer neural network configuration parameters after reception by transceiver 912 and before transmission by transceiver 902.

The processor 908 may be configured to process information stored by the memory 906, received by the transceiver 902, and/or received by the transceiver 912. The processor 908 may be configured to perform various data processing tasks (e.g., image compression, data serialization).

The power input 910 may be configured to provide electric power to the transceiver 902, memory 906, processor 908, and transceiver 912. In some embodiments, the power input 910 may include an electrical coupling to each of the transceiver 902, memory 906, processor 908, and transceiver 912 apart from the coupling 904.

The transceiver 912 may be configured to communicate with a remote computing device (e.g., remote computing devices 130, 720, 1000) that are not co-located in an automobile with the transceiver device 900. For example, the transceiver 912 may be configured to transmit information pertaining to an image captured by a sensor device (e.g., sensor device 800) co-located in an automobile to a remote computing device. As another example, the transceiver 912 may be configured to receive neural network configuration parameters from a remote computing device. The transceiver 912 may be configured to communicate with the remote computing device using a communication link (e.g., communication links 140, 722). In some embodiments, the communication link may be a cellular communication link, in which case the transceiver 912 may include a cellular communication (e.g., CDMA2000, GSM, 4G LTE) transceiver. In some embodiments, the communication link may be a IEEE 802.11 Wi-Fi link, in which case the transceiver 912 may include a Wi-Fi transceiver. In some embodiments, the communication link may be a wired link, in which case the transceiver 912 may include a wired (e.g., Ethernet, USB) transceiver. In some embodiments, the communication link may involve a physical transfer of storage media (e.g., transfer of a flash drive). In some embodiments, the communication link may be a dedicated cellular link (e.g., a link to a cellular radio access network provided specifically for the system 700.) In some embodiments, the communication link may be a shared cellular link (e.g., a link to a cellular radio access network shared with other services in the automobile environment.) Other forms of communications links and communications transceivers may be used in various embodiments of the present disclosure.

Figure 10:
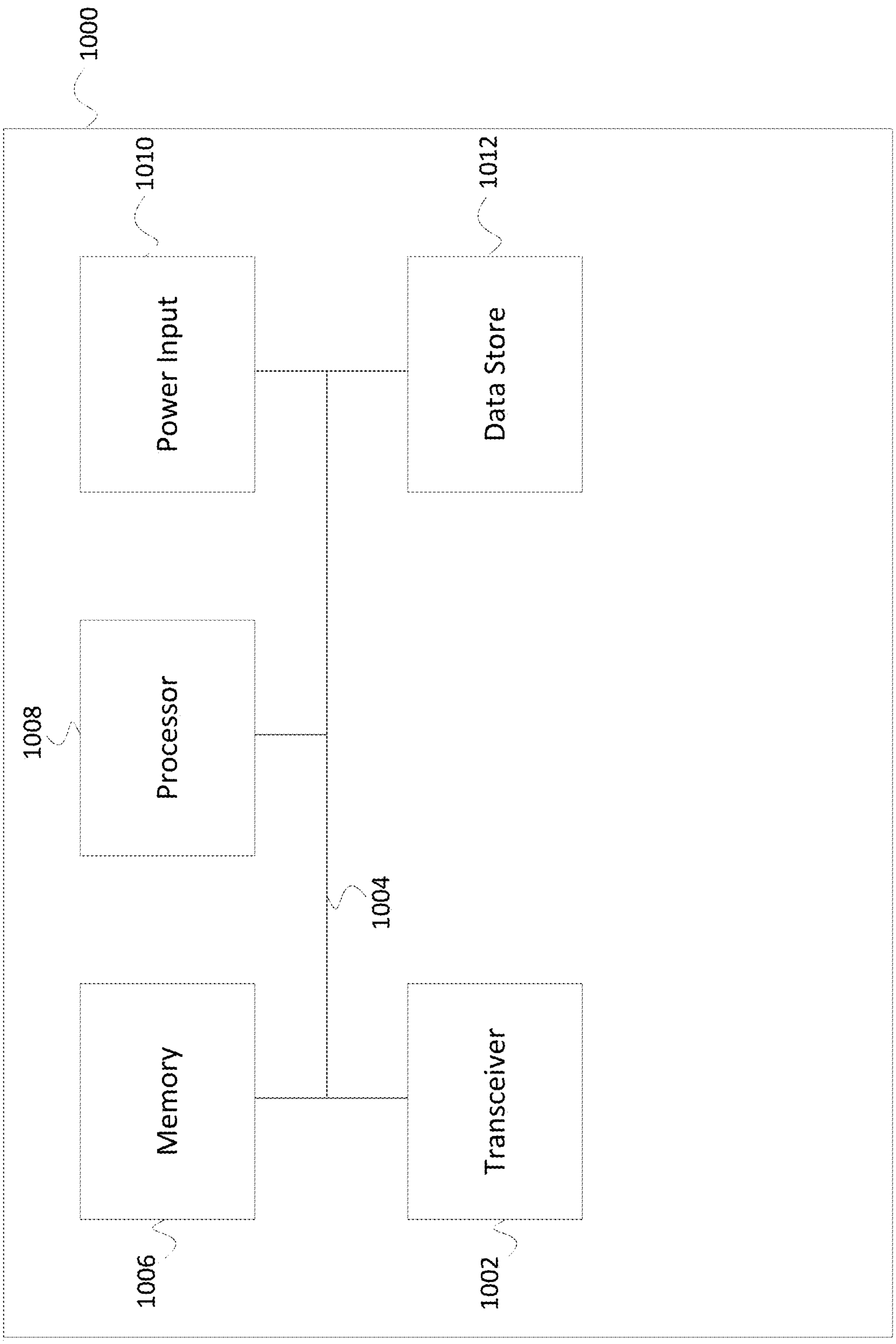
FIG. 10 is a diagram of a remote computing device according to some embodiments of the present disclosure.

FIG. 10 is a diagram of a remote computing device 1000 according to some embodiments of the present disclosure. The remote computing device 1000 may be provided as a remote computing device (e.g., remote computing devices 130, 720) in some embodiments of the present disclosure. The remote computing device 1000 includes a transceiver 1002, a coupling 1004, a memory 1006, a processor 1008, a power input 1010, and a data store 1012.

The transceiver 1002, memory 1006, processor 1008, power input 1010, and data store 1012 may be coupled together by coupling 1004 (e.g., a wired communications bus). In some embodiments, only a subset of transceiver 1002, memory 1006, processor 1008, power input 1010, and data store 1012 may be coupled together by coupling 1004.

The transceiver 1002 may be configured to communicate with a local transceiver (e.g., local transceiver 724, 900) that is located in an automobile and remote from the remote computing device 1000. For example, the transceiver 1002 may be configured to receive information pertaining to an image captured by a sensor device (e.g., sensor device 800) located in an automobile from a local computing device co-located with the sensor device in the automobile. As another example, the transceiver 1002 may be configured to transmit neural network configuration parameters from to the local computing device. The transceiver 1002 may be configured to communicate with the local computing device using a communication link (e.g., communication links 140, 722). In some embodiments, the communication link may be a cellular communication link, in which case the transceiver 1002 may include a cellular communication (e.g., CDMA2000, GSM, 4G LTE) transceiver. In some embodiments, the communication link may be a IEEE 802.11 Wi-Fi link, in which case the transceiver 1002 may include a Wi-Fi transceiver. In some embodiments, the communication link may be a wired link, in which case the transceiver 1002 may include a wired (e.g., Ethernet, USB) transceiver. In some embodiments, the communication link may involve a physical transfer of storage media (e.g., transfer of a flash drive). Other forms of communications links and communications transceivers may be used in various embodiments of the present disclosure.

The memory 1006 may be configured to temporarily store information pertaining to image information received by the transceiver 1002 or neural network structure information prepared for transmission by the transceiver 1002, either before or after processing by the processor 1008. For example, the memory 1006 may be configured to buffer image information after reception by transceiver 1002 and prior to storage in data store 1012. As another example, the memory 1006 may be configured to buffer neural network configuration parameters after generation by the process 1008 and before transmission by transceiver 1002. In some embodiments, the memory 1006 may be further configured to store neural network configuration parameters used by the processor 1008 during training of a neural network structure (e.g., neural network structures 600, 650).

The processor 1008 may be configured to process information stored by the memory 1006, received by the transceiver 1002, and/or stored by the data store 1012. The processor 1008 may be configured to perform various data processing tasks. For example, the processor 1008 may be configured to initialize default neural network configuration parameters prior to training a neural network structure (e.g., neural network structures 600, 650). As another example, the processor 1008 may be configured to provide images stored by the data store 1012 as inputs to the neural network structure. As another example, the processor 1008 may be configured to repeatedly modify the neural network configuration parameters so that the neural network structure accurately determines the categories of the images stored by the data store 1012 based on category labels stored by data store 1012. In some embodiments, the processor 1008 may be configured to train a neural network structure. In some embodiments, the processor 1008 may be provided as a single processor as part of the remote computing device 1000. In some embodiments, the processor 1008 may be provided as multiple processors as part of the remote computing device 1000. In some embodiments, the processor 1008 may be provided as multiple cores of one or more processors as part of the remote computing device 1000. In some embodiments, the processor 1008 may be provided as multiple processors as part of more than one remote computing device 1000. Other forms of processor configurations may be used in various embodiments of the present disclosure.

The power input 1010 may be configured to provide electric power to the transceiver 1002, memory 1006, processor 1008, and data store 1012. In some embodiments, the power input 1010 may include an electrical coupling to each of the transceiver 1002, memory 1006, processor 1008, and data store 1012 apart from the coupling 1004.

The data store 1012 may be configured to store image information pertaining to an image captured by a sensor device in an automobile, category labels pertaining to one or more images stored by the data store 1012, and/or neural network configuration parameters generated by the processor 1008. In some embodiments, the data store 1012 may be provided as a single storage device as part of the remote computing device 1000. In some embodiments, the data store 1012 may be provided as multiple storage devices as part of the remote computing device 1000. In some embodiments, the data store 1012 may be provided as multiple storage devices as part of more than one remote computing devices 1000. Other forms of storage configurations may be used in various embodiments of the present disclosure.

Figure 11:
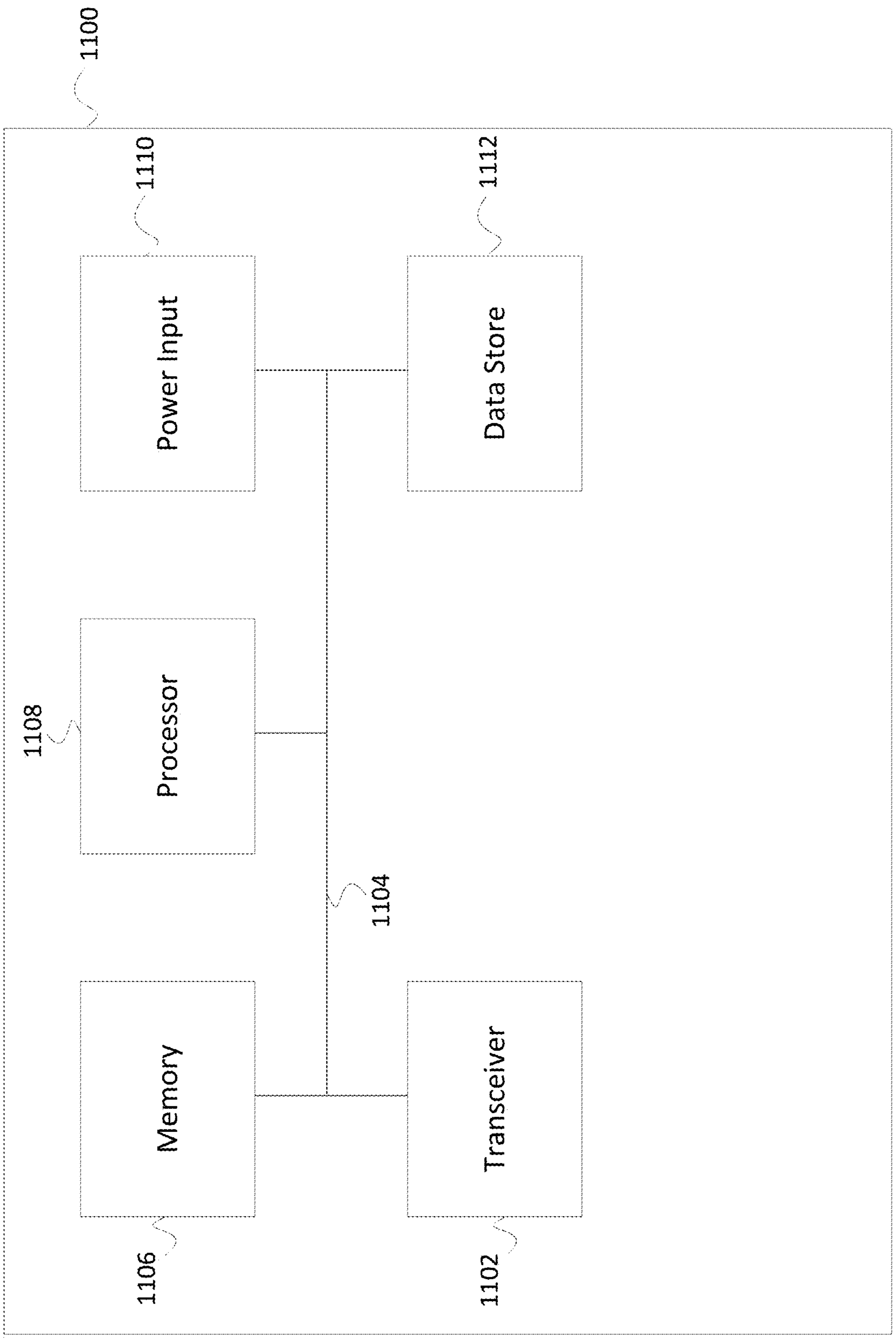
FIG. 11 is a diagram of a local computing device according to some embodiments of the present disclosure.

FIG. 11 is a diagram of a local computing device according to some embodiments of the present disclosure. The local computing device 1100 may be provided as a local computing device (e.g., local computing device 726) in some embodiments of the present disclosure. The local computing device 1100 includes a transceiver 1102, a coupling 1104, a memory 1106, a processor 1108, a power input 1110, and a data store 1112.

The transceiver 1102, memory 1106, processor 1108, power input 1110, and data store 1112 may be coupled together by coupling 1104 (e.g., a wired communications bus). In some embodiments, only a subset of transceiver 1102, memory 1106, processor 1108, power input 1110, and data store 1112 may be coupled together by coupling 1104.

The transceiver 1102 may be configured to communicate with other devices co-located in an automobile (e.g., sensor 716, local transceiver 724, automobile controller 728). For example, the transceiver 1102 may be configured to receive information pertaining to an image captured by a sensor device (e.g., sensor device 800) co-located in an automobile. As another example, the transceiver 1102 may be configured to receive neural network configuration parameters from a local transceiver device (e.g., local transceiver 724, 900) co-located in an automobile. As another example, the transceiver 1102 may be configured to transmit to an automobile controller (e.g., automobile controller 728, 1200) a category determined to apply to an image based on input of the image to a neural network structure.

The memory 1106 may be configured to temporarily store information pertaining to image information received by the transceiver 1102 or neural network structure information prepared by the processor 1108. For example, the memory 1106 may be configured to buffer image information after reception by transceiver 1102. As another example, the memory 1106 may be configured to buffer neural network configuration parameters after reception by the transceiver 1102 and prior to storage by the data store 1112. As another example, the memory 1106 may be configured to buffer a state determination value (e.g., “safe driving” or “not safe driving”) after generation by the processor 1108 and before transmission by the transceiver 1102 to an automobile controller. As another example, the memory 1106 may be configured to store information defining a neural network structure as generated by the processor 1108 based on the neural network configuration parameters. The information defining a neural network structure may be used by the processor 1108 when applying an image received by the transceiver 1102 as input to the neural network structure (e.g., neural network structures 600, 650).

The processor 1108 may be configured to process information stored by the memory 1106, received by the transceiver 1102, and/or stored by the data store 1112. The processor 1108 may be configured to perform various data processing tasks. For example, the processor 1108 may be configured to generate in memory 1106 a neural network structure based on processing the neural network configuration parameters received by the transceiver 1102. As another example, the processor 1108 may be configured to transform an image (e.g., compressing the image, transforming the image to grayscale, enhancing brightness, enhancing contrast) received by the transceiver 1102. As another example, the processor 1108 may be configured to apply the image as input to the neural network structure. As another example, the processor 1108 may be configured to determine an output node (e.g., output nodes 675, 676) that has a highest value. As another example, the processor 1108 may be configured to determine a category predicted for the image by the neural network structure based on providing the image as input to the neural network structure. In some embodiments, the process 1108 may be configured to generate a neural network structure and use the neural network structure on images captured of an interior of an automobile by an image sensor co-located in the automobile with the local computing device 1100.

In some embodiments, the processor 1108 may be provided as a single processor as part of the local computing device 1100. In some embodiments, the processor 1108 may be provided as multiple processors as part of the local computing device 1100. In some embodiments, the processor 1108 may be provided as multiple cores of one or more processors as part of the local computing device 1100. In some embodiments, the processor 1108 may be provided as multiple processors as part of more than one local computing device 1100. Other forms of processor configurations may be used in various embodiments of the present disclosure.

The power input 1110 may be configured to provide electric power to the transceiver 1102, memory 1106, processor 1108, and data store 1112. In some embodiments, the power input 1110 may include an electrical coupling to each of the transceiver 1102, memory 1106, processor 1108, and data store 1112 apart from the coupling 1104.

The data store 1112 may be configured to store neural network configuration parameters received by the transceiver 1102 and/or neural network structure information prepared by the processor 1108. In some embodiments, the data store 1112 may be provided as a single storage device as part of the local computing device 1100. In some embodiments, the data store 1112 may be provided as multiple storage devices as part of the local computing device 1100. In some embodiments, the data store 1112 may be provided as multiple storage devices as part of more than one local computing devices 1100. Other forms of storage configurations may be used in various embodiments of the present disclosure.

Figure 12:
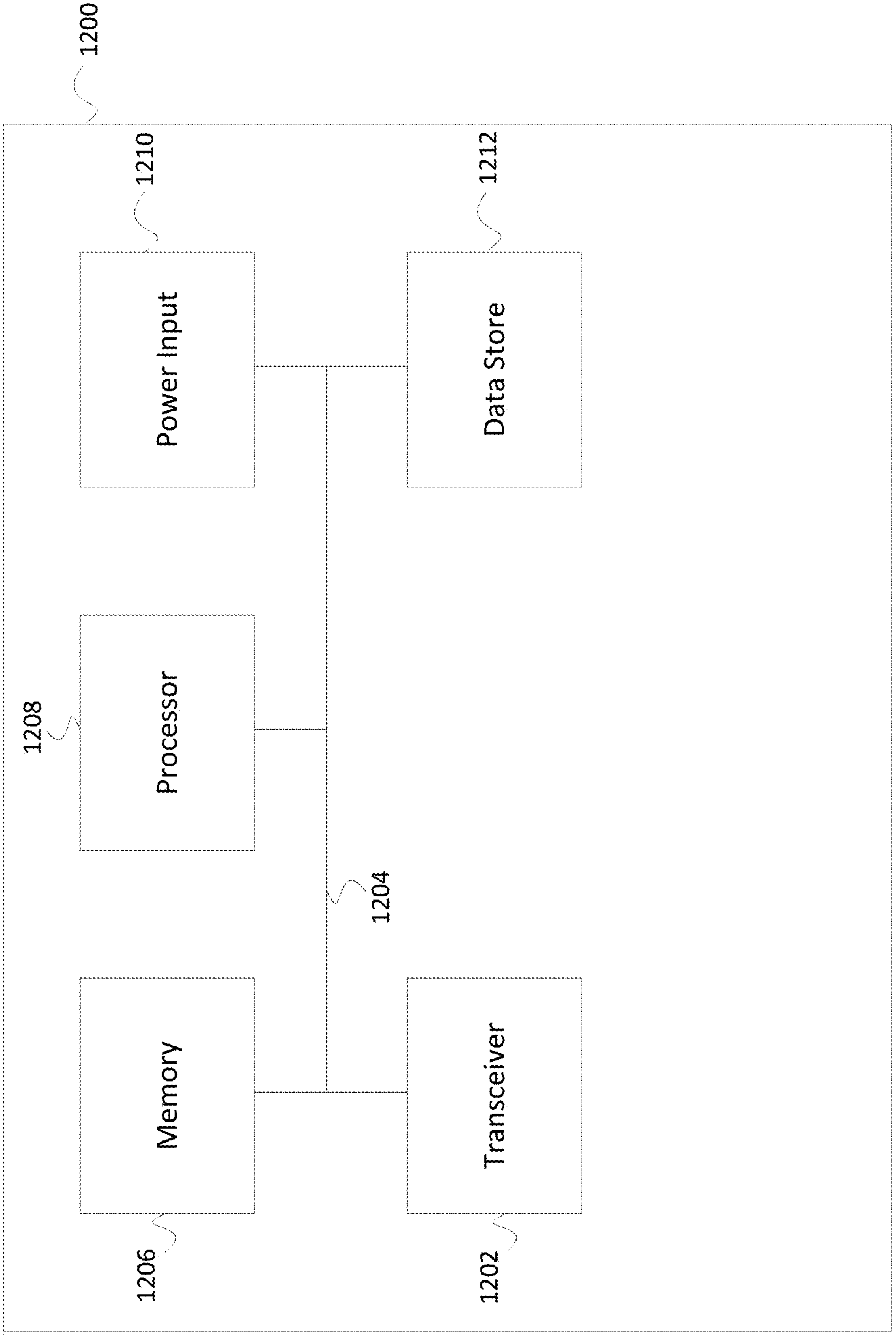
FIG. 12 is a diagram of an automobile controller according to some embodiments of the present disclosure.

FIG. 12 is a diagram of an automobile controller 1200 according to some embodiments of the present disclosure. The automobile controller 1200 may be provided as an automobile controller (e.g., automobile controller 728) in some embodiments of the present disclosure. The automobile controller 1200 includes a transceiver 1202, a coupling 1204, a memory 1206, a processor 1208, a power input 1210, and a data store 1212.

The transceiver 1202, memory 1206, processor 1208, power input 1210, and data store 1212 may be coupled together by coupling 1204 (e.g., a wired communications bus). In some embodiments, only a subset of transceiver 1202, memory 1206, processor 1208, power input 1210, and data store 1212 may be coupled together by coupling 1204.

The transceiver 1202 may be configured to communicate with other devices co-located in an automobile (e.g., local computing device 726). For example, the transceiver 1202 may be configured to receive information pertaining to a current state of a driver (e.g., “safe driver” or “not safe driving”) of the automobile as determined by a local computing device (e.g., local computing device 726, 1100). As another example, the transceiver 1202 may be configured to receive information pertaining to a current driving mode (e.g., self-driving, manual) of the automobile. As another example, the transceiver 1202 may be configured to receive information pertaining to a current velocity of the automobile. As another example, the transceiver 1202 may be configured to receive information pertaining to a current gear of a transmission of the automobile.

The memory 1206 may be configured to temporarily store information pertaining to a current state of a driver of the automobile and/or information pertaining to a current operation mode (e.g., self-driving, manual) of the automobile. For example, the memory 1206 may be configured to buffer driver state information after reception by transceiver 1202. As another example, the memory 1106 may be configured to buffer operation mode information that indicates the current mode of the automobile (e.g., a self-driving or autopilot mode versus a manual mode).

The processor 1208 may be configured to determine whether to transition the automobile between a self-driving or autopilot mode and a manual mode based on the driver state information received by the transceiver 1202. For example, the processor 1208 may be determine based on a transition rule stored in data store 1212 that the automobile cannot transition from a self-driving or autopilot mode to a manual mode if the current driver state information indicates that the driver is in an "unsafe driving" state.

The power input 1210 may be configured to provide electric power to the transceiver 1202, memory 1206, processor 1208, and data store 1212. In some embodiments, the power input 1210 may include an electrical coupling to each of the transceiver 1202, memory 1206, processor 1208, and data store 1212 apart from the coupling 1204.

The data store 1212 may be configured to store driving mode transition rules that specify when the automobile controller 1200 must restrict transition or force transition between a self-driving or autopilot mode and a manual mode (and vice versa) based on a current state of the driver of the automobile. For example, a driving mode transition rule may specific that the automobile cannot transition from a self-driving or autopilot mode to a manual mode if the current driver state information indicates that the driver is in an "unsafe driving" state. As another example, a driving mode transition rule may specific that the automobile must transition from a manual mode to a self-driving or autopilot mode if the current driver state information indicates that the driver is in an "unsafe driving" state and the current velocity of the automobile is greater than zero. Other configuration of driving mode transition rules may be used in various embodiments of the present disclosure.

Figure 13:
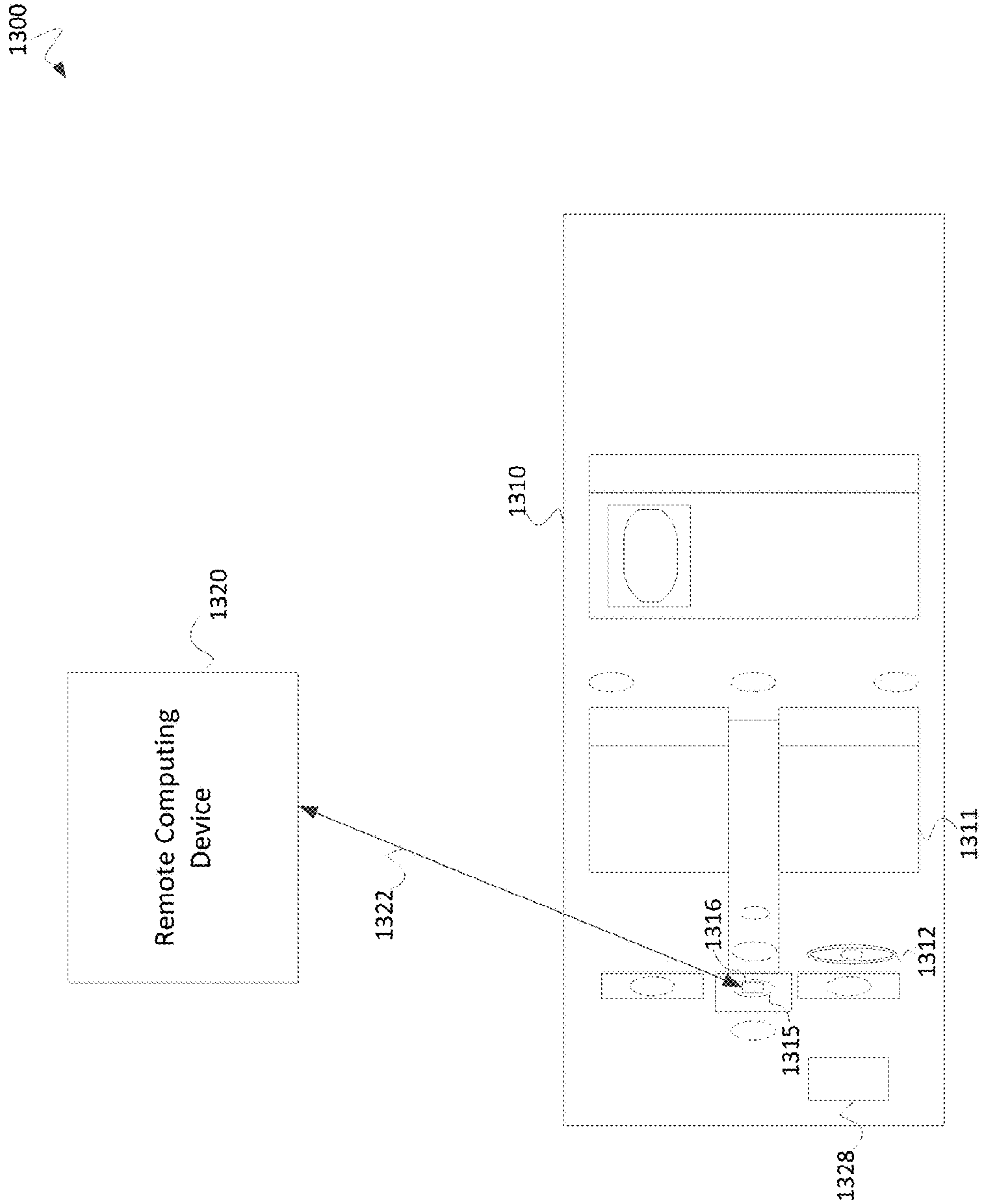
FIG. 13 is a system diagram of a system employing a neural network in an automotive environment according to some embodiments of the present disclosure.

FIG. 13 is a system diagram of a system 1300 employing a neural network in an automotive environment according to some embodiments of the present disclosure. The system 1300 includes an automobile 1310, a composite sensor/computing device 1316, a remote computing device 1320, a communication link 1322, and an automobile controller 1328.

The automobile 1310 may be an automobile as described previously with respect to automobiles 110, 300, 400, and/or 710. The automobile 710 may be operated by a driver seated in driver's seat 1311. The driver may operate the automobile 1310 using the steering wheel 1312 and other control devices.

The composite sensor/computing device 1316 may combine the functionality of a sensor device (e.g., sensor devices 232, 234, 460, 472, 800), a local transceiver device (e.g., local transceivers 724, 900), and a local computing device (e.g., local computing devices 726, 1100). The composite sensor/computing device 1316 may be provided at a location 1315 built into or adjacent to an infotainment console. The composite sensor/computing device 1316 may be an advantageous configuration combining the functionality of three different devices. This arrangement may be preferred in some embodiments due to the simplicity of installation in the automobile and/or the reduced cost in manufacturing and maintaining a single device. In some embodiments, installation of the composite sensor/computing device 1316 in a centralized location such as the location 1315 of an infotainment console may be advantageous for allowing the sensor to sense the position of the driver seated in driver's seat 1311 while also allowing direct connections to other electronic components provided behind the dashboard of the automobile.

The remote computing device 1320 may be provided as described previously with respect to remote computing devices 130, 720, and/or 1000. The communication link 1322 may be provided as described previously with respect to communication links 120 and/or 722. The automobile controller 1328 may be provided as described previously with respect to automobile controllers 728 and/or 1200.

Figure 14:
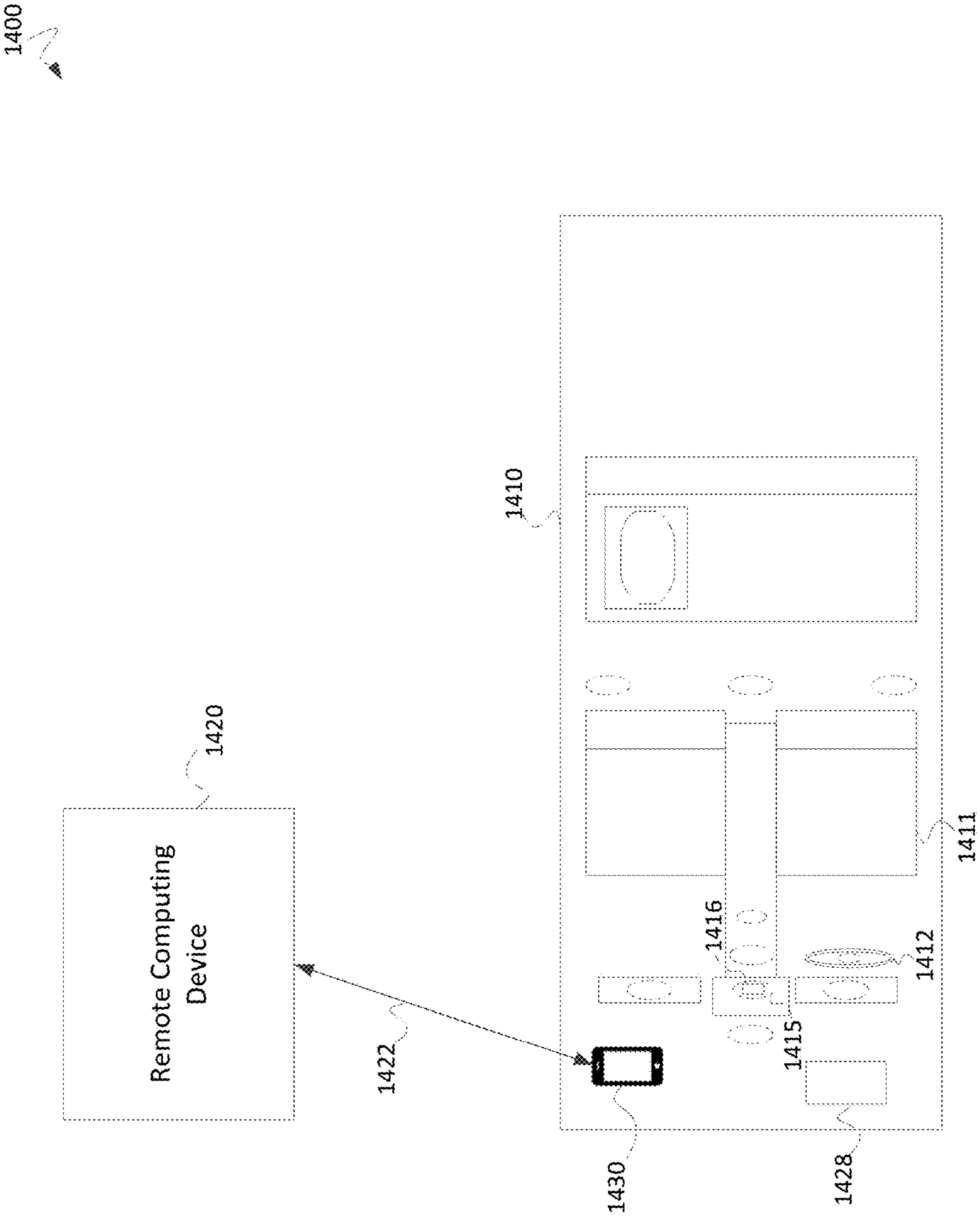
FIG. 14 is a system diagram of a system employing a neural network in an automotive environment according to some embodiments of the present disclosure.

FIG. 14 is a system diagram of a system 1400 employing a neural network in an automotive environment according to some embodiments of the present disclosure. The system 1400 includes an automobile 1410, a composite sensor/computing device 1416, a mobile device 1430, a remote computing device 1420, a communication link 1422, and an automobile controller 1428.

The automobile 1410 may be an automobile as described previously with respect to automobiles 110, 300, 400, 710, and/or 1310. The automobile 1410 may be operated by a driver seated in driver's seat 1411. The driver may operate the automobile 1410 using the steering wheel 1412 and other control devices.

The composite sensor/computing device 1416 may combine the functionality of a sensor device (e.g., sensor devices 232, 234, 460, 472, 800) and a local computing device (e.g., local computing devices 726, 1100). The composite sensor/computing device 1416 may be provided at a location 1415 built into or adjacent to an infotainment console. The composite sensor/computing device 1416 may not contain the functionality of a local transceiver device (e.g., local transceivers 724, 900). Instead, the composite sensor/computing device 1416 may communicate with mobile device 1430 in order to transmit images to and receive neural network configuration parameters from the remote computing device 1420. The composite sensor/computing device 1416 may communicate with the mobile device 1430 using short-range wireless communications (e.g., Bluetooth), or using some other communications technology. The mobile device 1430 may communicate with the remote computing device 1420 using a long-range wireless communications link (e.g., CDMA2000, GSM), a short-range wireless communications link (e.g., IEEE 802.11 Wi-Fi), or using some other communications technology.

The composite sensor/computing device 1416 may be an advantageous configuration combining the functionality of two different devices. This arrangement may be preferred in some embodiments due to the simplicity of installation in the automobile, the reduced cost in manufacturing and maintaining a single device, and/or the reduced cost and administrative challenge of not requiring a dedicated long-range communications link (i.e., using an existing communications link provided by mobile device 1430).

The remote computing device 1420 may be provided as described previously with respect to remote computing devices 130, 720, 1000, and/or 1310. The communication link 1422 may be provided as described previously with respect to communication links 120, 722, and/or 1322. The automobile controller 1428 may be provided as described previously with respect to automobile controllers 728, 1200, and/or 1328.

Figure 15:
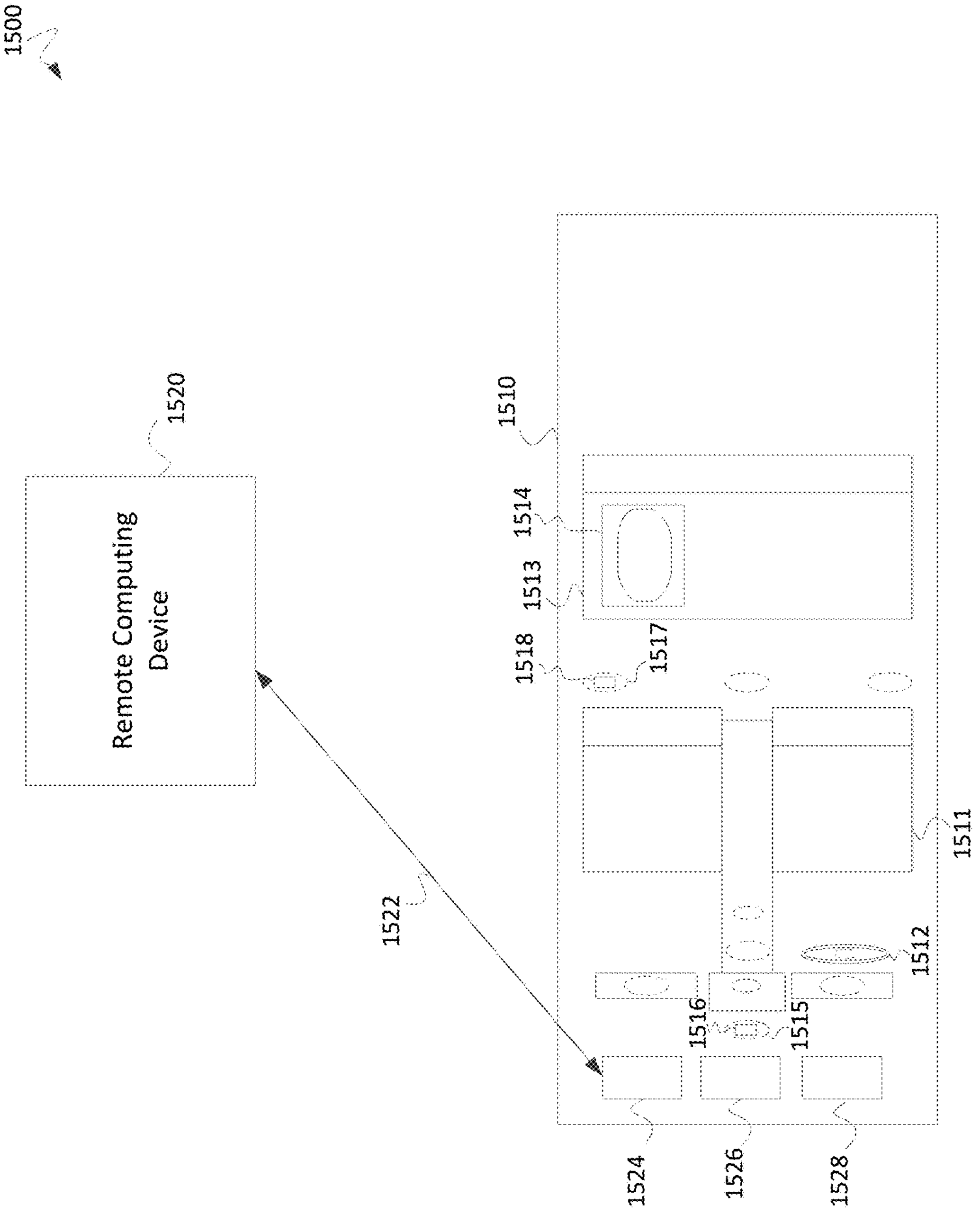
FIG. 15 is a system diagram of a system employing a neural network in an automotive environment according to some embodiments of the present disclosure.

FIG. 15 is a system diagram of a system 1500 employing a neural network in an automotive environment according to some embodiments of the present disclosure. The system 1500 includes an automobile 1510, a sensor 1516, a sensor 1518, a remote computing device 1520, a communication link 1522, a local transceiver 1524, a local computing device 1526, and an automobile controller 1528.

The automobile 1510 may be an automobile as described previously with respect to automobiles 110, 300, 400, and/or 710. The automobile 1510 may be operated by a driver seated in driver's seat 1511. The driver may operate the automobile 1510 using the steering wheel 1512 and other control devices. In some embodiments, the automobile 1510 may be configured alert the driver of safety hazards or other pertinent conditions. For example, the automobile 1510 may include an indicator light and an audible tone to alert the driver that the driver does not have his safety belt engaged. The automobile 1510 may include a variety of other indicator devices, including visual indicators, audible indicators, haptic indicators, electronic transmitters, etc.

The automobile 1510 may further include a rear seat 1513 and a child safety seat 1514. The child safety seat 1514 may be provided in its ordinary form as a seat in which a baby, toddler, or other child is seated and restrained. The child may be restrained in the child safety seat 1514 by a five-point harness, three-point harness, or other harness. The child safety seat 1514 may be attached (e.g., by belts and clips) to the rear seat 1513 to prevent the child safety seat 1514 from shifting during movement of the automobile 1510 or after collision between the automobile 1510 and some item in its environment.

The sensor 1516 may be provided in whole or in part as described previously with respect to sensors 232, 234, 460, 472, 716, and/or 800. The sensor 1516 may be provided at a location 1515, such as in a location built into or in the vicinity of a rearview mirror.

The sensor 1518 may be provided in whole or in part as described previously with respect to sensors 232, 234, 460, 472, 716, and/or 800. The sensor 1518 may be provided at a location 1517, such as affixed to the interior ceiling the automobile 1510.

In some embodiments, system 1500 may employ a neural network in the following way.

The sensor 1516 may sense the position of the driver seated in driver's seat 1511. Sensor 1516 may produce sensor data based on this sensing. For example, if the sensor 1516 is a video camera, then the sensor 1516 may generate an image of the interior of the automobile 1510, including the driver, if present.

The sensor 1518 may sense child safety seat 1514 and any occupant thereof. Sensor 1518 may produce sensor data based on this sensing. For example, if the sensor 1518 is a video camera, then the sensor 1518 may generate an image of the interior of the automobile 1510, including the child safety seat 1514 and the child seated therein, if present.

The sensor 1516 may transmit the driver image to the transceiver 1524. This transmission may be performed using a shared communications bus, using a dedicated physical cable, using a short-range wireless link, or in some other way.

The sensor 1518 may transmit the child safety seat image to the transceiver 1524. This transmission may be performed using a shared communications bus, using a dedicated physical cable, using a short-range wireless link, or in some other way.

The transceiver 1524 may transmit the driver image and the child safety seat image to the remote computing device 1520 using the communication link 1522. The communication link 1522 may be provided as described with respect to communication link 722.

The remote computing device 1520 may save the received driver image and child safety seat image for later processing. In some embodiments, the remote computing device 1520 may transform the driver image and/or the child safety seat image (e.g., compressing the image, transforming the image to grayscale, enhancing brightness, enhancing contrast). In some embodiments, the sensor 1516, the sensor 1518, the transceiver 1524, or some other computing device located in the automobile 1510 (e.g., the local computing device 1526) may transform the driver image and/or the child safety seat image (e.g., compressing the image, transforming the image to grayscale, enhancing brightness, enhancing contrast) prior to transmitting the driver image and/or the child safety seat image to the remote computing device 1520.

The sensor 1516, the sensor 1518, the transceiver 1524, and the remote computing device 1520 may repeat this process of image capture, transmission, and storage numerous times until a large quantity of images are stored by the remote computing device 1520. In some embodiments, the large quantity of images may be 100 images. In some embodiments, the large quantity of images may be 1,000 images. In some embodiments, the large quantity of images may be 10,000 images. In some embodiments, the large quantity of images may be 100,000 images. In some embodiments, the sensor 1516, the transceiver 1524, and the remote computing device 1520 may perform this process of image capture, transmission, and storage of the driver image independent of the similar process for the child safety seat image. Likewise, the sensor 1518, the transceiver 1524, and the remote computing device 1520 may perform this process of image capture, transmission, and storage of the child safety seat image independent of the similar process for the driver image.

One or more users may label the driver images based on predefined categories (e.g., "present" and "not present"). A user may label a driver image "present" if the image shows a driver present in the driver's seat 1511. A user may label a driver image "not present" if the image shows the driver's seat 1511 with no driver seated therein. The remote computing device 1520 may store these category labels with the images to which they pertain. In some embodiments, a user located in the automobile 1510 (e.g., the driver, a passenger) may perform the labelling prior to transmitting the corresponding driver image to the remote computing device 1520. The one or more users may label the images while the remote computing device 1520 is still waiting to finish storage of a large quantity of driver images, after completing storage of a large quantity of driver images, or at some other time.

One or more users may label the child safety seat images based on predefined categories (e.g., "present" and "not present"). A user may label a child safety seat image "present" if the image shows a child present in the child safety seat 1514. A user may label a child safety seat image "not present" if the image shows the child safety seat 1514 with no child seated therein. The remote computing device 1520 may store these category labels with the images to which they pertain. In some embodiments, a user located in the automobile 1510 (e.g., the driver, a passenger) may perform the labelling prior to transmitting the corresponding child safety seat image to the remote computing device 1520. The one or more users may label the images while the remote computing device 1520 is still waiting to finish storage of a large quantity of child safety seat images, after completing storage of a large quantity of child safety seat images, or at some other time.

Once a large quantity of driver images and associated category labels are stored by the remote computing device 1520, the remote computing device 1520 may train a neural network structure (e.g., neural network structures 600, 650) based on the driver images and corresponding labels. For example, if the images are images of the interior of the vehicle 1510 including the presence or absence of a driver's body in the driver's seat 1511, and the category labels are each selected from "present" and "not present," the remote computing device 1520 may train a neural network structure to accurately categorize the state of the driver as "present" or "not present" based on the driver's body position. For the remainder of the disclosure of this embodiment, a neural network structure so trained will be referred to as a driver presence neural network structure.

Once a large quantity of child safety seat images and associated category labels are stored by the remote computing device 1520, the remote computing device 1520 may train a neural network structure (e.g., neural network structures 600, 650) based on the child safety seat images and corresponding labels. For example, if the images are images of the interior of the vehicle 1510 including the child safety seat and the presence or absence of a child's body in the child safety seat 1514, and the category labels are each selected from "present" and "not present," the remote computing device 1520 may train a neural network structure to accurately categorize the state of the child as "present" or "not present" based on the driver's body presence. For the remainder of the disclosure of this embodiment, a neural network structure so trained will be referred to as a child presence neural network structure.

Once the remote computing device 1520 trains the driver presence neural network structure, the remote computing device 1520 may transmit parameters defining the driver presence neural network structure (also referred to herein as "neural network configuration parameters") (e.g., specification of nodes, specification of combination functions for nodes, specification of activation functions for nodes, specification of connections, specification of weights for connections) to the local transceiver 1524 using the communication link 1522. In some embodiments, the remote computing device 1520 may transmit the parameters defining the driver presence neural network structure to the local transceiver 1524 using a communication link other than communication link 1522.

Once the remote computing device 1520 trains the child presence neural network structure, the remote computing device 1520 may transmit parameters defining the child presence neural network structure (also referred to herein as "neural network configuration parameters") (e.g., specification of nodes, specification of combination functions for nodes, specification of activation functions for nodes, specification of connections, specification of weights for connections) to the local transceiver 1524 using the communication link 1522. In some embodiments, the remote computing device 1520 may transmit the parameters defining the child presence neural network structure to the local transceiver 1524 using a communication link other than communication link 1522.

After receiving the parameters defining the driver presence neural network structure from the remote computing device 1520, the local transceiver 1524 may transmit those parameters to the local computing device 1526. The local computing device 1526 may be configured to receive the parameters defining the driver presence neural network structure from the local transceiver 1524. The local computing device 1526 may also be configured to receive a driver image (as previously disclosed) from the sensor 1516. This reception from the local transceiver 1524 and the sensor 1516 may be performed using any of a variety of communication mediums, such as those described previously for communication between the sensor 1516 and the local transceiver 1524.

After receiving the parameters defining the child presence neural network structure from the remote computing device 1520, the local transceiver 1524 may transmit those parameters to the local computing device 1526. The local computing device 1526 may be configured to receive the parameters defining the child presence neural network structure from the local transceiver 1524. The local computing device 1526 may also be configured to receive a child safety seat image (as previously disclosed) from the sensor 1518. This reception from the local transceiver 1524 and the sensor 1518 may be performed using any of a variety of communication mediums, such as those described previously for communication between the sensor 1518 and the local transceiver 1524.

The local computing device 1526 may be configured to create the fully-trained driver presence neural network structure (e.g., recreate the structure in local memory) based on the parameters defining the driver presence neural network structure. Once the local computing device 1526 receives the parameters defining the driver presence neural network structure, the local computing device 1526 may provide a driver image received from the sensor 1516 as input to the driver presence neural network structure in real-time. The local computing device 1526 may thereby determine a category for the driver image (e.g., "present" or "not present") which indicates the most likely state of the driver of the automobile 1510 when the driver image was captured. If the driver image is provided to the local computing device 1526 in substantially real-time, then the local computing device 1526 may be able to determine whether the driver is in a present state or a not present state at substantially the present time.

The local computing device 1526 may be configured to create the fully-trained child presence neural network structure (e.g., recreate the structure in local memory) based on the parameters defining the child presence neural network structure. Once the local computing device 1526 receives the parameters defining the child presence neural network structure, the local computing device 1526 may provide a child safety seat image received from the sensor 1518 as input to the child presence neural network structure in real-time. The local computing device 1526 may thereby determine a category for the child safety seat image (e.g., "present" or "not present") which indicates the most likely state of the child or lack thereof in the child safety seat 1514 when the child safety seat image was captured. If the child safety seat image is provided to the local computing device 1526 in substantially real-time, then the local computing device 1526 may be able to determine whether the child is in a present state or a not present state at substantially the present time.

The local computing device 1526 may transmit the determined state of the driver (e.g., "present" or "not present") to the automobile controller 1528. This transmission to the automobile controller 1528 may be performed using any of a variety of communication mediums, such as those described previously for communication between the sensor 1516 and the local transceiver 1524.

The local computing device 1526 may transmit the determined state of the child (e.g., "present" or "not present") to the automobile controller 1528. This transmission to the automobile controller 1528 may be performed using any of a variety of communication mediums, such as those described previously for communication between the sensor 1516 and the local transceiver 1524.

The automobile controller 1528 may be configured to control one or more indicators based on the state of the driver determination received from the local computing device 1526 and based on the state of the child determination received from the local computing device 1526. For example, the automobile controller 1528 may be configured to not activate an indicator (e.g., warning light, warning audible tone) if the determined driver state is “present” while the determined child state is also “present.” Continuing the example, the automobile controller 1528 may be configured to not activate an indicator (e.g., warning light, warning audible tone) if the determined driver state is “present” while the determined child state is “not present.” Continuing the example, the automobile controller 1528 may be configured to not activate an indicator (e.g., warning light, warning audible tone) if the determined driver state is “not present” while the determined child state is also “not present.” But, continuing the example, the automobile controller 1528 may be configured to activate an indicator (e.g., warning light and warning audible tone) if the determined driver state is “not present” while the determined child state is “present.” This configuration of the automobile controller 1528 may reflect a design to alert the driver that may be at risk of accidently leaving the child in the car, which may pose a mortal risk to the child depending on various factors such as the ambient temperature outside the automobile 1510. As such, the automobile controller 1528 may be configured to activate an indicator when a high risk condition is identified through use of the driver presence neural network structure and the child presence neural network structure.

In some embodiments, the automobile controller 1528 may be configured to activate an indicator when a more specific condition is met. For example, the automobile controller 1528 may be configured to activate an indicator at time t2 when the determined driver state is “not present” while the determined child state is “present,” but only if at time t1, a time immediately preceding time t2, the determined driver state is “present” while the determined child state is also “present.” This configuration of the automobile controller 1528 may reflect a design to prevent a risk to a child in the child safety seat 1514 while also avoiding annoyance to the driver. In particular, this configuration would avoid activating the indicator during the time between when the driver first places the child in the child safety seat 1514 and when the driver himself enters the driver’s seat 1511. This configuration may thus more specifically target the high risk condition of a driver having a child in the child safety seat 1514 and inadvertently leaving the child there when after arriving at the driver’s destination.

In some embodiments, the sensor 1516 may be configured to additionally sense the presence of an adult in a passenger seat (e.g., front passenger seat) of the automobile 1510. In such embodiments, the driver images (which may be considered “adult images”) may be labelled as previously described. However, the label “present” may indicate that a driver is present in the automobile 1510, that an adult passenger is present in the automobile 1510, or that both are present in the automobile 1510. Accordingly, the label “not present” may indicate that no adult is present in the vehicle. In such embodiments, the remote computing device 1520 may train and the local computing device 1526 may use a neural network structure that determines whether an adult is present in the automobile 1510, and not more specifically whether a driver is present in the automobile 1510. Likewise, the automobile controller 1528 may control the automobile 1510 based on this determination of whether an adult is present. In some embodiments, the sensor 1518 may likewise detect the presence of an adult in the automobile 1510 (e.g., in a rear passenger seat). In such embodiments, the sensor data generated by the sensor 1518 may additionally be used to determine whether an adult is present in the automobile 1510.

Other configurations of the automobile controller 1528 to use a real-time determination based on a neural network structure may be used in accordance with various embodiments of the present disclosure.

Figure 16:
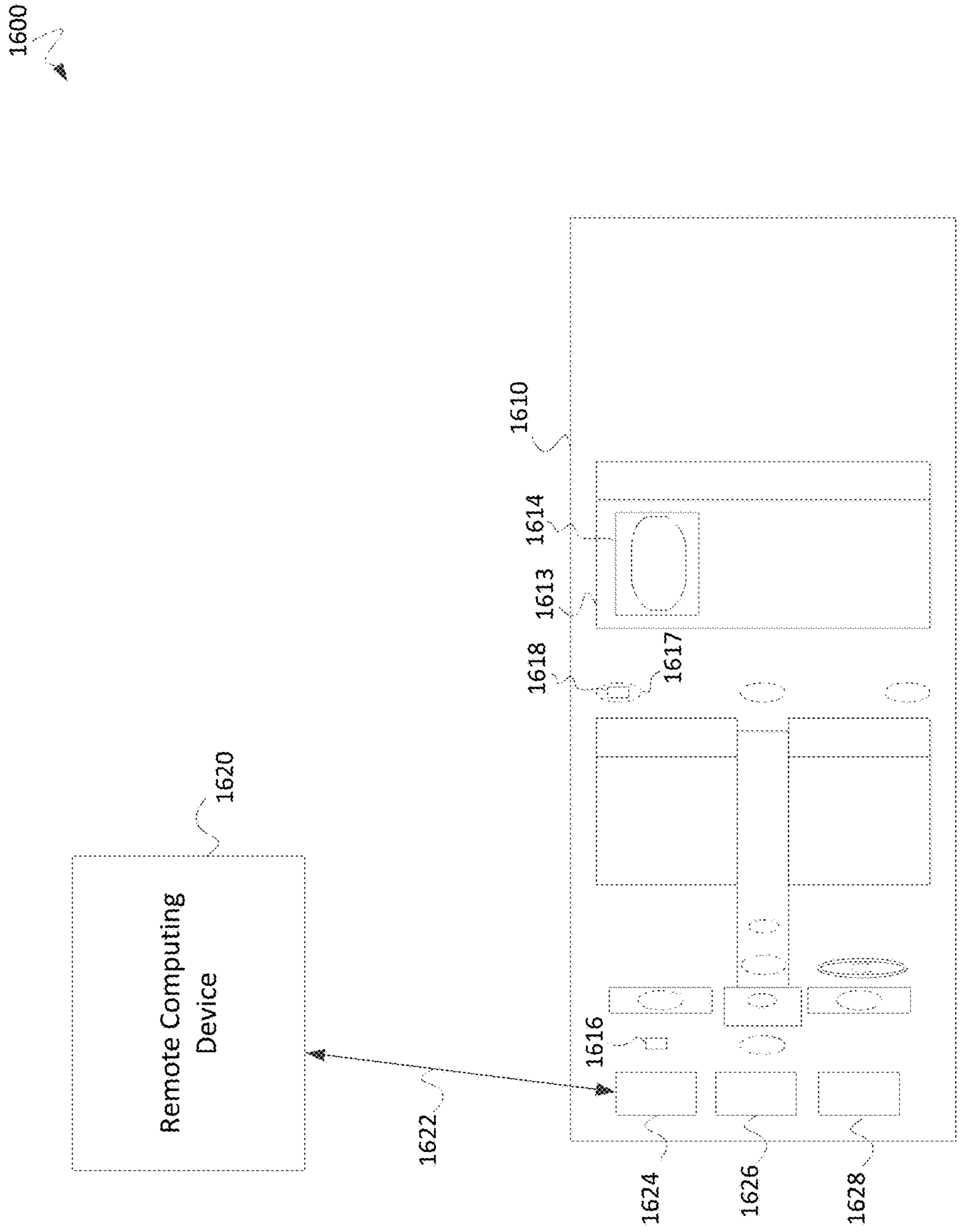
FIG. 16 is a system diagram of a system employing a neural network in an automotive environment according to some embodiments of the present disclosure.

FIG. 16 is a system diagram of a system 1600 employing a neural network in an automotive environment according to some embodiments of the present disclosure. The system 1600 includes an automobile 1610, a sensor 1616, a sensor 1618, a remote computing device 1620, a communication link 1622, a local transceiver 1624, a local computing device 1626, and an automobile controller 1628.

The automobile 1610 may be an automobile as described previously with respect to automobiles 110, 300, 400, 710, and/or 1510. In some embodiments, the automobile 1610 may be configured alert the driver of safety hazards or other pertinent conditions. For example, the automobile 1610 may include an indicator light and an audible tone to alert the driver of the automobile 1610 that the driver does not have his safety belt engaged. The automobile 1610 may include a variety of other indicator devices, including visual indicators, audible indicators, haptic indicators, electronic transmitters, etc. In some embodiments, the automobile controller 1628 may be configured to control the shifting of the automobile 1610 between different transmission gears (e.g., by sending an enabling/disabling signal to an electromechanical interlock on a gear shifter).

The automobile 1610 may further include a rear seat 1613 and a child safety seat 1614. The child safety seat 1614 may be provided as described previously with respect to child safety seat 1514.

The sensor 1616 may be an sensor capable of detecting a state of the automobile 1610.

For example, the sensor 1616 may be a sensor configured to detect a current gear (e.g., “park,” “drive,” “reverse,” “first,” “second”) of a transmission of the automobile 1610. In such an example, the sensor 1616 may be provided as an optical sensor attached to a gear shifter in the automobile 1610 and configured to detect the current gear based on the position of the gear shifter. In other cases, the sensor 1616 may be an electro-mechanical device attached to the transmission and configured to detect the current gear based on the position of one or more gear shift rods of the transmission. In other cases, the sensor 1616 may be provided as an electronic module connected to a communications bus of the automobile 1610 and configured to detect the current gear based on a signal passed on the communications bus.

As another example, the sensor 1616 may be a sensor configured to detect a current velocity of the automobile 1610. For example, the sensor 1616 may be provided as an optical sensor attached to a tire of the automobile 1610 and configured to detect the current velocity based on the rate of revolution of the tire. In other cases, the sensor 1616 may be provided as a Global Positioning System receiver and configured to detect the current velocity based on the rate of change of the position of the automobile 1610. In other cases, the sensor 1616 may be provided as an electronic module connected to a communications bus of the automobile 1610 and configured to detect the current velocity based on a signal passed on the communications bus.

As another example, the sensor 1616 may be a sensor configured to detect a current motion state of the automobile 1610, such as a "driving forward" state, a "driving in reverse" state, and a "parked" state.

The sensor 1616 may be provided in other forms to detect a state of the automobile 1610 consistent with various embodiments of the present disclosure.

The sensor 1618 may be provided in whole or in part as described previously with respect to sensors 232, 234, 460, 472, 716, 800, and/or 1518. The sensor 1618 may be provided at a location 1617, such as affixed to the interior ceiling the automobile 1610.

In some embodiments, system 1600 may employ a neural network in the following way.

The sensor 1618 may sense the position of the child seated in the child safety seat 1614. Sensor 1618 may produce sensor data based on this sensing. For example, if sensor 1618 is a video camera, then the sensor 1618 may generate an image of the interior of the automobile 1610, including the child safety seat 1614, any visible portions of the restrains of the child safety seat 1614 (e.g., belts, buckles, clips), and position of the child in the safety seat 1614, if present. The image may include the position of the child's legs, arms, torso, head, etc. and their position with respect to the child safety seat 1614 and the restraints of the child safety seat 1614.

The sensor 1618 may transmit the image to the transceiver 1624. This transmission may be performed using a shared communications bus, using a dedicated physical cable, using a short-range wireless link, or in some other way.

The transceiver 1624 may transmit the image to the remote computing device 1620 using the communication link 1622. The communication link 1622 may be provided as described with respect to communication links 722 and/or 1522.

The remote computing device 1620 may save the received image for later processing. In some embodiments, the remote computing device 1620 may transform the image (e.g., compressing the image, transforming the image to grayscale, enhancing brightness, enhancing contrast). In some embodiments, the sensor 1618, the transceiver 1624, or some other computing device located in the automobile 1610 (e.g., the local computing device 1626) may transform the image (e.g., compressing the image, transforming the image to grayscale, enhancing brightness, enhancing contrast) prior to transmitting the image to the remote computing device 1620.

The sensor 1618, the transceiver 1624, and the remote computing device 1620 may repeat this process of image capture, transmission, and storage numerous times until a large quantity of images are stored by the remote computing device 1620. In some embodiments, the large quantity of images may be 100 images. In some embodiments, the large quantity of images may be 1,000 images. In some embodiments, the large quantity of images may be 10,000 images. In some embodiments, the large quantity of images may be 100,000 images.

One or more users may label the images based on predefined categories (e.g., "restrained" and "not restrained"). A user may label an image "restrained" if the image shows a child properly restrained in the child safety seat 1614 (e.g., should, waist, and groin belts properly located, five-point buckle engaged, chest clip engaged). A user may label an image "not restrained" if the image shows the child improperly restrained in the child safety seat 1614 (e.g., five-point buckle not engaged, chest clip not engaged, shoulder belts behind the shoulders, child completely unrestrained and sitting on the front edge of the child safety seat 1614, child completely unrestrained and standing in the child safety seat 1614). The remote computing device 1620 may store these category labels with the images to which they pertain. In some embodiments, a user located in the automobile 1610 (e.g., the driver, a passenger) may perform the labelling prior to transmitting the corresponding image to the remote computing device 1620. The one or more users may label the images while the remote computing device 1620 is still waiting to finish storage of a large quantity of images, after completing storage of a large quantity of images, or at some other time.

Once a large quantity of images and associated category labels are stored by the remote computing device 1620, the remote computing device 1620 may train a neural network structure (e.g., neural network structures 600, 650) based on the images and corresponding labels. For example, if the images are images of the interior of the vehicle 1610 including the child safety seat 1614, any visible portions of the restrains of the child safety seat 1614 (e.g., belts, buckles, clips), and the position of the child's body (e.g., legs, arms, torso, head, etc.), and the category labels are each selected from "restrained" and "not restrained," then the remote computing device 1620 may train a neural network structure to accurately categorize the state of the child as "restrained" or "not restrained" based on the child's body position.

Once the remote computing device 1620 trains the neural network structure, the remote computing device 1620 may transmit parameters defining the neural network structure (also referred to herein as "neural network configuration parameters") (e.g., specification of nodes, specification of combination functions for nodes, specification of activation functions for nodes, specification of connections, specification of weights for connections) to the local transceiver 1624 using the communication link 1622. In some embodiments, the remote computing device 1620 may transmit the parameters defining the neural network structure to the local transceiver 1624 using a communication link other than communication link 1622.

After receiving the parameters defining the neural network structure from the remote computing device 1620, the local transceiver 1624 may transmit those parameters to the local computing device 1626. The local computing device 1626 may be configured to receive the parameters defining the neural network structure from the local transceiver 1624. The local computing device 1626 may also be configured to receive a child safety seat image (as previously disclosed) from the sensor 1618. This reception from the local transceiver 1624 and the sensor 1618 may be performed using any of a variety of communication mediums, such as those described previously for communication between the sensor 1618 and the local transceiver 1624.

The local computing device 1626 may be configured to create the fully-trained neural network structure (e.g., recreate the structure in local memory) based on the parameters defining the neural network structure. Once the local computing device 1626 receives the parameters defining the neural network structure, the local computing device 1626 may provide a child safety seat image received from the sensor 1618 as input to the neural network structure in real-time. The local computing device 1626 may thereby determine a category for the child safety seat image (e.g., "restrained" or "not restrained") which indicates the most likely state of the child in the child safety seat 1614 when the child safety seat image was captured. If the child safety seat image is provided to the local computing device 1626 in substantially real-time, then the local computing device 1626 may be able to determine whether the child is in a restrained state or a not restrained state at substantially the present time.

The local computing device 1626 may transmit the determined state of the child (e.g., "restrained" or "not restrained") to the automobile controller 1628. This transmission to the automobile controller 1628 may be performed using any of a variety of communication mediums, such as those described previously for communication between the sensor 1618 and the local transceiver 1624.

The automobile controller 1628 may be configured to receive the state of the child determination from the local computing device 1626, and a state of the automobile 1610 determination (e.g., a current gear, a current velocity) from the sensor 1616. This reception from the local computing device 1626 and the sensor 1616 may be performed using any of a variety of communication mediums, such as those described previously for communication between the sensor 1618 and the local transceiver 1624.

In some embodiments, the automobile controller 1628 may be configured to control the operation of the automobile 1610 based on the state of the child determination received from the local computing device 1526 and based on the state of the automobile 1610 determination received from the sensor 1616. For example, the automobile controller 1628 may be configured to transmit a "disable" command to an electromechanical interlock on a gear shifter of the automobile 1610 if the determined child state is "not restrained" and the vehicle state is "in park gear." Continuing the example, the automobile controller 1628 may be configured to transmit an "enable" command to an electromechanical interlock on a gear shifter of the automobile 1610 if the determined child state is "not restrained" and the vehicle state is "in drive gear." Continuing the example, the automobile controller 1628 may be configured to transmit an "enable" command to an electromechanical interlock on a gear shifter of the automobile 1610 if the determined child state is "restrained" and the vehicle state is "in park gear." Continuing the example, the automobile controller 1628 may be configured to transmit an "enable" command to an electromechanical interlock on a gear shifter of the automobile 1610 if the determined child state is "restrained" and the vehicle state is "in drive gear." This configuration of the automobile controller 1628 may reflect a design to prevent the driver from operating the automobile 1610 while having forgotten to restrain the child in the child safety seat 1614, which may pose a mortal risk to the child in the case of a collision of the automobile 1610 with an element in its environment. As such, the automobile controller 1628 may be configured to prevent a high risk condition as identified through use of the neural network structure.

In some embodiments, the automobile controller 1628 may be configured to control one or more indicators based on the state of the child determination received from the local computing device 1526 and based on the state of the automobile 1610 determination received from the sensor 1616. For example, the automobile controller 1628 may be configured to not activate an indicator (e.g., warning light, warning audible tone) if the determined child state is "restrained" and the vehicle state is "in drive gear." Continuing the example, the automobile controller 1628 may be configured to not activate an indicator (e.g., warning light, warning audible tone) if the determined child state is "restrained" and the vehicle state is "in park gear." Continuing the example, the automobile controller 1628 may be configured to activate an indicator (e.g., warning light, warning audible tone) if the determined child state is "not restrained" and the vehicle state is "in drive gear." Continuing the example, the automobile controller 1628 may be configured to not activate an indicator (e.g., warning light, warning audible tone) if the determined child state is "not restrained" and the vehicle state is "in park gear." This configuration of the automobile controller 1628 may reflect a design to alert the driver that may be at risk of operating the automobile 1610 while having forgotten to restrain the child in the child safety seat 1614, which may pose a mortal risk to the child in the case of a collision of the automobile 1610 with an element in its environment. As such, the automobile controller 1628 may be configured to activate an indicator when a high risk condition is identified through use of the neural network structure.

As another example, the automobile controller 1628 may be configured to not activate an indicator (e.g., warning light, warning audible tone) if the determined child state is "restrained" and the vehicle state is a velocity of zero. Continuing the example, the automobile controller 1628 may be configured to not activate an indicator (e.g., warning light, warning audible tone) if the determined child state is "restrained" and the vehicle state is a velocity other than zero. Continuing the example, the automobile controller 1628 may be configured to activate an indicator (e.g., warning light, warning audible tone) if the determined child state is "not restrained" and the vehicle state is a velocity other than zero. Continuing the example, the automobile controller 1628 may be configured to not activate an indicator (e.g., warning light, warning audible tone) if the determined child state is "not restrained" and the vehicle state is "a velocity of zero. This configuration of the automobile controller 1628 may reflect a design to alert the driver that may be at risk of operating the automobile 1610 while having forgotten to restrain the child in the child safety seat 1614, which may pose a mortal risk to the child in the case of a collision of the automobile 1610 with an element in its environment. As such, the automobile controller 1628 may be configured to activate an indicator when a high risk condition is identified through use of the neural network structure.

Other configurations of the automobile controller 1628 to use a real-time determination based on a neural network structure may be used in accordance with various embodiments of the present disclosure.

In some embodiments of the present disclosure, the remote computing device 1520 may be configured to train a single neural network structure for categorizing both a driver state and a child state. For example, if the driver image (as captured by the sensor 1516 and potentially compressed) is a 100×100 pixel image, then the grayscale pixel values for the driver image may be serially provided to the first 10,000 input nodes of the neural network structure (e.g., as described with respect to neural network structure 650). If the child safety seat image (as captured by the sensor 1518 and potentially compressed) is a 100×100 pixel image, then the grayscale pixel values for the child safety seat image may be serially provided to the next 10,000 input nodes of the neural network structure. The output nodes of the neural network structure may then correspond to the following states: "driver and child both present," "driver and child both not present," "driver present but child not present," and "driver not present but child present." In such embodiments, the remote computing device 1520 may train a single neural network structure according to this configuration, and the local computing device 1526 may use a single neural network structure. The automobile controller may then activate an indicator for only a subset of these driver/child states (e.g., only for "driver not present but child present."). Other configurations of providing sensor images as input to a neural network may be used in various embodiments of the present disclosure.

In some embodiments, the system 1500 may use only a single sensor to sense the presence or absence of both the driver and the child. For example, a sensor affixed to the interior ceiling of the automobile at position 358 (see FIG. 3) may be capable of sensing both the presence or absence of the driver in the driver's seat 1511 and the presence or absence of the child in the child safety seat 1514 with a single image. In such embodiments, the remote computing device 1520 may train only a single neural network structure, and the local computing device 1526 may use only a single neural network structure.

Figure 17:
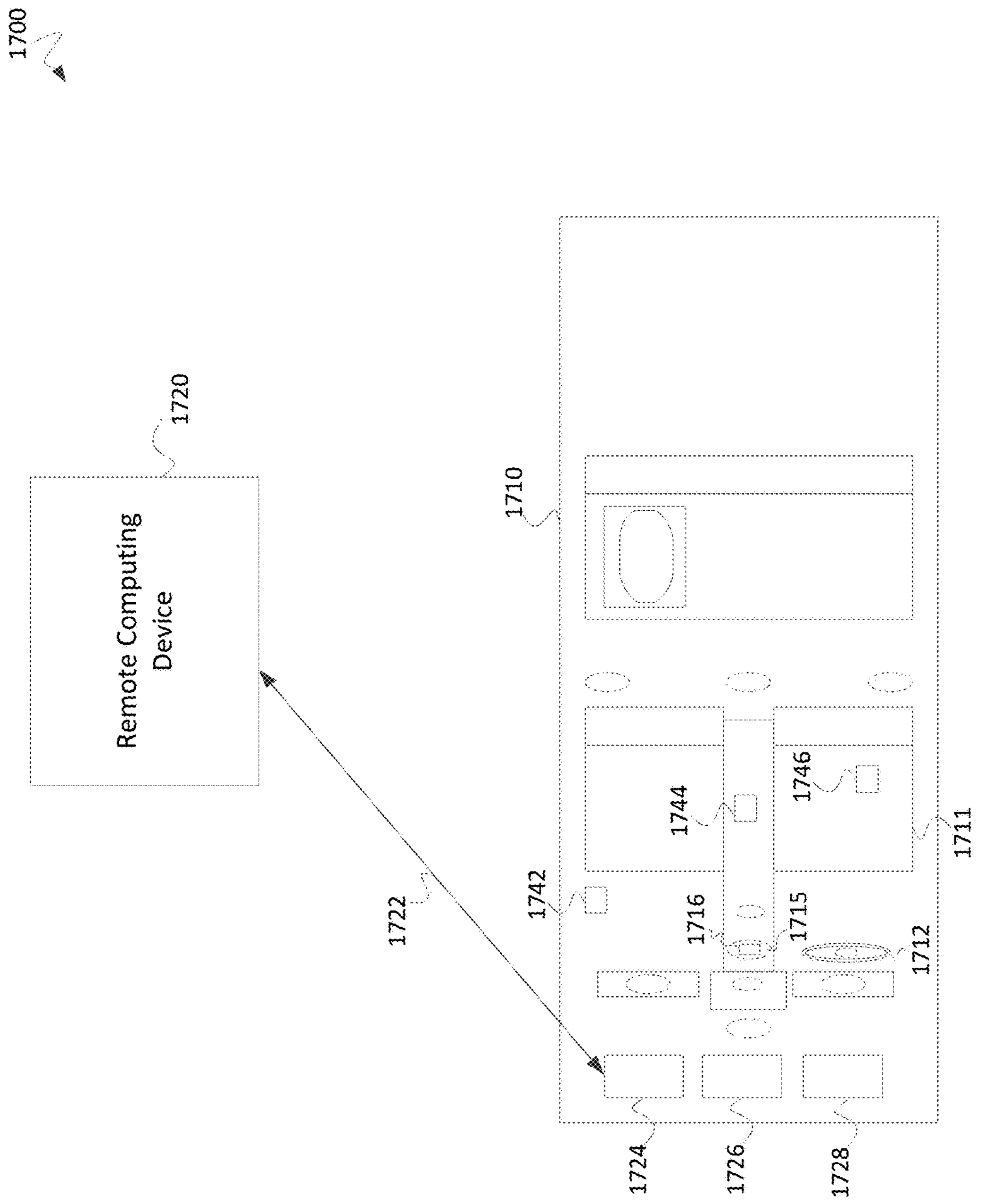
FIG. 17 is a system diagram of a system employing a neural network in an automotive environment according to some embodiments of the present disclosure.

FIG. 17 is a system diagram of a system 1700 employing a neural network in an automotive environment according to some embodiments of the present disclosure. The system 1700 includes an automobile 1710, a sensor 1716, a remote computing device 1720, a communication link 1722, a local transceiver 1724, a local computing device 1726, and an automobile controller 1728.

The automobile 1710 may be an automobile as described previously with respect to automobiles 110, 300, 400, 710, 1510, and/or 1610. The automobile 1710 may be operated by a driver seated in driver's seat 1711. The driver may operate the automobile 1710 using the steering wheel 1712 and other control devices. In some embodiments, the automobile 1710 may be configured alert the driver of safety hazards or other pertinent conditions. For example, the automobile 1710 may include an indicator light and an audible tone to alert the driver that the driver does not have his safety belt engaged. The automobile 1710 may include a variety of other indicator devices, including visual indicators, audible indicators, haptic indicators, electronic transmitters, etc.

The sensor 1716 may be provided in whole or in part as described previously with respect to sensors 232, 234, 460, 472, 716, 1516, and/or 1616. The sensor 1716 may be provided at a location 1715, such as in a location built into or in the vicinity of dome light on the interior ceiling of the automobile 1710.

In some embodiments, system 1700 may employ a neural network in the following way.

Sensor 1716 may sense the position of the items present in the interior of the automobile 1710. Sensor 1716 may produce sensor data based on this sensing. For example, if sensor 1716 is a video camera, the sensor 1716 may generate an image of the interior of the automobile 1710, including the seats, steering wheel, center console, and any non-permanent items present in the automobile 1710. For instance, the image generated by the sensor 1716 may show the driver's seat 1711 as well as a wallet 1746 resting on the driver's seat 1711. The image may also show a can of soda 1744 resting on the center console, and an umbrella 1742 resting on the floor. In this way, the sensor 1716 may sense both the standard configuration of the interior of the automobile 1710 as well as items abandoned in the interior of the automobile 1710 by some previous driver.

The sensor 1716 may transmit a an image of the interior of the automobile 1710 to transceiver 1724. This transmission may be performed using a shared communications bus, using a dedicated physical cable, using a short-range wireless link, or in some other way.

The transceiver 1724 may transmit the image to the remote computing device 1720 using the communication link 1722. The communication link 1722 may be provided described herein with respect to communication links 722, 1522, and/or 1622.

The remote computing device 1720 may save the received image for later processing. In some embodiments, the remote computing device 1720 may transform the image (e.g., compressing the image, transforming the image to grayscale, enhancing brightness, enhancing contrast). In some embodiments, the sensor 1716, the transceiver 1724, or some other computing device located in the automobile 1710 (e.g., the local computing device 1726) may transform the image (e.g., compressing the image, transforming the image to grayscale, enhancing brightness, enhancing contrast) prior to transmitting the image to the remote computing device 1720.

The sensor 1716, the transceiver 1724, and the remote computing device 1720 may repeat this process of image capture, transmission, and storage numerous times until a large quantity of images are stored by the remote computing device 1720. In some embodiments, the large quantity of images may be 100 images. In some embodiments, the large quantity of images may be 1,000 images. In some embodiments, the large quantity of images may be 10,000 images. In some embodiments, the large quantity of images may be 100,000 images.

One or more users may label the images based on predefined categories (e.g., "no abandoned items"; "abandoned items"; "wallet in seat"; "umbrella on floor"; "beverage in center console"). The remote computing device 1720 may store these category labels with the images to which they pertain. In some embodiments, a user located in the automobile 1710 (e.g., the driver, a passenger) may perform the labelling prior to transmitting the corresponding image to the remote computing device 1720. The one or more users may label the images while the remote computing device 1720 is still waiting to finish storage a large quantity of images, after completing storage of a large quantity of images, or at some other time.

Once a large quantity of images and associated category labels are stored by the remote computing device 1720, the remote computing device 1720 may train a neural network structure (e.g., neural network structures 600, 650) based on the images and corresponding labels. For example, if the images are images of the interior of the vehicle 710 and the category labels are each selected from "abandoned items" and "no abandoned items," the remote computing device 1720 may train a neural network structure to accurately categorize the state of the automobile 1710 as having "abandoned items" or having "no abandoned items" based on the images of the interior of the automobile 1710.

Once the remote computing device 1720 trains the neural network structure, the remote computing device 1720 may transmit parameters defining the neural network structure (also referred to herein as "neural network configuration parameters") (e.g., specification of nodes, specification of combination functions for nodes, specification of activation functions for nodes, specification of connections, specification of weights for connections) to the local transceiver 1724 using the communication link 1722. In some embodiments, the remote computing device 1720 may transmit the parameters defining the neural network structure to the local transceiver 1724 using a communication link other than communication link 1722.

The local transceiver 1724 may transmit the parameters defining the neural network structure to the local computing device 1726. The local computing device 1726 may be configured to receive the parameters defining the neural network structure from the local transceiver 1724. The local computing device 1726 may also be configured to receive an image of the interior of the automobile 1710 from the sensor 1716. This reception from the local transceiver 1724 and the sensor 1716 may be performed using any of a variety of communication mediums, such as those described previously for communication between the sensor 1716 and the local transceiver 1724.

The local computing device 1726 may be configured to create the fully-trained neural network structure (e.g., recreate the structure in local memory) based on the parameters defining the neural network structure. Once the local computing device 1726 receives the parameters defining the neural network structure, the local computing device 1726 may provide an image of the interior of the automobile 1710 as input to the neural network structure in real-time. The local computing device 1726 may thereby determine a category for the image of the interior of the automobile 1710 (e.g., "abandoned items" or "no abandoned items") which indicates the most likely state of the automobile 1710 when the image was captured. If the images of the interior of the automobile 1710 are provided to the local computing device 1726 in substantially real-time, then the local computing device 1726 may be able to determine whether the automobile 1710 contains abandoned items or does not contain abandoned items at substantially the present time.

The local computing device 1726 may transmit the determined state of the automobile (e.g., "abandoned items" or "no abandoned items") to the automobile controller 1728. This transmission to the automobile controller 1728 may be performed using any of a variety of communication mediums, such as those described previously for communication between the sensor 1716 and the local transceiver 1724.

The automobile controller 1728 may be configured to control one or more indicators based on the state of the automobile determination received from the local computing device 1726. For example, the automobile controller 1728 may be configured to not activate an indicator (e.g., warning light, warning audible tone) if the determined automobile state is "no abandoned items." Continuing the example, the automobile controller 1728 may be configured to not activate an indicator (e.g., warning light, warning audible tone) if the determined automobile state is "abandoned items."

In some embodiments, the automobile controller 1728 may be configured to activate an indicator only if the determined automobile state is "abandoned items" and if a user input is received. For instance, a command may be received from a technician on a user interface (e.g., an infotainment display, a smartphone connected via short-range wireless communications) indicating that the automobile controller 1728 should display an indicator of the state of the automobile 1728. In such a case, the automobile controller 1728 may only activate the indicator after receiving the user input and if the determined automobile state is "abandoned items."

In some embodiments, the user input may be received only after a driver returns the automobile 1710 to a car rental service or a rideshare parking location. In some embodiments, the activation of the indicator may be instigated not by a user input but by an automated input (e.g., electronic signal received by a transponder at a rental service garage, electronic signal received by a transponder at a rideshare parking location, electronic signal generated on a periodic basis by a device inside the automobile 1710).

In some embodiments, the user input and/or automated input may be received by the local computing device 1726. In such embodiments, the user input and/or automated input may control whether the local computing device 1726 provides an image from the sensor 1716 as an input to the neural network structure.

In some embodiments of the present disclosure, different categories than those just described for system 1700 may be used to categorize a state of the automobile. For example, the system 1700 may include a neural network structure trained to determine an automobile state as one of the following: "no abandoned items," "wallet in seat," "beverage in cupholder," "umbrella on floor," and "bag in backseat foot well." In such embodiments, the images used by the remote computing device 1720 to train the neural network structure may be labeled with these categories so that the trained neural network structure may accurately determine the automobile's state from these categories. In such embodiments, the automobile controller 1728 may be configured to activate an indicator for only some of the automobile states (e.g., for "wallet in seat," "beverage in cupholder," "umbrella on floor," and "bag in backseat foot well" but not for "no abandoned items").

Other categories of automobile state are possible in various embodiments of the present disclosure. For example, the system 1700 may include a neural network structure trained to determine an automobile state as one of the following: "normal state," "driver's seat reclined," "front passenger seat reclined," "steering wheel lowered below normal," "steering wheel elevated above normal," "driver's side footwell soiled," "passenger's side footwell soiled," "trash," "no trash," "acceptable" (e.g., to represent that the automobile is clean, empty, free of abandoned items, etc.; to represent that the automobile is in an acceptable condition to issue to a new driver), and "not acceptable" (e.g., to represent that the automobile is dirty, occupied, contains abandoned items, etc.; to represent that the automobile is not in an acceptable condition to issue to a new driver). Other categories of automobile state may be used in accordance with various embodiments of the present disclosure.

In some embodiments of the present disclosure, a system may be provided that combines the sensing and control techniques of more than one of the embodiments described herein. For example, a system may be provided with sensors 1516 and 1518 (see FIG. 15). The remote computing device (e.g., remote computing device 720, 1520, or 1620) may then use the images from the sensor 1516 to train a driver state neural network structure (e.g., as described with respect to the remote computing device 720). The remote computing device (e.g., remote computing device 720, 1520, or 1620) may then use the images from the sensor 1516 to train a driver presence neural network structure (e.g., as described with respect to the remote computing device 1520). The remote computing device (e.g., remote computing device 720, 1520, or 1620) may then use the images from the sensor 1518 to train a child presence neural network structure (e.g., as described with respect to the remote computing device 1520). The remote computing device (e.g., remote computing device 720, 1520, or 1620) may then use the images from the sensor 1518 to train a child state neural network structure (e.g., as described with respect to the remote computing device 1620). The remote computing device may then provide each of these neural network structures to the local computing device, which may use them in real-time to make each of the determinations as descried with respect to local computing devices 726, 1526, and 1626. The automobile controller may then be able to perform each of the control techniques described with respect to automobile controllers 728, 1528, and 1628 (e.g., driving mode control, indicator control, gearshift control). Such a configuration may be advantageous as leveraging a small number of sensors and embedded computing resources in the automobile in order to provide multiple applications of neural network in the automobile environment.

Figure 18:
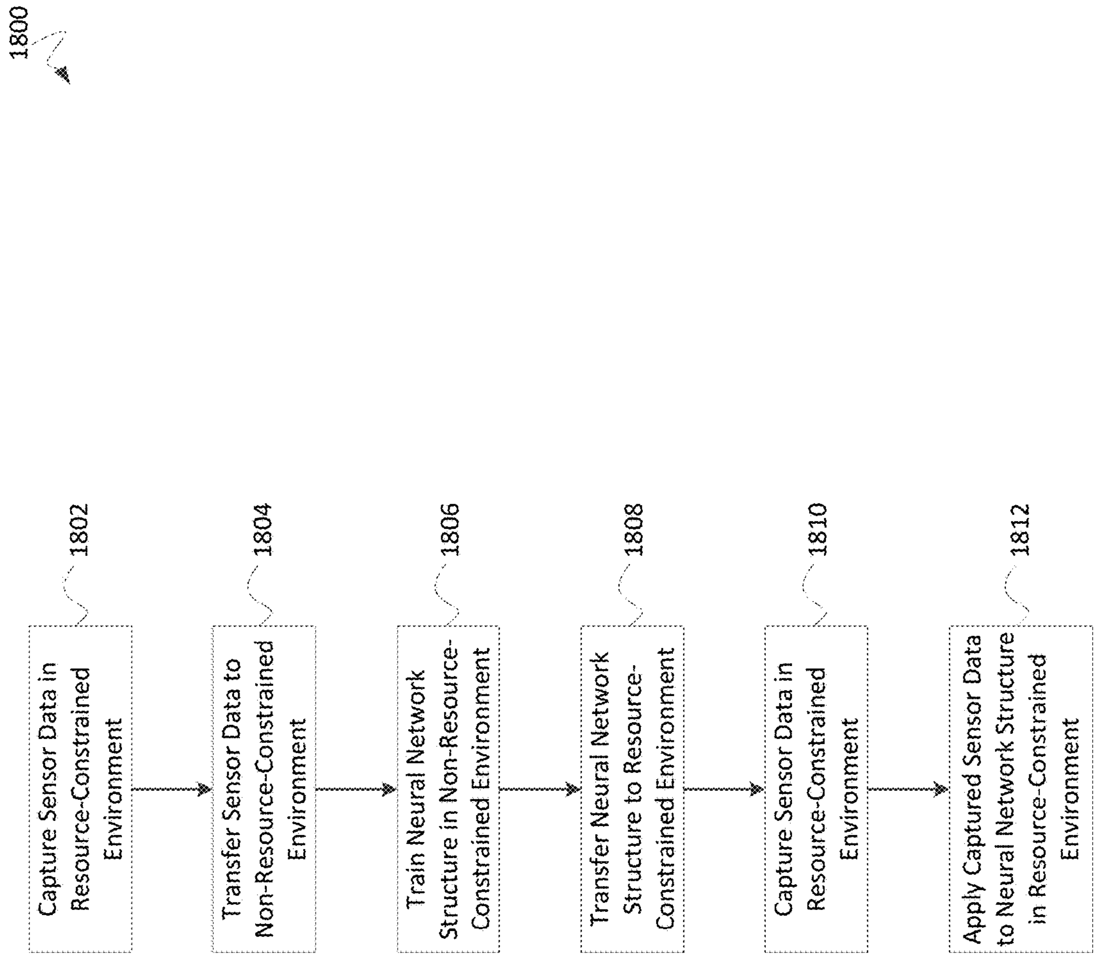
FIG. 18 is a flowchart of a process for employing a neural network in a resource-constrained environment according to some embodiments of the present disclosure.

FIG. 18 is a flowchart of a process for employing a neural network in a resource-constrained environment according to some embodiments of the present disclosure.

At block 1802, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 1804, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 1806, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 1806.

At block 1808, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 808 is a transfer to the same resource-constrained environment from which the sensor data was transferred at block 1804 (e.g., to a same automobile, to a same mobile device, to a same embedded device). In some embodiments, the transfer to the resource-constrained environment at block 1808 is a transfer to a different resource-constrained environment from which the sensor data was transferred at block 1804 (e.g., to a different automobile, to a different mobile device, to a different embedded device).

At block 1810, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 1810 is captured by the same one or more sensors used to capture sensor data at block 1802 (e.g., a same video camera, a same infrared camera). In some embodiments, the sensor data captured at block 1810 is captured by a different one or more sensors used to capture sensor data at block 1802 (e.g., a different video camera, a different infrared camera).

At block 1812, the sensor data captured at block 1810 is applied to the neural network structure in the resource-constrained environment. In some embodiments, block 1812 may include providing the sensor data captured at block 1810 as input to the neural network structure.

Figure 19:
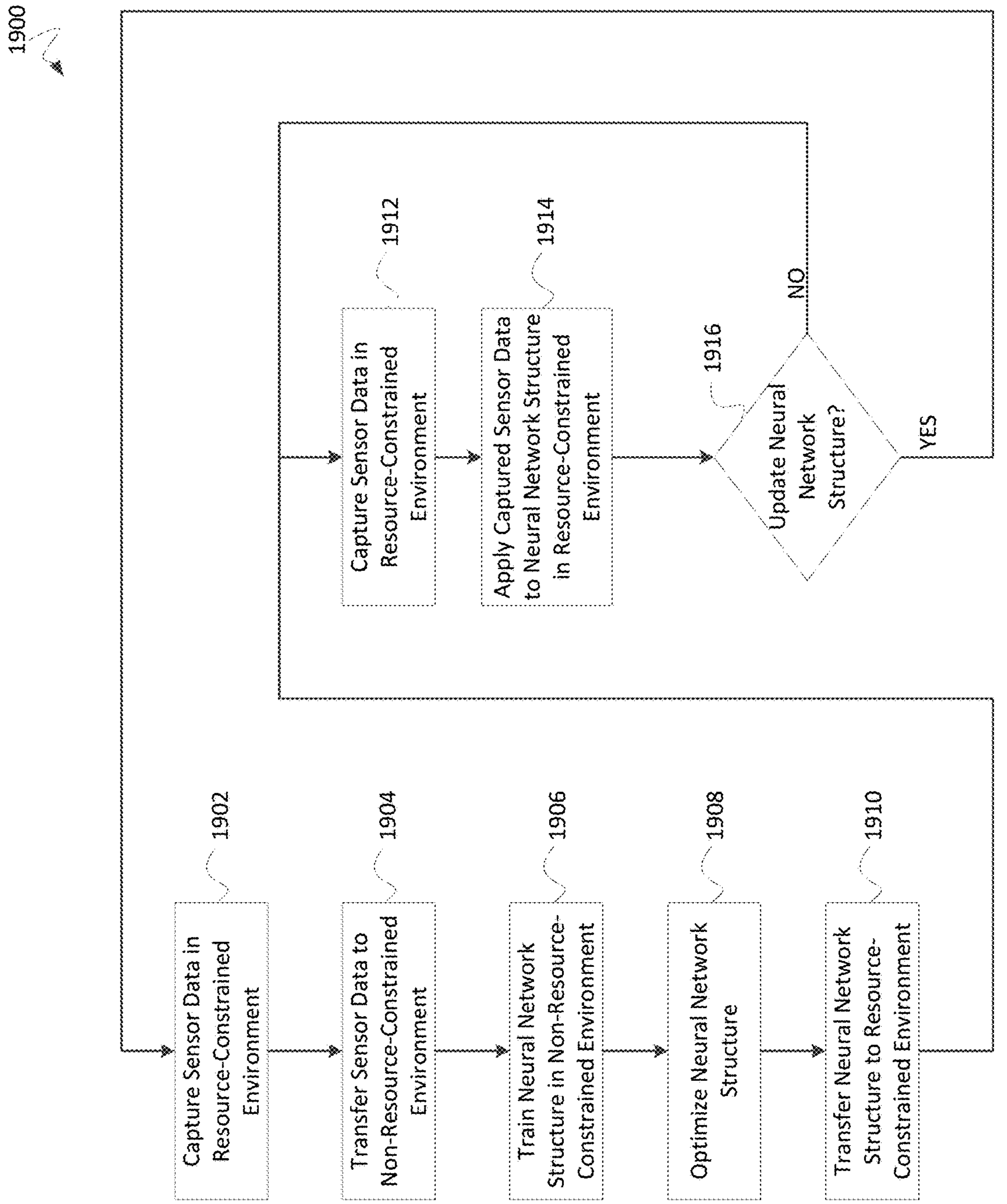
FIG. 19 is a flowchart of a process for employing a neural network in a resource-constrained environment according to some embodiments of the present disclosure.

FIG. 19 is a flowchart of a process 1900 for employing a neural network in a resource-constrained environment according to some embodiments of the present disclosure.

At block 1902, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 1904, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 1906, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 1906.

At block 1908, the neural network structure is optimized. In some embodiments, block 1908 may include reducing a number of nodes in the neural network structure. In some embodiments, block 1908 may include reducing a number of connections in the neural network structure. In some embodiments, block 1908 may include reducing a file size of a file storing parameters defining the neural network structure.

At block 1910, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 1910 is a transfer to the same resource-constrained environment from which the sensor data was transferred at block 1904 (e.g., to a same automobile, to a same mobile device, to a same embedded device). In some embodiments, the transfer to the resource-constrained environment at block 1910 is a transfer to a different resource-constrained environment from which the sensor data was transferred at block 1904 (e.g., to a different automobile, to a different mobile device, to a different embedded device).

At block 1912, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 1912 is captured by the same one or more sensors used to capture sensor data at block 1902 (e.g., a same video camera, a same infrared camera). In some embodiments, the sensor data captured at block 1912 is captured by a different one or more sensors used to capture sensor data at block 1902 (e.g., a different video camera, a different infrared camera).

At block 1914, the sensor data captured at block 1912 is applied to the neural network structure in the resource-constrained environment. In some embodiments, block 1914 may include providing the sensor data captured at block 1912 as input to the neural network structure.

At block 1916, a determination is made as to whether the neural network structure is to be updated. In some embodiments, block 1916 may include determining if the accuracy of the application of the neural network structure at block 1914 has dropped below a threshold. In some embodiments, block 1916 may include determining if the application of the neural network structure at block 1914 failed to sufficiently distinguish between two categories of input sensor data (e.g. a "safe driving" image is indistinguishable from an "unsafe driving" image). In some embodiments, block 1916 may include determining that a specified period of time has elapsed since the neural network structure was transferred to the resource constrained environment as part of block 1910.

If the determination at block 1916 results in a determination that the neural network structure is not to be updated, then process 1900 continues at blocks 1912 and 1914 with the further capture of sensor data and further application of the neural network structure.

If the determination at block 1916 results in a determination that the neural network structure is to be updated, then process 1900 continues at block 1902 with the capture of additional sensor data. In some embodiments, determination at block 1916 that the neural network structure is to be updated may result in a new neural network structure being trained (e.g., at a new iteration of block 1906) based on new sensor data (e.g., sensor data captured at a new iteration of block 1902). In some embodiments, determination at block 1916 that the neural network structure is to be updated may result in an update being determined for the same neural network structure (e.g., a modification to the weights for one or more connections for the neural network structure trained in a previous iteration of the block 1906).

Figure 20:
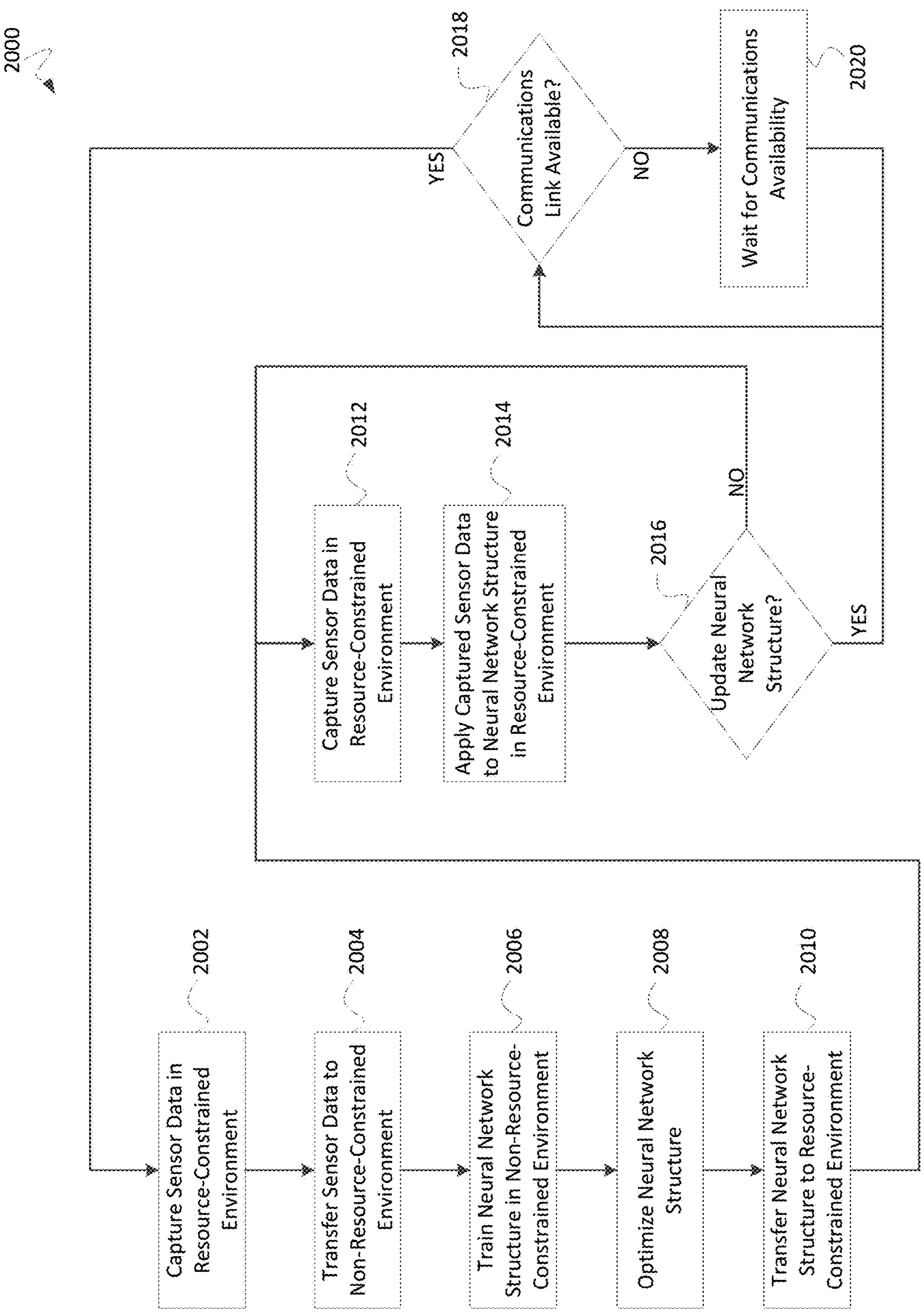
FIG. 20 is a flowchart of a process for employing a neural network in a resource-constrained environment according to some embodiments of the present disclosure.

FIG. 20 is a flowchart of a process 2000 for employing a neural network in a resource-constrained environment according to some embodiments of the present disclosure.

At block 2002, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 2004, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2006, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2006.

At block 2008, the neural network structure is optimized. In some embodiments, block 2008 may include reducing a number of nodes in the neural network structure. In some embodiments, block 2008 may include reducing a number of connections in the neural network structure.

At block 2010, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2010 is a transfer to the same resource-constrained environment from which the sensor data was transferred at block 2004 (e.g., to a same automobile, to a same mobile device, to a same embedded device). In some embodiments, the transfer to the resource-constrained environment at block 2010 is a transfer to a different resource-constrained environment from which the sensor data was transferred at block 2004 (e.g., to a different automobile, to a different mobile device, to a different embedded device).

At block 2012, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2012 is captured by the same one or more sensors used to capture sensor data at block 2002 (e.g., a same video camera, a same infrared camera). In some embodiments, the sensor data captured at block 2012 is captured by a different one or more sensors used to capture sensor data at block 2002 (e.g., a different video camera, a different infrared camera).

At block 2014, the sensor data captured at block 2012 is applied to the neural network structure in the resource-constrained environment. In some embodiments, block 2014 may include providing the sensor data captured at block 2012 as input to the neural network structure.

At block 2016, a determination is made as to whether the neural network structure is to be updated. In some embodiments, block 2016 may include determining if the accuracy of the application of the neural network structure at block 2014 has dropped below a threshold. In some embodiments, block 2016 may include determining if the application of the neural network structure at block 2014 failed to sufficiently distinguish between two categories of input sensor data (e.g. a "safe driving" image is indistinguishable from an "unsafe driving" image). In some embodiments, block 2016 may include determining that a specified period of time has elapsed since the neural network structure was transferred to the resource constrained environment as part of block 2010.

If the determination at block 2016 results in a determination that the neural network structure is not to be updated, then process 2000 continues at blocks 2012 and 2014 with the further capture of sensor data and further application of the neural network structure.

If the determination at block 2016 results in a determination that the neural network structure is to be updated, then process 2000 continues at block 2018.

At block 2018, a determination is made as to whether a communication link is available. In some embodiments, the block 2018 may include determining whether an intermittent wireless communication link is presently available between the resource-constrained environment and the non-resource-constrained environment.

If the determination at block 2018 results in a determination that a communication link is not available, then the process 2000 continues at the block 2020. At block 2020, waiting is performed for the availability of a communications link. In some embodiments, waiting is performed for a predefined period of time before again proceeding to block 2018. In some embodiments, waiting is performed indefinitely until an interrupt signal is received, at which point the process 2000 proceeds again to block 2018.

If the determination at block 2018 results in a determination that a communication link is available, then the process 2000 continues at block 2002 with the capture of additional sensor data. In some embodiments, determination at block 2018 that a communications link is available may result in a new neural network structure being trained (e.g., at a new iteration of block 2006) based on new sensor data (e.g., sensor data captured at a new iteration of block 2002). In some embodiments, determination at block 2016 that the neural network structure is to be updated may result in an update being determined for the same neural network structure (e.g., a modification to the weights for one or more connections for the neural network structure trained in a previous iteration of the block 2008).

Process 2000 may be modified in accordance with various embodiments of the present disclosure. For example, in some embodiments, the determination of whether a communications link is available (e.g., block 2018) may be performed after block 2002 and before block 2004, and/or after block 2008 and before block 2010.

In some embodiments, a determination at block 2018 that a communication link is available may result skipping execution of the block 2002 and continuing instead to execution of the block 2004. In such embodiments, the execution of the block 2004 may include transferring outlier sensor data, previously captured and stored in the resource-constrained environment, to the non-resource-constrained environment. In such embodiments, the outlier sensor data may include sensor data that could not be categorized to a high degree of confidence during execution of the block 2014. In such embodiments, the subsequent execution of the block 2006 may include updating the neural network structure using the outlier sensor data in addition to other sensor data (e.g., the sensor data previously used to train the neural network structure during the a previous execution of the block 2006).

Figure 21:
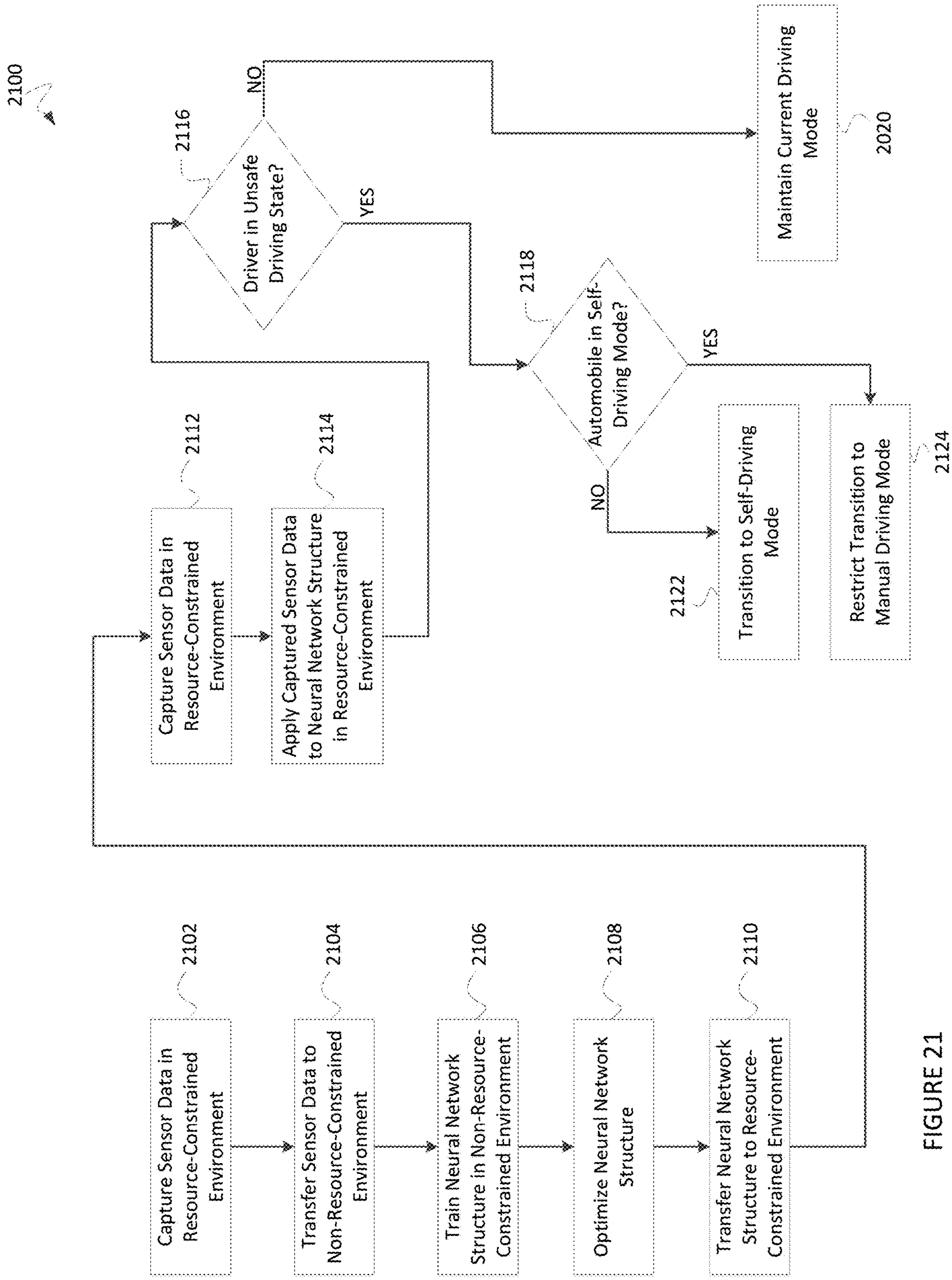
FIG. 21 is a flowchart of a process for employing a neural network in an automotive environment according to some embodiments of the present disclosure.

FIG. 21 is a flowchart of a process 2100 for employing a neural network in an automotive environment according to some embodiments of the present disclosure.

At block 2102, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 2104, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2106, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2106.

At block 2108, the neural network structure is optimized. In some embodiments, block 2108 may include reducing a number of nodes in the neural network structure. In some embodiments, block 2108 may include reducing a number of connections in the neural network structure.

At block 2110, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2110 is a transfer to the same resource-constrained environment from which the sensor data was transferred at block 2104 (e.g., to a same automobile, to a same mobile device, to a same embedded device). In some embodiments, the transfer to the resource-constrained environment at block 2110 is a transfer to a different resource-constrained environment from which the sensor data was transferred at block 2104 (e.g., to a different automobile, to a different mobile device, to a different embedded device).

At block 2112, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2112 is captured by the same one or more sensors used to capture sensor data at block 2102 (e.g., a same video camera, a same infrared camera). In some embodiments, the sensor data captured at block 2112 is captured by a different one or more sensors used to capture sensor data at block 2102 (e.g., a different video camera, a different infrared camera).

At block 2114, the sensor data captured at block 2112 is applied to the neural network structure in the resource-constrained environment. In some embodiments, block 2114 may include providing the sensor data captured at block 2112 as input to the neural network structure.

At block 2116, a determination is made as to whether a driver of the automobile is in an unsafe driving state. The determination at block 2116 may be performed based on an output of the application of the neural network structure to the captured sensor data at the block 2114.

If the determination at block 2116 results in a determination that the driver is in an unsafe driving state, then the process continues at block 2118.

At the block 2118, a determination is made as to whether the automobile is presently in a self-driving mode. If the determination at block 2118 results in a determination that automobile is presently in a self-driving mode, then the process continues at block 2124. At block 2124, the automobile is restricted from transitioning from the self-driving mode to a manual driving mode. If the determination at block 2118 results in a determination that automobile is not presently in a self-driving mode, then the process continues at block 2122. At block 2122, the automobile is transitioned to a self-driving mode (e.g., from a manual driving mode).

If the determination at block 2116 results in a determination that the driver is not in an unsafe driving state, then the process continues at block 2120.

At the block 2120, the automobile maintains its current driving mode.

Figure 22:
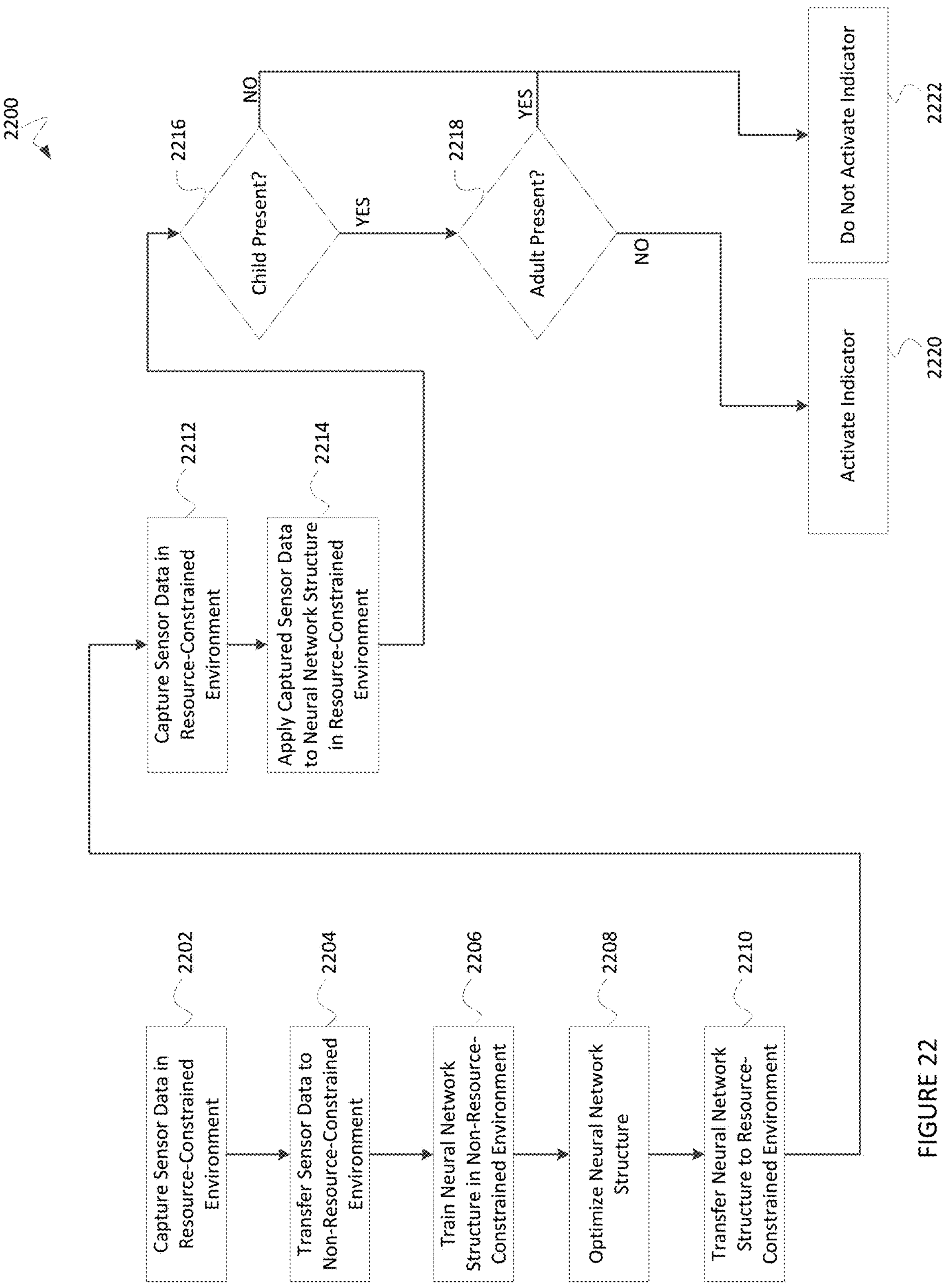
FIG. 22 is a flowchart of a process for employing a neural network in an automotive environment according to some embodiments of the present disclosure.

FIG. 22 is a flowchart of a process 2200 for employing a neural network in an automotive environment according to some embodiments of the present disclosure.

At block 2202, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 2204, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2206, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2206.

At block 2208, the neural network structure is optimized. In some embodiments, block 2208 may include reducing a number of nodes in the neural network structure. In some embodiments, block 2208 may include reducing a number of connections in the neural network structure.

At block 2210, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2210 is a transfer to the same resource-constrained environment from which the sensor data was transferred at block 2204 (e.g., to a same automobile, to a same mobile device, to a same embedded device). In some embodiments, the transfer to the resource-constrained environment at block 2210 is a transfer to a different resource-constrained environment from which the sensor data was transferred at block 2204 (e.g., to a different automobile, to a different mobile device, to a different embedded device).

At block 2212, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2212 is captured by the same one or more sensors used to capture sensor data at block 2202 (e.g., a same video camera, a same infrared camera). In some embodiments, the sensor data captured at block 2212 is captured by a different one or more sensors used to capture sensor data at block 2202 (e.g., a different video camera, a different infrared camera).

At block 2214, the sensor data captured at block 2212 is applied to the neural network structure in the resource-constrained environment. In some embodiments, block 2214 may include providing the sensor data captured at block 2212 as input to the neural network structure.

At block 2216, a determination is made as to whether a child is present. In some embodiments, block 2216 may include determining whether a child is present in a child safety seat of the automobile. The determination at block 2216 may be performed based on an output of the application of the neural network structure to the captured sensor data at the block 2214.

If the determination at block 2216 results in a determination that a child is not present, then the process continues at block 2222. At block 2222, an indicator is not activated (e.g., audible warning tone not emitted).

If the determination at block 2216 results in a determination that a child is present, then the process continues at block 2218.

At the block 2218, a determination is made as to whether adult is present. In some embodiments, block 2218 may include determining whether adult is present in a driver's seat of the automobile or a passenger seat of the automobile. The determination at block 2218 may be performed based on an output of the application of the neural network structure to the captured sensor data at the block 2214.

If the determination at block 2218 results in a determination that an adult is not present, then the process continues at block 2220. At block 2220, an indicator is activated (e.g., audible warning tone emitted).

If the determination at block 2218 results in a determination that an adult is present, then the process continues at block 2222. At block 2222, an indicator is not activated (e.g., audible warning tone not emitted).

Figure 23:
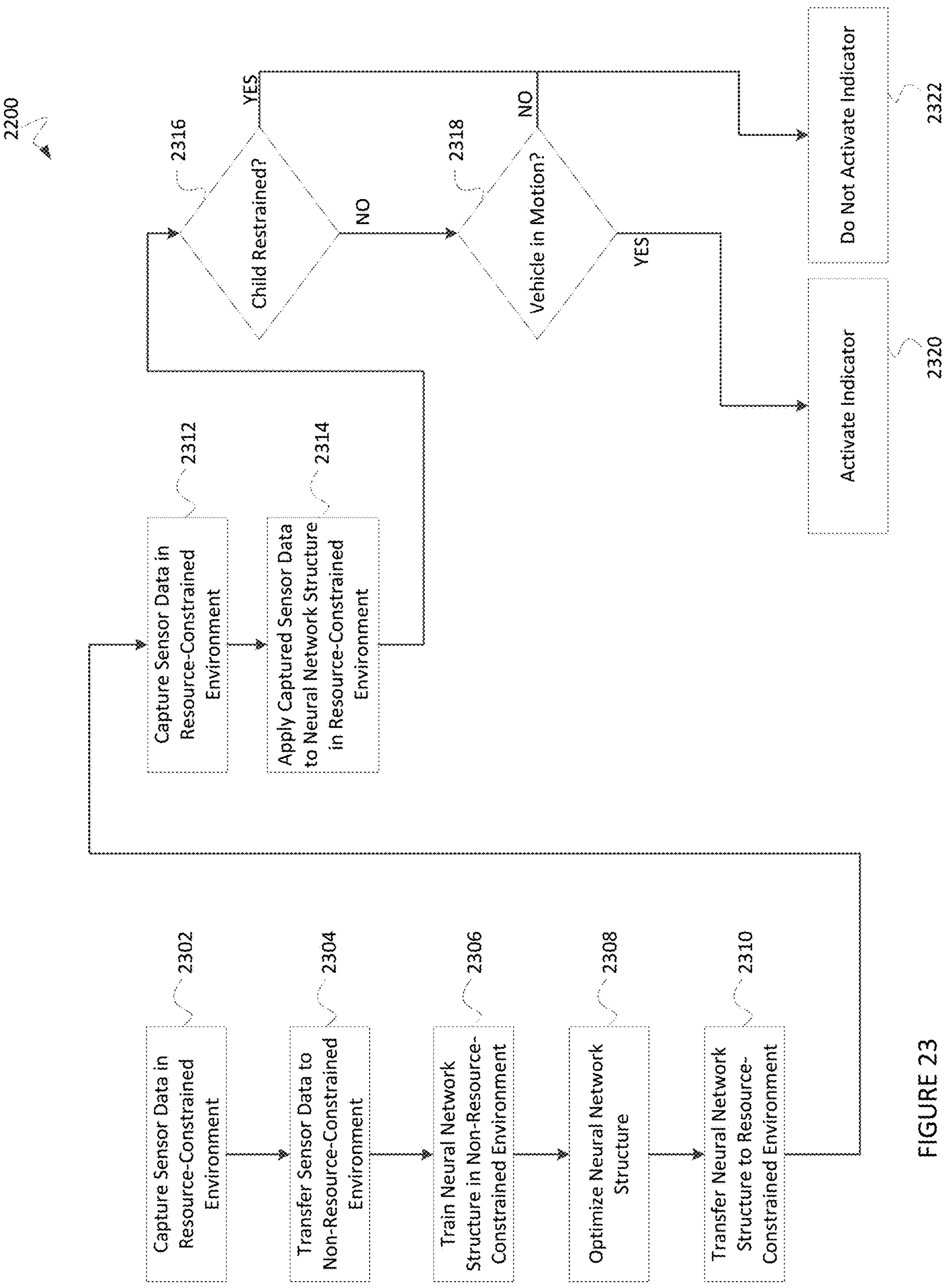
FIG. 23 is a flowchart of a process for employing a neural network in an automotive environment according to some embodiments of the present disclosure.

FIG. 23 is a flowchart of a process 2300 for employing a neural network in an automotive environment according to some embodiments of the present disclosure.

At block 2302, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 2304, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2306, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2306.

At block 2308, the neural network structure is optimized. In some embodiments, block 2308 may include reducing a number of nodes in the neural network structure. In some embodiments, block 2308 may include reducing a number of connections in the neural network structure.

At block 2310, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2310 is a transfer to the same resource-constrained environment from which the sensor data was transferred at block 2304 (e.g., to a same automobile, to a same mobile device, to a same embedded device). In some embodiments, the transfer to the resource-constrained environment at block 2310 is a transfer to a different resource-constrained environment from which the sensor data was transferred at block 2304 (e.g., to a different automobile, to a different mobile device, to a different embedded device).

At block 2312, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2312 is captured by the same one or more sensors used to capture sensor data at block 2302 (e.g., a same video camera, a same infrared camera). In some embodiments, the sensor data captured at block 2312 is captured by a different one or more sensors used to capture sensor data at block 2302 (e.g., a different video camera, a different infrared camera).

At block 2314, the sensor data captured at block 2312 is applied to the neural network structure in the resource-constrained environment. In some embodiments, block 2314 may include providing the sensor data captured at block 2312 as input to the neural network structure.

At block 2316, a determination is made as to whether a child is restrained. In some embodiments, block 2316 may include determining whether a child is restrained in a child safety seat of the automobile. The determination at block 2316 may be performed based on an output of the application of the neural network structure to the captured sensor data at the block 2314.

If the determination at block 2316 results in a determination that a child is restrained, then the process continues at block 2322. At block 2322, an indicator is not activated (e.g., audible warning tone not emitted).

If the determination at block 2316 results in a determination that a child is not restrained, then the process continues at block 2318.

At the block 2318, a determination is made as to whether the automobile is in motion. In some embodiments, block 2318 may include determining whether the automobile has a velocity other than zero. In some embodiments block 2318 may include determining whether a transmission of the automobile is in a gear other than the park gear.

If the determination at block 2318 results in a determination that the automobile is in motion, then the process continues at block 2320. At block 2320, an indicator is activated (e.g., audible warning tone emitted). In some embodiments, the block 2320 may further include automatically applying a brake in the automobile.

If the determination at block 2318 results in a determination that the automobile is not in motion, then the process continues at block 2322. At block 2322, an indicator is not activated (e.g., audible warning tone not emitted).

Figure 24:
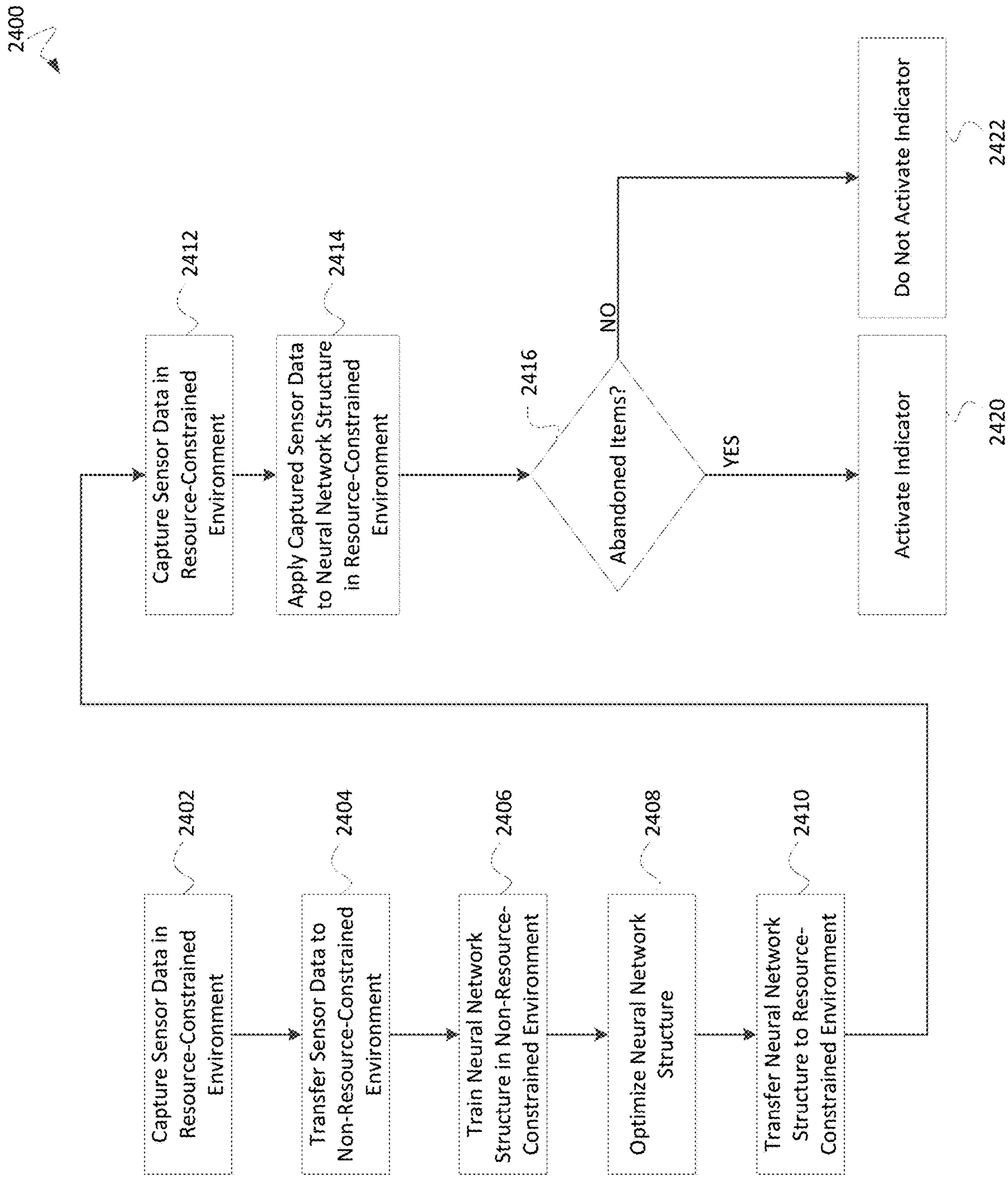
FIG. 24 is a flowchart of a process for employing a neural network in an automotive environment according to some embodiments of the present disclosure.

FIG. 24 is a flowchart of a process 2400 for employing a neural network in an automotive environment according to some embodiments of the present disclosure.

At block 2402, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 2404, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2406, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2406.

At block 2408, the neural network structure is optimized. In some embodiments, block 2408 may include reducing a number of nodes in the neural network structure. In some embodiments, block 2408 may include reducing a number of connections in the neural network structure.

At block 2410, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2410 is a transfer to the same resource-constrained environment from which the sensor data was transferred at block 2404 (e.g., to a same automobile, to a same mobile device, to a same embedded device). In some embodiments, the transfer to the resource-constrained environment at block 2410 is a transfer to a different resource-constrained environment from which the sensor data was transferred at block 2404 (e.g., to a different automobile, to a different mobile device, to a different embedded device).

At block 2412, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2412 is captured by the same one or more sensors used to capture sensor data at block 2402 (e.g., a same video camera, a same infrared camera). In some embodiments, the sensor data captured at block 2412 is captured by a different one or more sensors used to capture sensor data at block 2402 (e.g., a different video camera, a different infrared camera).

At block 2414, the sensor data captured at block 2412 is applied to the neural network structure in the resource-constrained environment. In some embodiments, block 2414 may include providing the sensor data captured at block 2412 as input to the neural network structure.

At block 2316, a determination is made as to whether an abandoned item is present in the automobile. The determination at block 2416 may be performed based on an output of the application of the neural network structure to the captured sensor data at the block 2414.

If the determination at block 2416 results in a determination that an abandoned item is present in the automobile, then the process continues at block 2420. At block 2420, an indicator is activated (e.g., audible warning tone emitted).

If the determination at block 2416 results in a determination that an abandoned item is not present in the automobile, then the process continues at block 2422. At block 2422, an indicator is not activated (e.g., audible warning tone not emitted).

Figure 25:
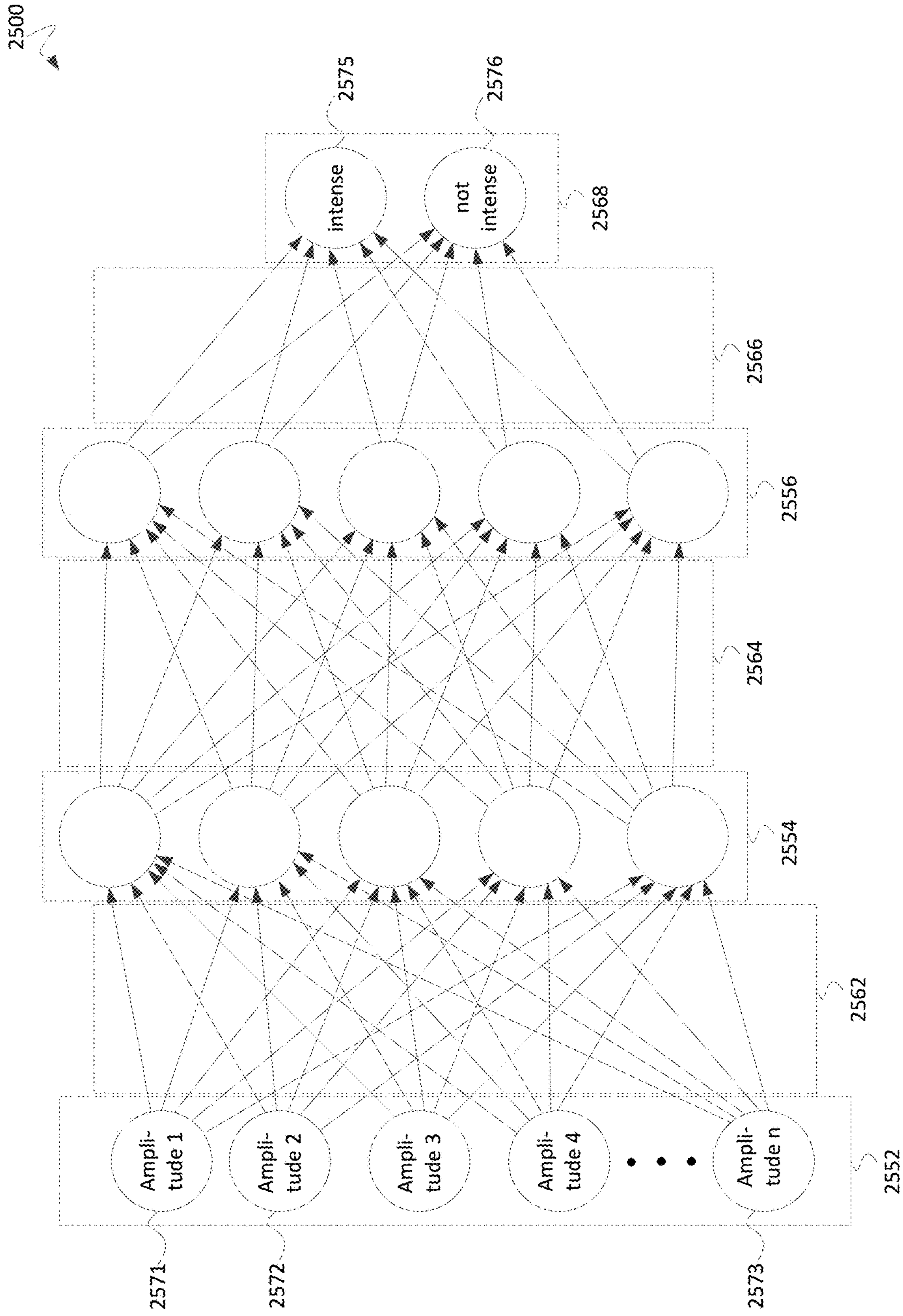
FIG. 25 is a diagram of an exemplary neural network structure according to some embodiments of the present disclosure.

FIG. 25 is a diagram of an exemplary neural network structure 2500 according to some embodiments of the present disclosure. In some embodiments of the present disclosure, a neural network structure 2500 may be used in a resource-constrained environment to categorize audio files or audio playback. For example, an audio file may be categorized as "intense" or "not intense."

The neural network structure 2500 includes layers 2552, 2554, 2556, and 2558, which may be provided as described with respect to layers 652, 654, 656, and 658, respectively. Neural network structure 2500 includes connections 2562, 2564, and 2566, which may be provided as described with respect to the connections 662, 664, and 666, respectively.

In such embodiments, an audio file may be observed as a series of audio amplitudes, which may be represented by numeric values. As opposed to the neural network structure 650 in which a series of pixel values were provided as input to input layer 652, the neural network structure 2500 may receive the series of audio amplitudes as the input to the layer 2552 (including nodes 2571, 2572, and 2573). Also, the output nodes may include an "intense" category output node 2575 and a "not intense" category output node 2576.

In this way, the neural network structure 2500 may be trained to accurately categorize an audio file or audio playback as "intense" or "not intense," using the neural network structure training techniques described with respect to the neural network structure 650.

In some embodiments of the present disclosure, different categories than those just described for the neural network structure 2500 may be used to categorize an audio file. For example, the neural network structure 2500 may be trained to determine a an audio file category as one of the following: "relaxed" and "aroused."

Figure 26B:
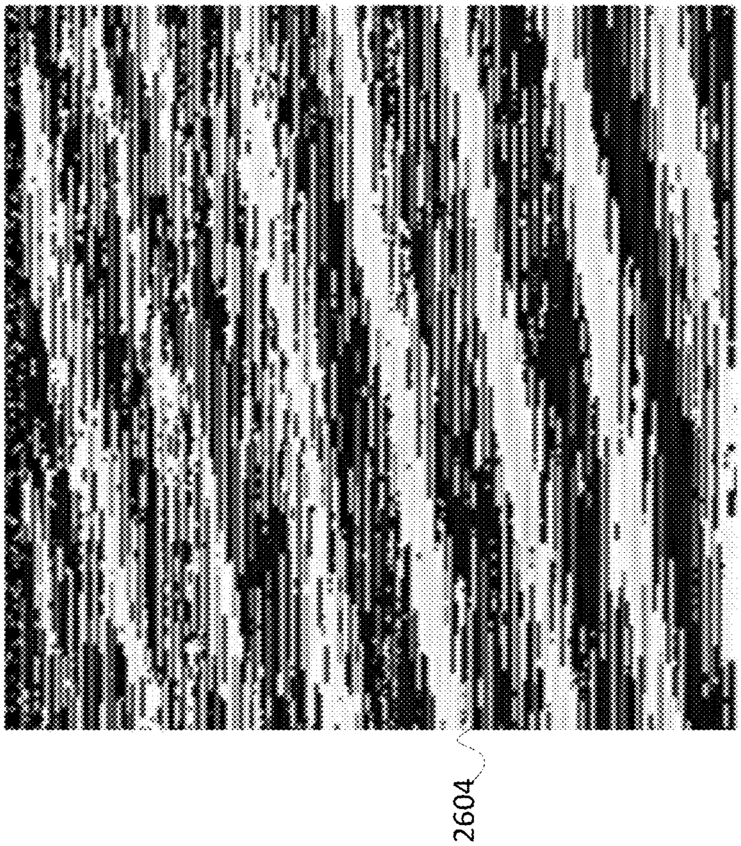
FIGS. 26A and 26B are exemplary audio file formatting for input to a neural network structure according to some embodiments of the present disclosure.
Figure 26A:
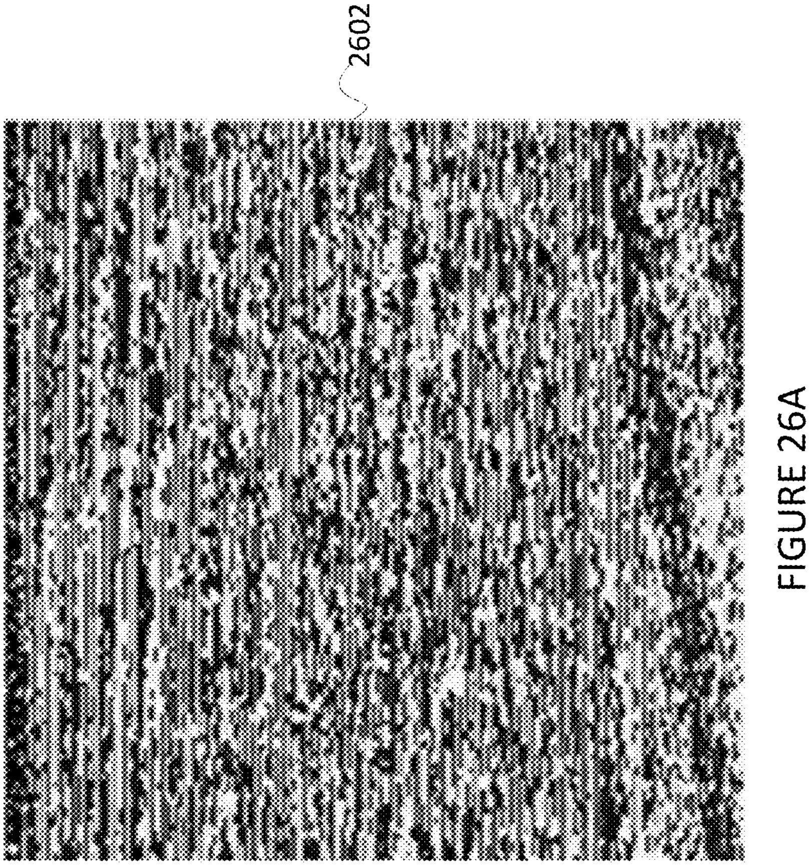

FIGS. 26A and 26B are exemplary audio file formatting for input to a neural network structure according to some embodiments of the present disclosure. In some embodiments of the present disclosure, a neural network structure (e.g., neural network structure 2500) may be used to categorize an audio file or audio playback. In such embodiments, it may be advantageous to format the audio file as an image file for input to a neural network structure configured to receive image files as input.

In such embodiments, the audio file may be formatted as an image using the following technique. The audio amplitude of each sample of the audio file may be converted to a pixel value (e.g., a grayscale value between 0 and 255). This may be performed by determining the range of the pixel values (e.g., 0 to 255 for grayscale values) and the range of audio amplitude values (e.g., 0 to 100 for audio amplitude values) and mapping the latter to the former in linear fashion (e.g., 0 audio amplitude value maps to 0 pixel value; 100 audio amplitude value maps to 255 pixel value; 50 audio amplitude maps to approximately 128 pixel value). Each pixel value may then be stored serially as pixels in an image, starting with the top-most and left-most pixel (traditionally the (0,0) pixel), moving to the right across the first row, then continue with the left-most pixel on the second row, and so forth. FIG. 26A shows an example image 2602 for an intense audio file, while FIG. 26B shows an example image 2604 for a not intense audio file.

Figure 27:
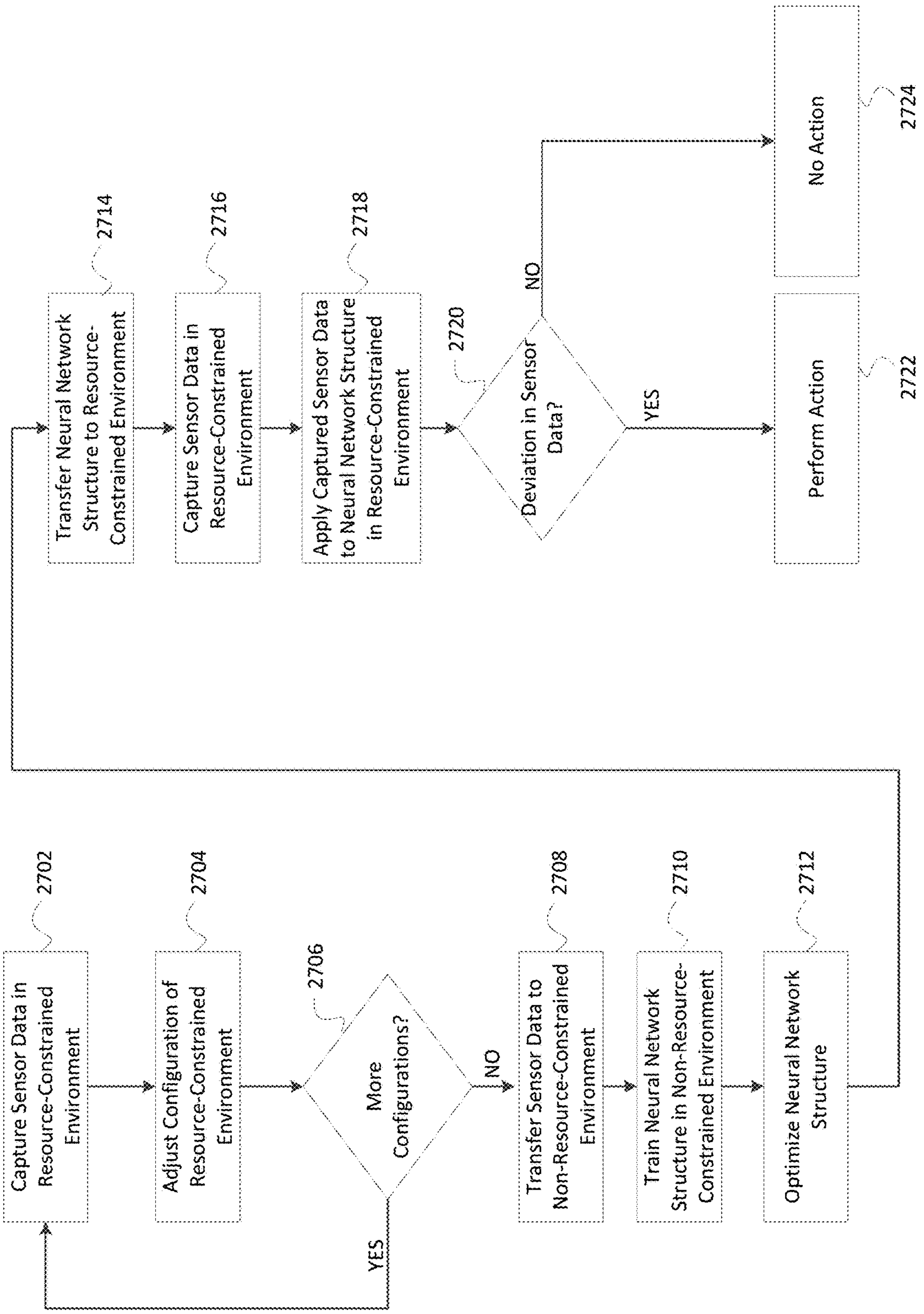
FIG. 27 is a flowchart of a process for employing a neural network in a resource-constrained environment according to some embodiments of the present disclosure.

FIG. 27 is a flowchart of a process 2700 for employing a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610).

At block 2702, sensor data is captured in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be captured by an image sensor located on the interior roof of the automobile. In such embodiments, the image sensor may capture an overhead view image of the interior of the automobile.

At block 2704, a configuration of the resource-constrained environment is adjusted. In some embodiments, block 2704 may include changing a configuration of a physical object in the resource-constrained environment. For example, block 2704 may include changing the forward/rearward position of the driver's seat, changing the level of recline of the driver's seat, changing forward/rearward position of the steering wheel column, changing the forward/rearward position of a passenger's seat, changing the position of a sun visor, changing the open/close position of air vents, etc.

At block 2706, a determination is made as to whether more configurations are available for capturing sensor data. In some embodiments, block 2706 may include determining whether there are more standard seat, steering wheel, or other configuration for which sensor data has not been captured at a previous iteration of block 2704.

If the determination at block 2706 results in a determination that more configurations are available for capturing sensor data, then the process 2700 continues at block 2702.

If the determination at block 2706 results in a determination that more configurations are not available for capturing sensor data, then the process 2700 continues at block 2708.

At block 2708, the sensor data is transferred from the resource-constrained environment to a non-resource-constrained environment. This transfer may be performed using any of a variety of communications techniques, such as by a wired communication link, a short-range wireless communication link, a long-range wireless communication link, a transfer of physical storage media, etc.

At block 2710, a neural network structure is trained in the non-resource-constrained environment using the transferred sensor data. The training of the neural network structure may be performed as described elsewhere herein (e.g., as described for neural network structures 600, 650). In some embodiments, the sensor data transferred from the resource-constrained environment may be labelled prior to or as part of block 2710.

At block 2712, the neural network structure is optimized. In some embodiments, block 2712 may include reducing a number of nodes in the neural network structure. In some embodiments, block 2712 may include reducing a number of connections in the neural network structure.

At block 2714, the neural network structure is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2714 is a transfer to the same resource-constrained environment from which the sensor data was transferred at block 2708 (e.g., to a same automobile, to a same mobile device, to a same embedded device). In some embodiments, the transfer to the resource-constrained environment at block 2714 is a transfer to a different resource-constrained environment from which the sensor data was transferred at block 2708 (e.g., to a different automobile, to a different mobile device, to a different embedded device).

At block 2716, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2716 is captured by the same one or more sensors used to capture sensor data at block 2702 (e.g., a same video camera, a same infrared camera). In some embodiments, the sensor data captured at block 2716 is captured by a different one or more sensors used to capture sensor data at block 2702 (e.g., a different video camera, a different infrared camera). In some embodiments, the block 2716 is performed based on a trigger (e.g., a periodic schedule, a location of an automobile, turning off an automobile).

At block 2718, the sensor data captured at block 2716 is applied to the neural network structure in the resource-constrained environment. In some embodiments, block 2718 may include providing the sensor data captured at block 2716 as input to the neural network structure.

At block 2720, a determination is made as to whether the state of the resource-constrained environment represented in the sensor data captured at block 2716 is a deviation from the state of the resource-constrained environment reflected in the sensor data captured at block 2702.

If the determination at block 2720 results in a determination that a deviation is present in the sensor data captured at block 2716, then the process continues at block 2722. At block 2722, an action is performed based on the determination that a deviation is present in the resource-constrained environment. For example, block 2722 may include activating an indicator, controlling the operation of an automobile, controlling the operation of an external computer system, and/or some other action.

If the determination at block 2720 results in a determination that no deviation is present in the sensor data captured at block 2716, then the process continues at block 2724. At block 2724, no action is taken. In some embodiments, no action is taken at block 2724 because no deviation is present in the resource-constrained environment. In some embodiments, some action may be taken at block 2724. In some embodiments, the action taken at block 2724 may include taking some action that is different from the action performed at block 2722.

In some embodiments, the process 2700 may be used to take safety-precaution actions in an automobile when a child or dog is present in an automobile. In such embodiments, block 2702 may include capturing images of the interior of the automobile that reflect the state of the automobile when no child or dog is present in the automobile. For example, each iteration of the block 2702 may include capturing an image of the interior of the automobile with the seat in a different position, the steering wheel in a different position, etc. In such instances, it may be appropriate to refer to the sensor data captured at block 2702 as a "baseline" for the state of the interior of the automobile. In such instances, it may also be appropriate to refer to the sensor data captured at block 2702 as reflecting a "normal" or "empty" or "unoccupied" state of the interior of the automobile.

In such embodiments, the neural network structure trained at block 2710 may reflect all "baseline" or "normal" configurations of the interior of the automobile. In such embodiments, the block 2720 may include determining that the sensor data captured at block 2716 represents a deviation from the "normal" or "baseline" state of the interior of the automobile. In such instances, the determination at block 2720 may be performed by determining whether the classification of the sensor data applied to the neural network structure at block 2718 results in a highest classification confidence value below a predefined threshold (e.g., a confidence value below 25%).

In such embodiments, the block 2722 may include automatically causing the automobile to open the windows (i.e., "roll them down") to an open position or the most-open position. In such embodiments, the block 2722 may include automatically starting the automobile's engine and turning the air conditioning to a "cool" setting. In such embodiments, the block 2722 may include automatically activating the car alarm of the automobile. In such embodiments, the block 2722 may include transmitting a message (e.g., sending an alert SMS message, sending an alert email, sending an alert notification through a software application) to the driver of the automobile or another person. The message may include sensor data (e.g. an image of the interior). In some embodiments, the process 2700 may include only performing the action at block 2722 if other conditions are met. For example, the action at block 2722 may be performed only if the air temperature in the interior of the automobile is greater than or equal to 90 degrees Fahrenheit (e.g., as detected by a temperature sensor in the interior of the automobile).

In some embodiments, the process 2700 may be used to alert a driver when an object is left in an automobile. In such embodiments, block 2702 may include capturing images of the interior of the automobile that reflect the state of the automobile when no object is left in the automobile. In such embodiments, an object may be considered "left" in the interior of the automobile if an object that is not typically present in the automobile absent a driver (e.g., a wallet, a phone, a purse) is present in the automobile when the driver is absent. In such embodiments, the iterations of the block 2702 may include capturing images of a "baseline" state of the interior of the automobile, as described previously herein.

In such embodiments, the neural network structure trained at block 2710 may reflect all "baseline" configurations of the interior of the automobile. In such embodiments, the block 2720 may include determining that the sensor data captured at block 2716 represents a deviation from the "baseline" state of the interior of the automobile. In such instances, the determination at block 2720 may be performed by determining whether the classification of the sensor data applied to the neural network structure at block 2718 results in a highest classification confidence value below a predefined threshold (e.g., a confidence value below 25%).

In such embodiments, the block 2722 may include automatically alerting a driver of the automobile of the presence of the item left in the automobile. In such embodiments, the block 2722 may include automatically activating an indicator in the automobile (e.g., a chime or light). In such embodiments, the block 2722 may include automatically activating the car alarm of the automobile. In such embodiments, the block 2722 may include transmitting a message (e.g., sending an alert SMS message, sending an alert email, sending an alert notification through a software application) to the driver of the automobile or another person. The message may include sensor data (e.g. an image of the interior).

In such embodiments, the process 2700 may include only performing the action at block 2722 when certain conditions are met. For instance, the action performed at block 2722 may only be performed after the driver of the automobile locks the automobile. As another instance, the action performed at block 2722 may only be performed after a predefined time of day (e.g., 20:00). As another instance, the action performed at block 2722 may only be performed when the automobile is present in a predefined location (e.g., located in the garage at the house of the driver of the automobile). As another instance, the action performed at block 2722 may only be performed after a predefined action by the driver of the automobile (e.g., the driver returning the automobile to a rental company). As another instance, the action performed at block 2722 may only be performed after being triggered by a user (e.g., triggered by an input to a computer system by an employee of a rental car company). In some embodiments, the process 2700 may include only performing block 2716, block 2718, block 2720, and block 2722 when one or more of the aforementioned conditions are met.

In some embodiments, the process 2700 may be used to prevent a rental car driver from returning an automobile. In such embodiments, block 2702 may include capturing images of the interior of the automobile that reflect the state of the automobile when no object is left in the automobile and no damage has been done to the interior of the automobile (e.g., no stains on the seats). In such embodiments, the iterations of the block 2702 may include capturing images of a "baseline" state of the interior of the automobile, as described previously herein. In some embodiments, the images of the "baseline" state of the interior of the automobile may reflect some changes from the normal configuration of the interior of the automobile. For example, if a previous driver of the automobile left a stain on the driver's seat of the automobile, then the images of the "baseline" state of the interior of the automobile may reflect this damage to the driver's seat. As another example, if the present driver of the automobile is using a child safety seat as part of operation of the automobile (e.g., having rented the child safety seat with rental of the automobile from a rental car company), then the images of the "baseline" state of the interior of the automobile may reflect this presence of the child safety seat.

In such embodiments, the neural network structure trained at block 2710 may reflect all "baseline" configurations of the interior of the automobile. In such embodiments, the block 2720 may include determining that the sensor data captured at block 2716 represents a deviation from the "baseline" state of the interior of the automobile. In such instances, the determination at block 2720 may be performed by determining whether the classification of the sensor data applied to the neural network structure at block 2718 results in a highest classification confidence value below a predefined threshold (e.g., a confidence value below 25%).

In such embodiments, the block 2722 may include preventing a driver of the automobile from returning the automobile to a car rental company or service. For example, if the determination at block 2720 determines that a deviation is present in the interior of automobile, then the action performed at block 2722 may include controlling an external software application so that the driver of the automobile cannot set the state of the automobile to "returned" or "checked-in" in a software application (e.g., preventing a car sharing user from setting a shared car status to "available"). As another example, if the determination at block 2720 determines that a deviation is present in the interior of automobile, then the action performed at block 2722 may include preventing the driver of the automobile from entering a car return parking structure. For instance, a rental car company may maintain a parking lot, parking garage, or other structure for returning rental cars, where the parking structure is not supervised by a human employee. But entry to the parking structure may be controlled by a parking gate, retractable pylons, or some other automatically controlled structures. In such an example, the action performed at block 2722 may include preventing the parking gate form opening, the pylons from retracting, or the like.

In such embodiments, the process 2700 may include only performing the action at block 2722 when certain conditions are met. For instance, the action performed at block 2722 may only be performed after the driver parks a car share automobile in a designated car share parking spot. As another instance, the action performed at block 2722 may only be performed after the driver parks a car share automobile in a designated car share parking spot, exits the automobile, and locks the automobile. As another instance, the action performed at block 2722 may only be performed after the driver of a car share automobile touches a "check in" button (or something similar) in a car share software application on a mobile device. As another instance, the action performed at block 2722 may only be performed after the driver of a rental car automobile parks the automobile outside the automobile return parking structure. As another instance, the action performed at block 2722 may only be performed after the driver of a rental car automobile touches a "return" button (or something similar) in a rental car software application on a mobile device. In some embodiments, the process 2700 may include only performing block 2716, block 2718, block 2720, and block 2722 when one or more of the aforementioned conditions are met.

In some embodiments, the process 2700 may be used to process a rental car after being returned by a renter. In such embodiments, block 2702 may include capturing images of the interior of the automobile that reflect the state of the automobile when no object is left in the automobile and no damage has been done to the interior of the automobile (e.g., no stains on the seats). In such embodiments, the iterations of the block 2702 may include capturing images of a "baseline" state of the interior of the automobile, as described previously herein. In some embodiments, the images of the "baseline" state of the interior of the automobile may reflect some changes from the normal configuration of the interior of the automobile. For example, if a previous driver of the automobile left a stain on the driver's seat of the automobile, then the images of the "baseline" state of the interior of the automobile may reflect this damage to the driver's seat. As another example, if the present driver of the automobile is using a child safety seat as part of operation of the automobile (e.g., having rented the child safety seat with rental of the automobile from a rental car company), then the images of the "baseline" state of the interior of the automobile may reflect this presence of the child safety seat.

In such embodiments, the neural network structure trained at block 2710 may reflect all "baseline" configurations of the interior of the automobile. In such embodiments, the block 2720 may include determining that the sensor data captured at block 2716 represents a deviation from the "baseline" state of the interior of the automobile. In such instances, the determination at block 2720 may be performed by determining whether the classification of the sensor data applied to the neural network structure at block 2718 results in a highest classification confidence value below a predefined threshold (e.g., a confidence value below 25%).

In such embodiments, the block 2722 may include performing actions associated with processing a rental car automobile after being returned from a renter. For example, the action performed at block 2722 may include automatically generating an action item list for processing the automobile in order to return it to a rental-ready state. In such an example, block 2722 may include adding an item "vacuum center console", "return driver seat back to upright position", and/or "remove child safety seat" if any or all of these actions are necessary to return the automobile to a standard state for renting to another customer of the rental car company. In such examples, block 2722 may include generating an action item list and presenting the action item list to an employee of the rental car company (e.g., printing the list on a printer in a car service bay, transmitting the list for presentation on a mobile device of a car service technician). As another example, block 2722 may include automatically generating a financial charge for the renter of the automobile (e.g., based on damage to the interior of the automobile).

In such embodiments, the process 2700 may include only performing the action at block 2722 when certain conditions are met. For instance, the action performed at block 2722 may only be performed after a driver of a rental automobile parks the automobile in an automobile return parking structure. In some embodiments, the process 2700 may include only performing block 2716, block 2718, block 2720, and block 2722 when one or more of the aforementioned conditions are met.

In some embodiments, the process 2700 may include more than one neural network structure. For example, block 2702 and block 2704 may be iterated in order to capture multiple sensor data for a first baseline, which then may be used to train a first neural network structure at block 2710. Continuing the example, block 2702 and block 2704 may be further iterated in order to capture multiple sensor data for a second baseline, which then may be used to train a second neural network structure at block 2710. In such an example, the process 2700 may include selecting one of the more than one neural network structure prior to block 2718, and then applying the sensor data captured at block 2716 to the selected neural network structure at block 2718.

For instance, a first neural network structure may be trained for a "no child safety seat" baseline, and a second neural network structure may be trained for a "rear-facing child safety seat in left-rear passenger seat" baseline. The first neural network structure may be trained at block 2710 by using sensor data captured at block 2702 over multiple configuration of an automobile interior with no child safety seat present. For instance, the first configuration could include no child safety seat present and the driver's seat at the rear-most position. A second configuration could include no child safety seat present and the driver's seat at position slightly forward from the rear-most position. And so on. The second neural network structure may be trained at block 2710 by using sensor data captured at block 2702 over multiple configuration of an automobile interior with a rear-facing child safety seat in the left-rear passenger seat. For instance, the first configuration could include a rear-facing child safety seat in the left-rear passenger seat and the driver's seat at the rear-most position. A second configuration could include a rear-facing child safety seat in the left-rear passenger seat and the driver's seat at position slightly forward from the rear-most position.

In such an instance, process 2700 may include a determination prior to block 2718 of whether the first neural network structure or the second neural network structure should be used at block 2718. For instance, if the automobile is a rental car and the current renter did not rent a child safety seat, then the first neural network structure (i.e., "no child safety seat") may be used at block 2718. If the automobile is a rental car and the current renter rented a rear-facing child safety seat, then the second neural network structure (i.e., "rear-facing child safety seat in left-rear passenger seat") may be used at block 2718.

In such embodiments, additional information may be used to determine which neural network to use at block 2718. For instance, an external computing system may be queried to determine whether a renter of the automobile has rented a child safety seat, what kind of safety seat, and/or where the child safety seat was installed by the service technician.

In some embodiments, generic and customized neural network structures may be used. For example, a generic "2016 Chevrolet Sonic hatchback" neural network structure may be trained at block 2710 using sensor data from one or more 2016 Chevrolet Sonic hatchbacks. The generic "2016 Chevrolet Sonic hatchback" neural network may then be used at block 2718 in multiple 2016 Chevrolet Sonic hatchbacks. Continuing the example, an automobile that has a unique deviation from a generic configuration may use a customized neural network structure. For example, if a 2016 Chevrolet Sonic hatchback with VIN=12341234123412345 has a large stain on the driver's seat, then a customized "VIN 12341234123412345" neural network structure may be trained at block 2710 using sensor data from that specific vehicle. The customized "VIN 12341234123412345" neural network structure may then be used at block 2718 in that specific vehicle. In such embodiments, the block 2702, block 2704, block 2706, block 2708, block 2710, and block 2712 may be omitted for a new vehicle for which a generic neural network structure already exists. In such embodiments, the process 2700 may include transferring a generic neural network structure to the automobile at block 2714 unless a customized neural network structure exists for the automobile, in latter case which the customized neural network structure may be transferred to the automobile at block 2714.

In various embodiments, process 2700 may be performed using structures described elsewhere herein. For example, blocks 2702 and 2716 may be performed using sensors described elsewhere herein (e.g., sensors 460, 472, 716, 765, 766, 767, 768, 769, 800, 1316, 1416, 1516, 1518, 1616, 1618, 1716). As a further example, blocks 2708, 2718, and 2720 may be performed using computing devices described elsewhere herein (e.g., computing devices 726, 776, 1100, 1316, 1416, 1526, 1626, 1726). As a further example, blocks 2710, 2712, and 2714 may be performed using computing devices described elsewhere herein (e.g., computing devices 720, 770, 1000, 1320, 1420, 1520, 1620, 1720). As a further example, blocks 2722 and 2724 may be performed using described elsewhere herein (e.g., controllers 728, 778, 1200, 1328, 1428, 1528, 1628, 1728).

Figure 28:
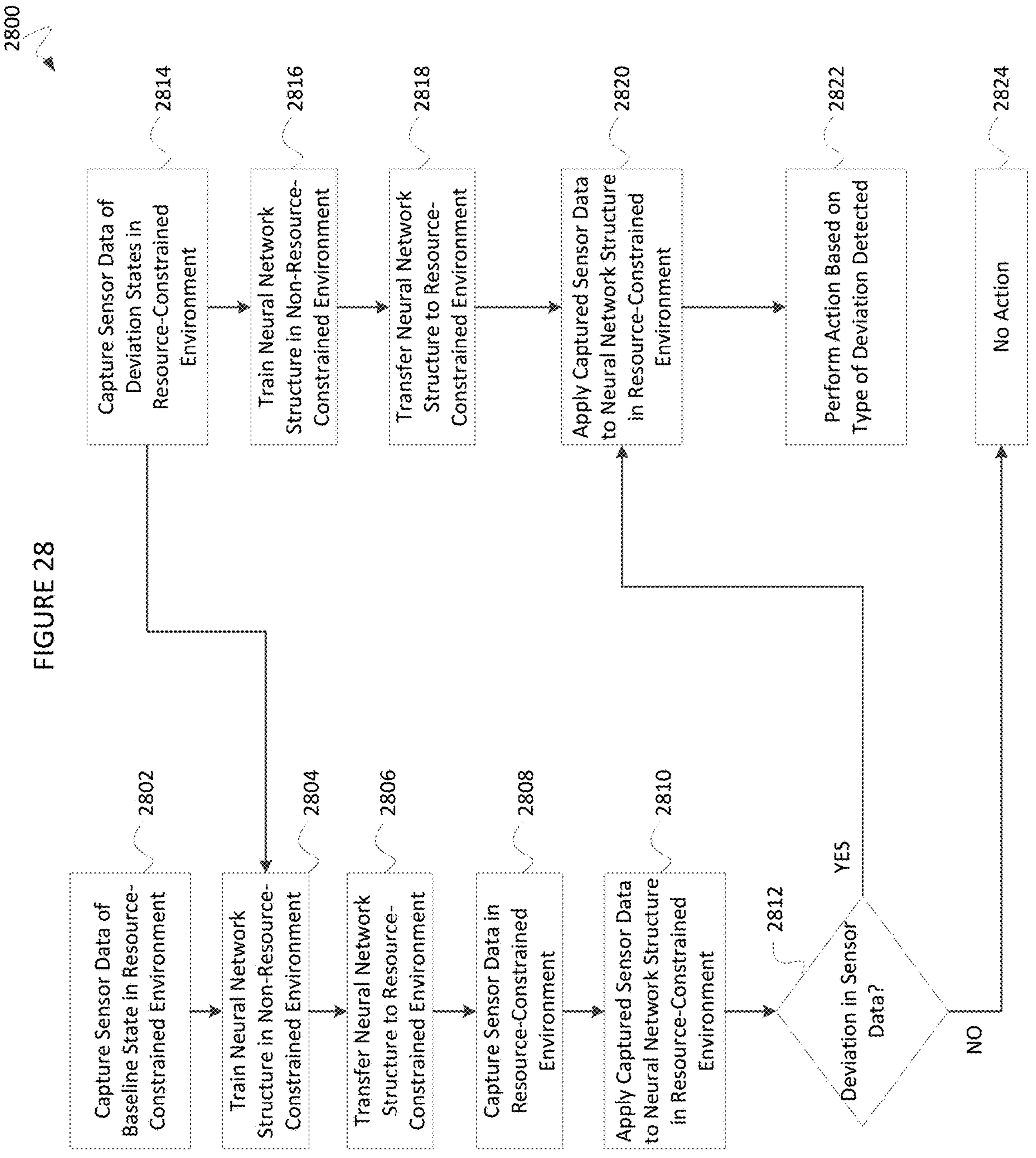
FIG. 28 is a flowchart of a process for employing a neural network in a resource-constrained environment according to some embodiments of the present disclosure.

FIG. 28 is a flowchart of a process 2800 for employing a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610).

At block 2802, sensor data is captured of baseline states in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be captured by an image sensor located on the interior roof of the automobile. In such embodiments, the image sensor may capture an overhead view image of the interior of the automobile. The sensor data captured at block 2802 may reflect one or more baseline states of the automobile as described elsewhere herein. For example, the sensor data captured at block 2802 may include images of an interior of an automobile when no people or abandoned objects are present. In some embodiments, block 2802 may be performed iteratively across multiple baseline state configuration of the resource-constrained environment, such as described for block 2702, block 2704, and block 2706 of process 2700 in FIG. 27.

At block 2814, sensor data is captured of deviation states in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be captured by an image sensor located on the interior roof of the automobile. In such embodiments, the image sensor may capture an overhead view image of the interior of the automobile.

The sensor data captured at block 2814 may reflect one or more deviation states of the automobile. Deviation states may include situations where the state of the interior of the automobile deviates from the one or more baseline states described elsewhere herein. For example, block 2814 may include capturing images of the interior of the automobile when a smartphone (i.e., a “left” or “abandoned” item) is present on the driver’s seat. As another example, block 2814 may include capturing images of the interior of the automobile when a cup (i.e., a “left” or “abandoned” item) is present in a cup holder of the center console of the automobile. As another example, block 2814 may include capturing images of the interior of the automobile when an umbrella (i.e., a “left” or “abandoned” item) is present in a passenger footwell of the automobile. As another example, block 2814 may include capturing images of the interior of the automobile when a food wrapper (i.e., trash or other refuse) is present in a passenger footwell of the automobile. As another example, block 2814 may include capturing images of the interior of the automobile when a stain (i.e., damage) is present on a driver seat of the automobile. As another example, block 2814 may include capturing images of the interior of the automobile when a cigarette burn (i.e., damage) is present on a passenger seat of the automobile. In some embodiments, block 2814 may be performed iteratively across multiple deviation state configuration of the resource-constrained environment.

At block 2804, a neural network structure is trained in the non-resource-constrained environment using the sensor data captured at block 2802 and the sensor data captured at block 2814. The training of the neural network structure may be performed as described elsewhere herein (e.g., as described for neural network structures 600, 650). In some embodiments, the sensor data captured from the resource-constrained environment may be labelled prior to or as part of block 2804. For example, the sensor data captured at block 2802 may be labelled “baseline,” “normal,” or the like. The sensor data captured at block 2814 may be labelled “deviation,” “abnormal,” or the like. In some embodiments, block 2804 may be performed after first transferring the sensor data captured at block 2802 and/or block 2814 to a non-resource constrained environment, such as described for block 2708 of process 2700 in FIG. 27.

At block 2806, the neural network structure trained at block 2804 is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2806 is a transfer to the same resource-constrained environment from which the sensor data was captured at block 2802 and/or block 2814 (e.g., to a same automobile, to a same mobile device, to a same embedded device). In some embodiments, the transfer to the resource-constrained environment at block 2806 is a transfer to a different resource-constrained environment from which the sensor data was captured at block 2802 and/or block 2814 (e.g., to a different automobile, to a different mobile device, to a different embedded device). In some embodiments, block 2812 may be performed after first optimizing the neural network structure trained at block 2804, such as described for block 2712 of process 2700 in FIG. 27.

At block 2808, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2808 is captured by the same one or more sensors used to capture sensor data at block 2802 and/or block 2814 (e.g., a same video camera, a same infrared camera). In some embodiments, the sensor data captured at block 2808 is captured by a different one or more sensors used to capture sensor data at block 2802 and/or block 2814 (e.g., a different video camera, a different infrared camera). In some embodiments, the block 2808 is performed based on a trigger (e.g., a periodic schedule, a location of an automobile, turning off an automobile).

At block 2810, the sensor data captured at block 2808 is applied to the neural network structure in the resource-constrained environment. In some embodiments, block 2810 may include providing the sensor data captured at block 2808 as input to the neural network structure.

At block 2812, a determination is made as to whether the state of the resource-constrained environment represented in the sensor data captured at block 2808 is a deviation from the baseline state of the resource-constrained environment reflected in the sensor data captured at block 2802. In some embodiments, the determination at block 2812 may be performed by determining whether the output of block 2810 produces a label with a highest confidence value of “baseline” or a label with a highest confidence value of “deviation.”

If the determination at block 2812 results in a determination that a deviation is present in the sensor data captured at block 2808, then the process continues at block 2820.

At block 2816, a neural network structure is trained in the non-resource-constrained environment using the sensor data captured at block 2814. The training of the neural network structure may be performed as described elsewhere herein (e.g., as described for neural network structures 600, 650). In some embodiments, the sensor data captured from the resource-constrained environment may be labelled prior to or as part of block 2816. For example, the sensor data captured at block 2814 may be labelled “left phone”, “left phone on driver’s seat”, “left phone in center console”, “left cup”, “left cup in center console”, “left item in footwell”, “left item in passenger footwell”, “left umbrella in front passenger footwell”, “refuse”, “left refuse in passenger footwell”, “left food wrapper in passenger footwell”, “food crumbs in passenger footwell”, “stain on driver’s seat”, “large stain on driver’s seat”, “small stain on driver’s seat”, “fabric damage”, “burn mark on passenger seat”, or the like. In some embodiments, block 2816 may be performed after first transferring the sensor data captured at block 2814 to a non-resource constrained environment, such as described for block 2708 of process 2700 in FIG. 27.

At block 2818, the neural network structure trained at block 2816 is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2818 is a transfer to the same resource-constrained environment from which the sensor data was captured at block 2814 (e.g., to a same automobile, to a same mobile device, to a same embedded device). In some embodiments, the transfer to the resource-constrained environment at block 2818 is a transfer to a different resource-constrained environment from which the sensor data was captured at block 2814 (e.g., to a different automobile, to a different mobile device, to a different embedded device). In some embodiments, block 2818 may be performed after first optimizing the neural network structure trained at block 2816, such as described for block 2712 of process 2700 in FIG. 27.

At block 2820, the sensor data captured at block 2808 is applied to the neural network structure in the resource-constrained environment. In some embodiments, block 2820 may include providing the sensor data captured at block 2808 as input to the neural network structure. In some embodiments, block 2808 may include determining a type of deviation in the resource-constrained environment based on the output of applying the sensor data captured at block 2808 to the neural network structure trained at block 2816. For example, the type of deviation present may be determined as the output label for the neural network with the highest confidence value for the input sensor data. In such embodiments, a default deviation type (e.g., "unidentified deviation") may be predefined for cases where no output label has a confidence value above a predefined threshold (e.g., no confidence value above 25%).

At block 2822, an action is performed based on the type of deviation that is determined to be present in the resource-constrained environment at block 2820. For example, if the deviation that is determined to be present is the presence of refuse in the automobile, then the action performed at block 2822 may include sending an alert (e.g., message in a software application on a mobile device) to a car service technician that is an employee of a rental car company that provides the automobile as a rental vehicle. As another example, if the deviation that is determined to be present is the presence of a wallet in the automobile, then the action performed at block 2822 may include sending an alert (e.g., a text message) to an owner or most recent renter of the automobile. As another example, if the deviation that is determined to be present is the presence of a stain in the automobile, then the action performed at block 2822 may include generating a charge to a credit card associated with a most recent renter of the automobile. In some embodiments, block 2822 may include performing any of the actions described for block 2722 of process 2700 in FIG. 27. Other deviation type-specific actions may be defined and performed at block 2822 in accordance with embodiments of the present disclosure.

If the determination at block 2812 results in a determination that no deviation is present in the sensor data captured at block 2808, then the process continues at block 2824. At block 2824, no action is taken. In some embodiments, no action is taken at block 2824 because no deviation is present in the resource-constrained environment. In some embodiments, some action may be taken at block 2824. In some embodiments, the action taken at block 2824 may include taking some action that is different from the action performed at block 2822.

In some embodiments, process 2800 may be modified to not use two separate neural network structures. For example, for the sensor data captured at block 2814, the labels associated therewith for the training at block 2816 may be provided as labels for the training at block 2804. In such an example, block 2816, block 2818, and/or block 2820 may be omitted entirely. In such an example, the determination as to the type of deviation that is present may be made as part of block 2810. And in such an example, the type of deviation determined at block 2810 may be used at block 2822 to determine the action to perform.

In various embodiments, process 2800 may be performed using structures described elsewhere herein. For example, blocks 2802, 2808, and 2814 may be performed using sensors described elsewhere herein (e.g., sensors 460, 472, 716, 765, 766, 767, 768, 769, 800, 1316, 1416, 1516, 1518, 1616, 1618, 1716). As a further example, blocks 2810, 2812, 2820, and 2822 may be performed using computing devices described elsewhere herein (e.g., computing devices 726, 776, 1100, 1316, 1416, 1526, 1626, 1726). As a further example, blocks 2804, 2806, 2816, and 2818 may be performed using computing devices described elsewhere herein (e.g., computing devices 720, 770, 1000, 1320, 1420, 1520, 1620, 1720). As a further example, blocks 2822 and 2824 may be performed using described elsewhere herein (e.g., controllers 728, 778, 1200, 1328, 1428, 1528, 1628, 1728).

Figure 29:
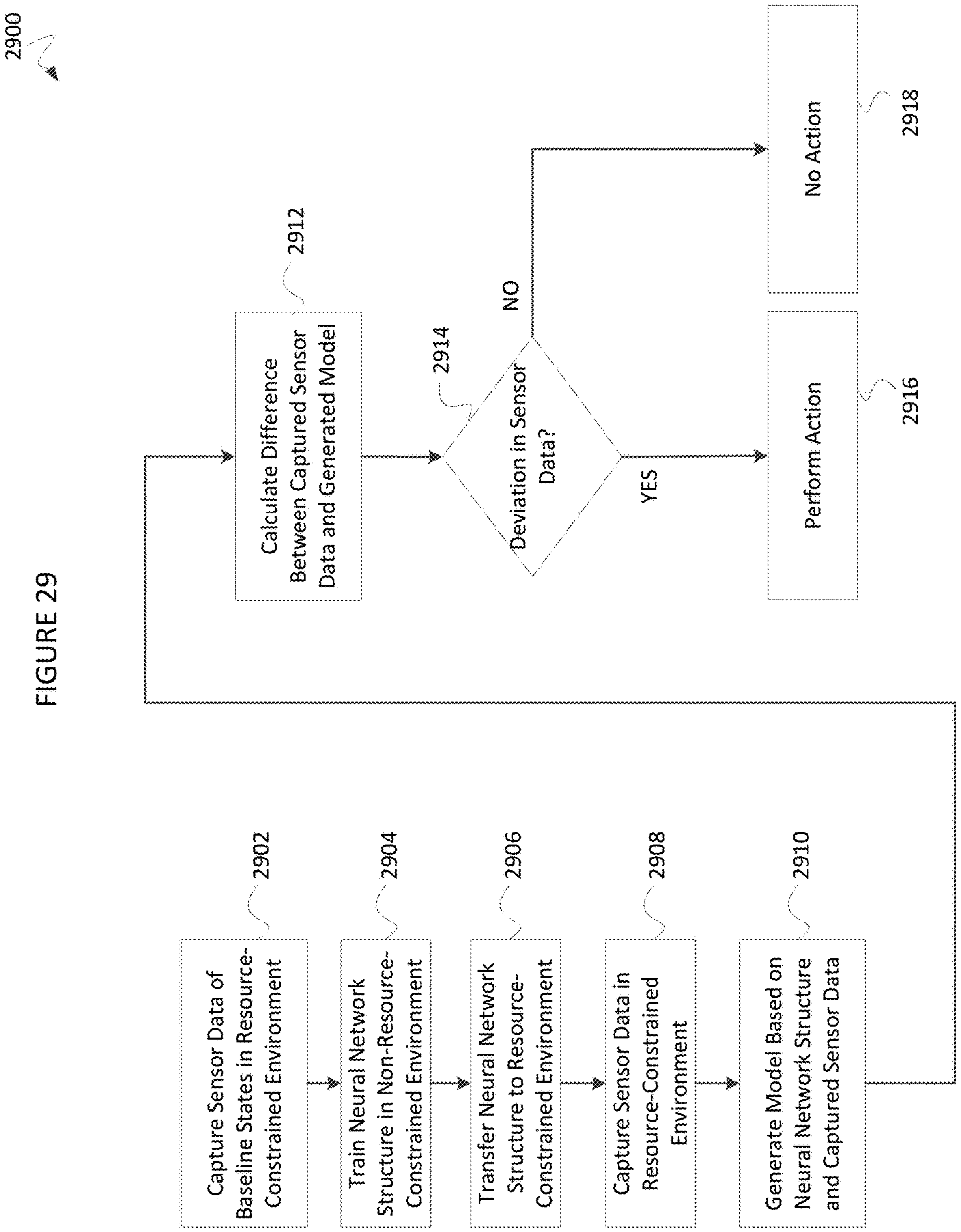
FIG. 29 is a flowchart of a process for employing a neural network in a resource-constrained environment according to some embodiments of the present disclosure.

FIG. 29 is a flowchart of a process 2900 for employing a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610).

At block 2902, sensor data is captured of baseline states in a resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be captured by an image sensor located on the interior roof of the automobile. In such embodiments, the image sensor may capture an overhead view image of the interior of the automobile. The sensor data captured at block 2902 may reflect one or more baseline states of the automobile as described elsewhere herein. For example, the sensor data captured at block 2902 may include images of an interior of an automobile when no people or abandoned objects are present. In some embodiments, block 2902 may be performed iteratively across multiple baseline state configuration of the resource-constrained environment, such as described for block 2702, block 2704, and block 2706 of process 2700. For example, block 2902 may be performed iteratively using baseline configuration with varying seat positions, lighting modes, and other physical configurations that represent various normal, clean automobile interior configurations.

At block 2904, a neural network structure is trained in the non-resource-constrained environment using the sensor data captured at block 2904. The training of the neural network structure may be performed as described elsewhere herein (e.g., as described for neural network structures 600, 650). In some embodiments, the sensor data captured from the resource-constrained environment may be labelled prior to or as part of block 2904. For example, the sensor data captured at block 2802 may be labelled "baseline," "normal," or the like. In some embodiments, block 2904 may be performed after first transferring the sensor data captured at block 2902 to a non-resource constrained environment, such as described for block 2708 of process 2700 in FIG. 27.

At block 2906, the neural network structure trained at block 2904 is transferred from the non-resource-constrained environment to a resource constrained environment. This transfer may be performed using any of a variety of communications techniques, such as by a wired communication link, a short-range wireless communication link, a long-range wireless communication link, a transfer of physical storage media, etc. In some embodiments, the transfer to the resource-constrained environment at block 2906 is a transfer to the same resource-constrained environment from which the sensor data was captured at block 2902 (e.g., to a same automobile, to a same mobile device, to a same embedded device). In some embodiments, the transfer to the resource-constrained environment at block 2906 is a transfer to a different resource-constrained environment from which the sensor data was captured at block 2902 (e.g., to a different automobile, to a different mobile device, to a different embedded device). In some embodiments, block 2912 may be performed after first optimizing the neural network structure trained at block 2904, such as described for block 2712 of process 2700 in FIG. 27.

At block 2908, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments, the sensor data captured at block 2908 is captured by the same one or more sensors used to capture sensor data at block 2902 (e.g., a same video camera, a same infrared camera). In some embodiments, the sensor data captured at block 2908 is captured by a different one or more sensors used to capture sensor data at block 2902 (e.g., a different video camera, a different infrared camera). In some embodiments, the block 2908 is performed based on a trigger (e.g., a periodic schedule, a location of an automobile, turning off an automobile).

At block 2910, a model is generated based on the neural network structure trained at block 2906 and based on the sensor data captured at block 2908. In some embodiments, the model generated at block 2910 may be an image generated based on the neural network structure trained at block 2906 and based on the sensor data captured at block 2908. In such embodiments, the generated image may be an image generated that is similar to the sensor data captured at block 2908 but that is generated using the neural network structure trained at block 2904 (and thus the sensor data captured at block 2902). The model may be generated using a generative adversarial network and/or other neural network technique.

For example, block 2910 may include providing the sensor data captured at block 2908 as input to the neural network structure trained at block 2904 and prompting the neural network structure 2904 to generate sensor data that is the most similar to the sensor data captured at block 2908 as possible. For instance, in the case of images of the interior of an automobile, the block 2910 may include prompting the neural network structure trained at block 2904 to generate an image of the interior of the automobile that is as similar as possible to the image of the interior of the automobile captured at block 2908. In cases where the neural network structure is trained at block 2904 using only images of the interior of the automobile captured at block 2902 that represent normal, clean configurations, and in cases where the image captured at block 2908 includes a portion that deviates from those normal, clean configurations (e.g., stain on driver's seat, missing floor mat, cup in cupholder, trash on floor), the neural network structure may be able to generate an image at block 2910 that approximates the image captured at block 2908 but that cannot generate the deviant aspect (e.g., the stain, the lack of floor mat, the cup, the trash) because the images on which the neural network structure was trained at block 2904 did not contain any such aspects.

At block 2912, a difference is calculated between the sensor data captured at block 2908 and the model generated at block 2910. For example, block 2912 may include generating an array or matrix representation of the sensor data and an array or matrix representation of the model. In such an example, each element of the array or matrix may be a pixel value for the sensor data and model, respectively. The difference may be calculated by performing an elementwise subtraction of the pixel values. The resulting difference may be an array or matrix representation of an image, wherein each element is a pixel value.

At block 2914, a determination is made as to whether a deviation is present in sensor data. Block 2914 may include determining whether a deviation exists in the sensor data captured at block 2908 with respect to the baseline state of the resource-constrained environment reflected in the sensor data captured at block 2902. For example, block 2914 may include determining whether there is at least one pixel value in the difference calculated at block 2912 that is greater than a predefined threshold (e.g., greater than 64 on a 0 to 256 pixel value scale). As another example, block 2914 may include determining whether there is a cluster of pixels (e.g., 16 adjacent pixels) with each having a pixel value in the difference calculated at block 2912 that is greater than a predefined threshold (e.g., each pixel value greater than 64 on a 0 to 256 pixel value scale).

If the determination at block 2914 results in a determination that no deviation is present in the sensor data captured at block 2908, then the process continues at block 2918. At block 2918, no action is taken. In some embodiments, no action is taken at block 2918 because no deviation is present in the resource-constrained environment. In some embodiments, some action may be taken at block 2918. In some embodiments, the action taken at block 2918 may include taking some action that is different from the action performed at block 2916.

If the determination at block 2914 results in a determination that a deviation is present in the sensor data captured at block 2908, then the process continues at block 2916. At block 2916, an action is performed based on the determination that a deviation is present in the resource-constrained environment. For example, block 2916 may include activating an indicator, controlling the operation of an automobile, controlling the operation of an external computer system, and/or some other action. In some embodiments, block 2914 may include performing any of the actions described for block 2722 of process 2700 in FIG. 27 and/or any of the actions described for block 2822 of process 2800 in FIG. 28.

In some embodiments, process 2900 may include determining a location of a deviation in the resource-constrained environment. For example, if block 2914 results in a determination that deviation is present in the resource-constrained environment based on a cluster of high pixel values in a difference array (as calculated at block 2912), then process 2900 may further include determining a location of the deviation. Continuing the example, the process 2900 may include determining a center of the cluster of high pixel values (e.g., arithmetic mean of x and y coordinates). Continuing the example, the process 2900 may include identifying a location in which the center of the cluster is located. For instance, different zones (e.g., rectangles each defined by four x, y coordinates) may be defined on image area (e.g., driver's seat, center console, passenger seat, dashboard, etc.). In such an instance, the location of the deviation may be determined by determining in which zone the center of the cluster is located. In some embodiments, the location determined for the deviation may be used to determine what action to take at block 2916.

In some embodiments, the process 2900 may include determining the type of deviation that is present in the resource constrained environment. For example, a second neural network may be trained using only images of deviations (e.g., image of a smartphone, image of a wallet, image of a stained seat). When a deviation is determined to be present in the resource-constrained environment at block 2914, the process 2900 may include cropping the sensor data captured at block 2908 to tightly bound the detected deviation (e.g., tightest bounding rectangle possible around the cluster of high pixel values in the calculated difference without excluding any of the high pixel values). Continuing the example, the cropped sensor data may be provided as input to the second neural network, the output of which (e.g., a highest confidence deviation label) may be used to determine the deviation present in the resource-constrained environment). In such embodiments, when more than one cluster of high pixel values exist in the calculated difference, the deviation-identification approach just described may be repeated for each cluster.

According to the foregoing description of process 2900, including the aforementioned modifications thereto, the process 2900 may include outputting a description of the detected deviation and its location at block 2916. For example, the aforementioned techniques may be used to determine that the location of the deviation is "food wrapper" and the location is "driver footwell." In such an example, the process 2900 may output "food wrapper in driver footwell" at block 2916 (with or without addition actions). As another example, the aforementioned techniques may be used to determine that the location of a first deviation is "cup" with a location of "center console," and a second deviation of "stain" with a location of "front passenger seat." In such an example, the process 2900 may output "(1) cup in center console; (2) stain on front passenger seat" at block 2916 (with or without addition actions).

In various embodiments, process 2900 may be performed using structures described elsewhere herein. For example, blocks 2902 and 2908 may be performed using sensors described elsewhere herein (e.g., sensors 460, 472, 716, 765, 766, 767, 768, 769, 800, 1316, 1416, 1516, 1518, 1616, 1618, 1716). As a further example, blocks 2910, 2912, 2914, 2916, and 2918 may be performed using computing devices described elsewhere herein (e.g., computing devices 726, 776, 1100, 1316, 1416, 1526, 1626, 1726). As a further example, blocks 2904, 2906, 2910, 2912, 2914, 2916, and 2918 may be performed using computing devices described elsewhere herein (e.g., computing devices 720, 770, 1000, 1320, 1420, 1520, 1620, 1720). As a further example, blocks 2916 and 2918 may be performed using described elsewhere herein (e.g., controllers 728, 778, 1200, 1328, 1428, 1528, 1628, 1728).

Figure 30:
FIG. 30 is a diagram of sensor data and difference calculations according to some embodiments of the present disclosure.
Figure 30:
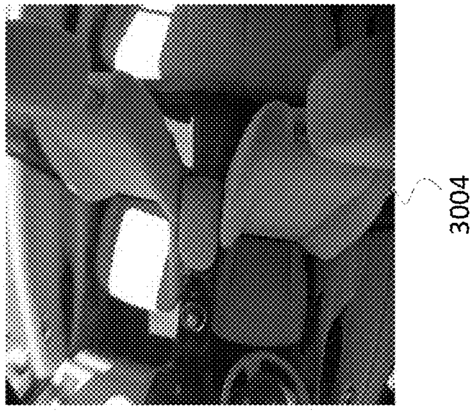
Figure 30:
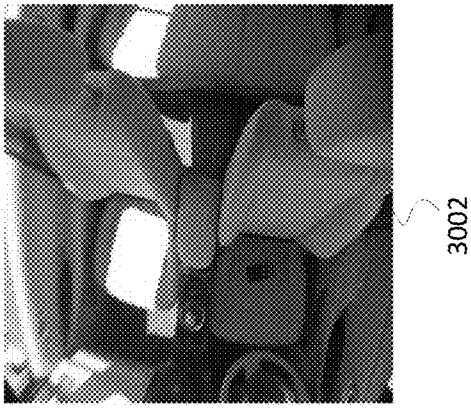
Figure 31:
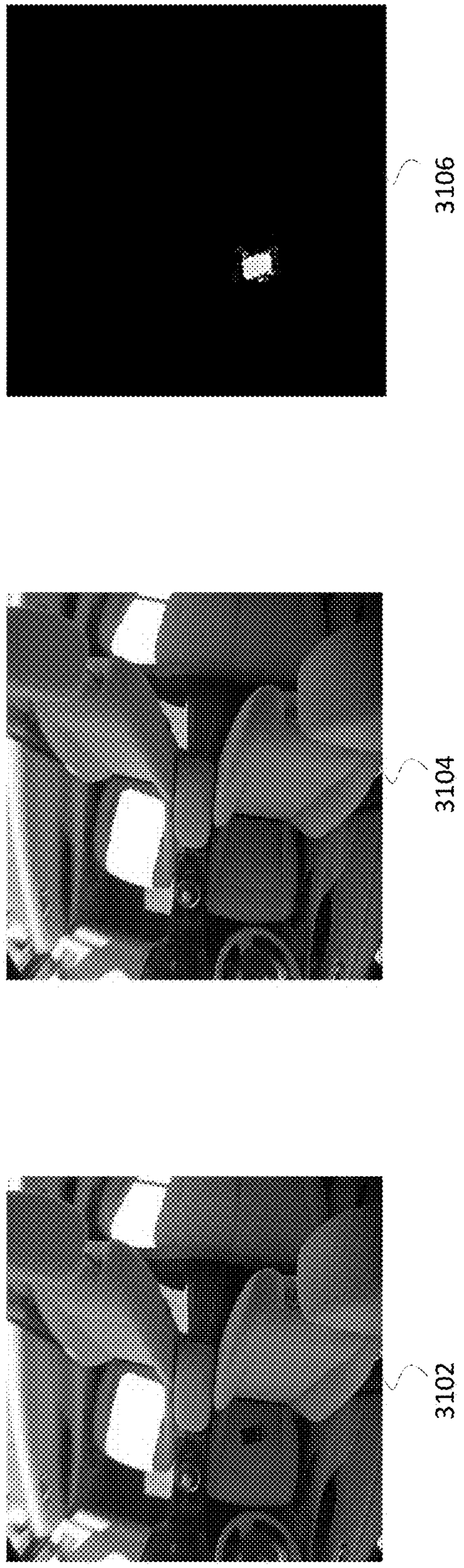
FIG. 31 is a diagram of sensor data and difference calculations according to some embodiments of the present disclosure.

FIGS. 30 and 31 are diagrams of sensor data and difference calculations according to some embodiments of the present disclosure. Image 3002 is an example of sensor data captured of a resource-constrained environment (e.g., as captured at block 2716, block 2808, block 2908). Image 3004 is an example of baseline sensor data captured of a resource-constrained environment (e.g., as captured at block 2702, block 2802, block 2902). Image 3002 shows a deviation from the baseline state of the automobile interior. Specifically, image 3002 includes a smartphone present in the driver's seat.

Image 3006 is a difference calculated between image 3002 and image 3004. In image 3006, the minimum difference (i.e., no difference) between a pixel in image 3002 and image 3004 is shown in black. The maximum difference between a pixel in image 3002 and image 3004 is shown in white. Intermediate differences in pixel values are shown in other colors. Image 3006 contains a cluster of high pixel values at the location of the smartphone, which accurately identifies the presence of the deviation (i.e., the smartphone). However, the image 3006 also contains many non-zero pixel values elsewhere, which inaccurately identify deviations where there are none. As such, image 3002, image 3004, and image 3006 illustrate that a difference calculation based on a single baseline image of the resource-constrained environment may tend to be error prone.

Image 3102 is an example of sensor data captured of a resource-constrained environment (e.g., as captured at block 2716, block 2808, block 2908). Image 3104 is an example of a model generated of a resource-constrained environment (e.g., as generated at block 2910). Image 3102 shows a deviation from the baseline state of the automobile interior. Specifically, image 3002 includes a smartphone present in the driver's seat.

Image 3106 is a difference calculated between image 3102 and model 3104. In image 3106, the pixel difference values are shown as previously described for image 3006. Image 3106 contains a cluster of high pixel values at the location of the smartphone, which accurately identifies the presence of the deviation (i.e., the smartphone). In contrast to image 3006, image 3106 does not contain any other high pixel values, which accurately identifies that there are no other deviations in image 3102.

Figure 32:
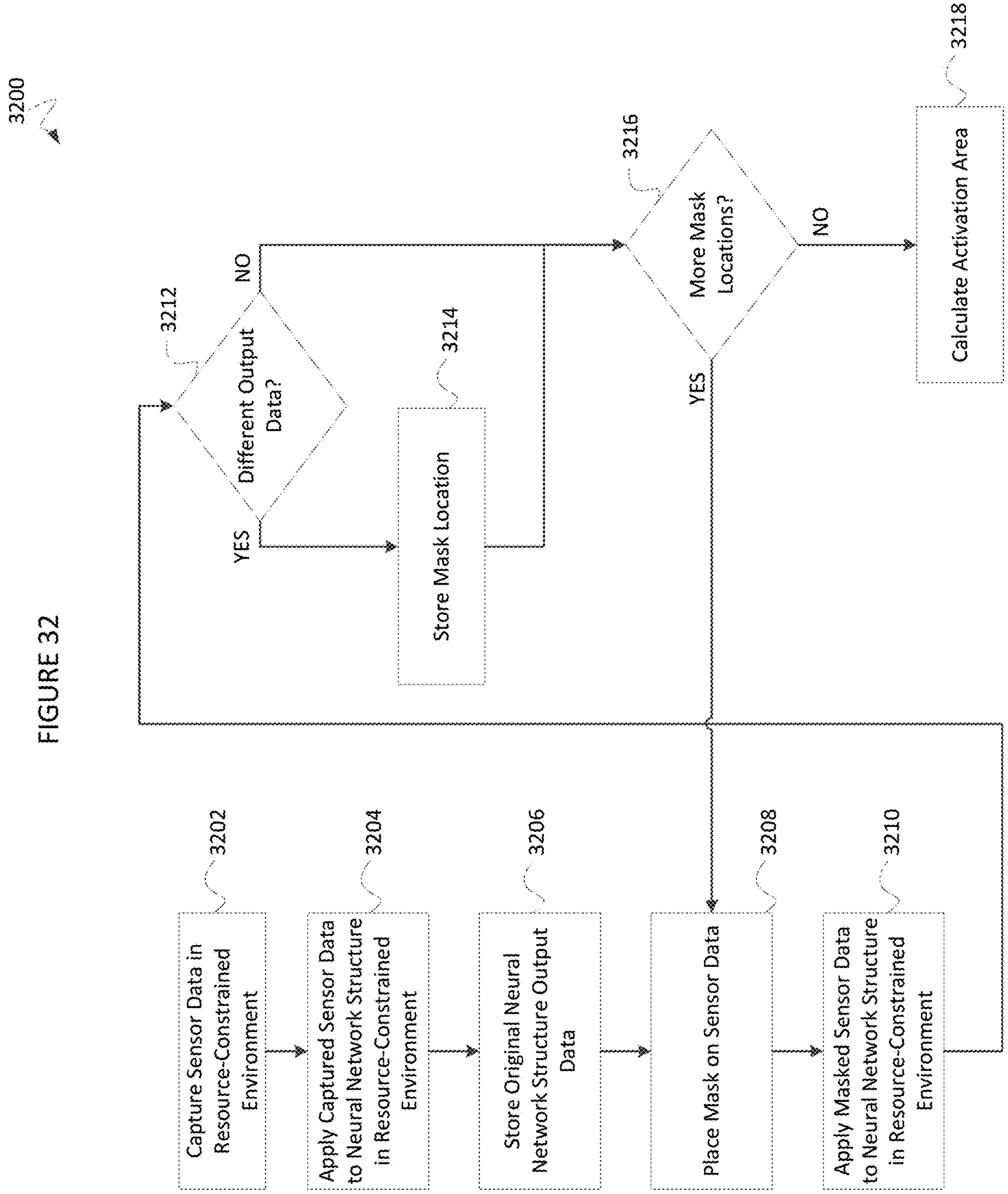
FIG. 32 is a flowchart of a process for employing a neural network in a resource-constrained environment according to some embodiments of the present disclosure.

FIG. 32 is a flowchart of a process 3200 for employing a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610). In some embodiments, the process 3200 may be performed after having captured sensor data in a resource constrained environment (e.g., block 2702, 2802, 2902) and after having trained a neural network structure based on that sensor data (e.g., block 2710, 2804, 2904).

At block 3202, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 3204, the sensor data captured at block 3202 is applied to the neural network structure in the resource-constrained environment. In some embodiments, block 3204 may include providing the sensor data captured at block 3202 as input to the neural network structure.

At block 3206, output data of the neural network structure is stored. Block 3206 may include storing a classification and confidence level generated by applying the sensor data as input to the neural network structure at block 3204. For example, if the result of block 3204 is a prediction of "touching head unit" with a confidence level of 90%, then "touching head unit" and 90% are stored at block 3206. The neural network structure output data stored at block 3206 may be referred to as "original" neural network structure output data in this context, because the output data is the output of the neural network structure prior to any masking activity described hereinafter.

At block 3208, a mask is applied to the sensor data captured at block 3202. A mask may include deleting a portion of the actual sensor data and replacing it with default value sensor data. For example, if the sensor data is an image (e.g., with each pixel value on a 0 to 256 grayscale), then a mask may be a rectangle (e.g., 4 pixels by 4 pixels) of all-black pixels (pixel value of 0). In this example, placing the mask on the sensor data at block 3208 may include replacing the top-rightmost 4×4 rectangle of pixels with the mask of all-black pixels.

At block 3210, the masked sensor data generated at block 3208 is applied to the neural network structure. The neural network structure may be the same neural network structure used at block 3204. Block 3210 may result in generating new neural network structure output data reflecting the new input (i.e., the masked sensor data). For example, block 3210 may result in generating a new prediction (e.g., "touching head unit") with a new confidence level (e.g., 91%). The new class prediction may be the same or different from the original neural network structure output data. The new confidence level may be the same or different from the original neural network structure output data.

At block 3212, a determination is made as to whether block 3210 resulted in different output data than the original neural network structure output data. For example, block 3212 may include determining whether the new class prediction is different from the class prediction in the stored original neural network structure output data. Continuing the example, block 3212 may include determining whether the new confidence level is different from the class prediction in the stored original neural network structure output data. In some embodiments, block 3212 may include determining whether the new output data is different from the original output data by a sufficient minimum threshold. For example, the determination at block 3212 may result in a determination of "yes" if either the class prediction has changed or the confidence level has changed by 10% (either up or down).

If the determination at block 3212 results in a determination that block 3210 resulted in different neural network output data, then the process continues at block 2914. At block 3214, the mask location is stored. Block 3214 may include storing the location of all pixels covered by the mask applied at the most recent iteration of block 3208. For example, block 3214 may include storing the four x, y coordinates of the rectangular mask used at the most recent iteration of block 3208.

If the determination at block 3212 results in a determination that block 3210 resulted in different neural network output data, then the process continues at block 3216.

At block 3216, a determination is made as to whether any more locations are available for placement of the mask. For example, block 3216 may include determining whether any pixels in the sensor data captured at block 3202 have not yet been covered by the mask in an iteration of block 3208. As another example, block 3216 may include determining whether any pixel in the sensor data captured at block 3202 has not been covered by the mask in at least four iterations of block 3208. As another example, block 3216 may include determining whether any pixel in the sensor data captured at block 3202 has not yet been the center position of the mask in a previous iteration of block 3208.

If the determination at block 3216 results in a determination that there are more mask locations available, then process 3200 continues at block 3208.

If the determination at block 3216 results in a determination that there are no more mask locations available, then process 3200 continues at block 3218. At block 3218, an activation area is calculated. An activation area may be an area of the sensor data that has a significant impact on the output of the neural network structure. Stated somewhat less formally, the activation area may illustrate what areas the neural network is "using" to classify the sensor data.

The activation area may be calculated at block 3218 using a variety of techniques. For example, the activation area may be calculated as the set of all pixels stored at any iteration of block 3214. As another example, the activation area may be calculated as the set of all pixels stored in at least four different iterations of block 3214. In some embodiments, the calculated activation area may be used to generate a visual heatmap for the neural network structure.

In some embodiments, the same neural network structure may have multiple activation areas. For example, a separate activation area may be defined for each potential output classification of the neural network structure. For example, if the potential classification outputs of the neural network structure are "safe driving," "texting," "touching headunit," and "talking," then there may be four different activation areas for the neural network structure.

In various embodiments, process 3200 may be performed using structures described elsewhere herein. For example, block 3202 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3204, 3206, 3208, 3210, 3212, 3214, 3216, and 3218 may be performed using computing devices described elsewhere herein (e.g., computing devices 726, 776, 1100, 1316, 1416, 1526, 1626, 1726). As a further example, blocks 3204, 3206, 3208, 3210, 3212, 3214, 3216, and 3218 may be performed using computing devices described elsewhere herein (e.g., computing devices 720, 770, 1000, 1320, 1420, 1520, 1620, 1720).

Figure 33:
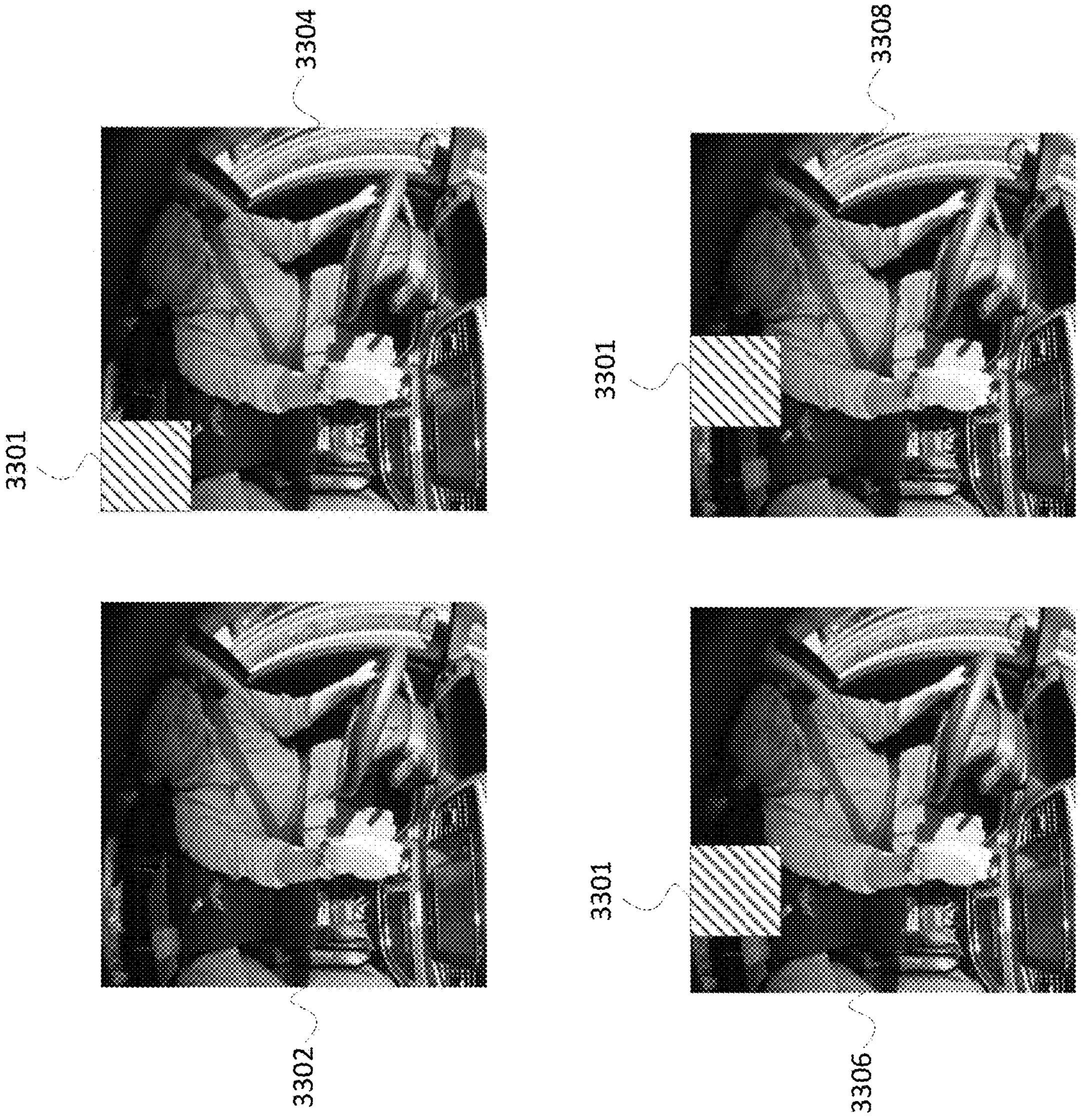
FIG. 33 is a diagram of sensor data and activation area calculation according to some embodiments of the present disclosure.

FIG. 33 is a diagram of sensor data and activation area calculation according to some embodiments of the present disclosure. Image 3302 is an example of sensor data captured of a resource-constrained environment (e.g., as captured at block 2716, block 2808, block 2908). Image 3302 shows a driver touching a headunit with his right hand. Image 3304 is the same as image 3302 except that a mask 3301 is placed over the top-leftmost corner of the image 3304. While the mask 3301 is illustrated with hashed lines for clarity, the mask 3301 may be all black pixels in some embodiments. Image 3306 is the same as image 3302 and image 3304 except that the mask 3301 is located to the right of the location of the mask 3301 on image 3304. Image 3308 is the same is an image 3302, image 3304, and image 3306 except that the mask 3301 is located to the right of the location of the mask 3301 on image 3304 and image 3306. Images 3302, 3304, 3306, and 3308 thereby illustrate a technique for iteratively moving a mask over different locations of a sensor data image. In some embodiments, each of image 3302, 3304, 3306, and 3308 may be input to the same neural network structure in order to calculate the activation area for the "touching headunit" classification on the neural network structure.

Figure 34:
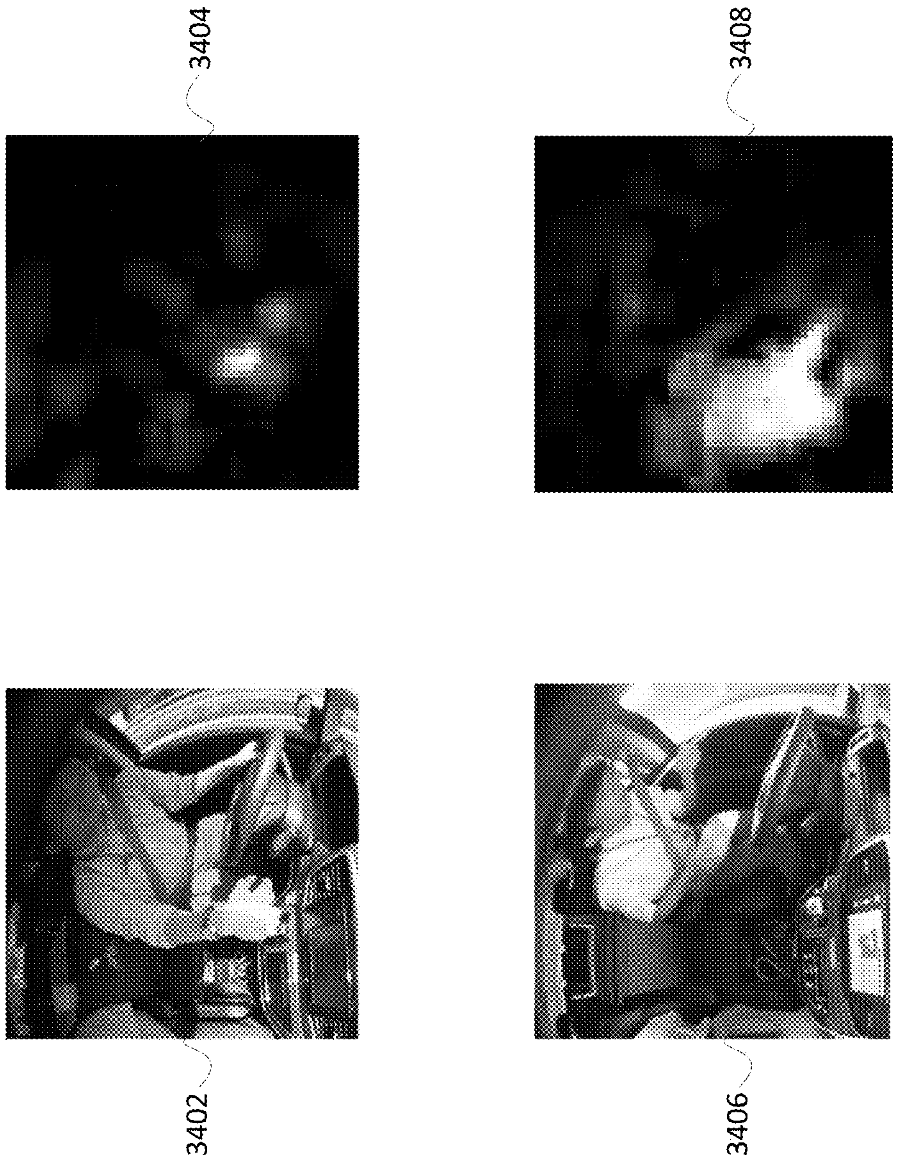
FIG. 34 is a diagram of sensor data and activation area calculation according to some embodiments of the present disclosure.

FIG. 34 is a diagram of sensor data and activation area calculation according to some embodiments of the present disclosure. Image 3402 is an example of sensor data captured of a resource-constrained environment (e.g., as captured at block 2716, block 2808, block 2908). Image 3402 shows a driver touching a headunit with his right hand. Image 3406 is an example of sensor data captured of a resource-constrained environment (e.g., as captured at block 2716, block 2808, block 2908). Image 3406 shows a driver eating with his right and left hands.

Image 3404 and image 3408 are examples of activation areas (e.g., as calculated at block 3218). Image 3404 is an activation area calculated based on the sensor data image 3402. Image 3408 is calculated based on the sensor data image 3406. In the example activation areas 3404 and 3408, each pixel of the activation area is shown with a color intensity based on the significance of difference contributed to the neural network structure output data from that pixel. For example, a pixel that caused a change in class prediction (e.g., from "touching headunit" to "texting") may be shown in white. A pixel that did not cause a change in class prediction but caused a change in confidence level by 25% or more is shown in light gray. A pixel that did not cause a change in class prediction but caused a change in confidence level by more than 10% but less than 25% is shown in dark gray. And a pixel that did not contribute to a change in class prediction or a change in confidence level of more than 10% is shown in black.

Figure 35:
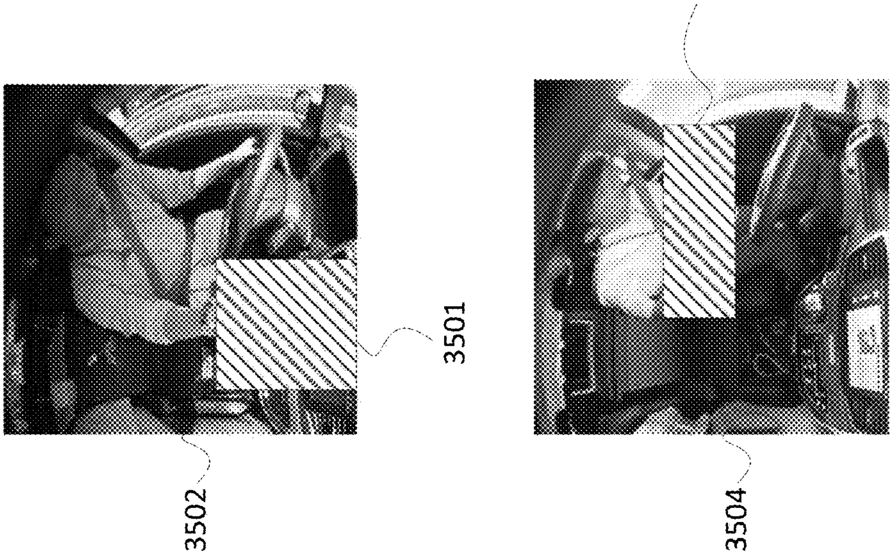
FIG. 35 is a diagram of sensor data and activation area expectation according to some embodiments of the present disclosure.

FIG. 35 is a diagram of sensor data and activation-area expectation according to some embodiments of the present disclosure. A calculated activation area may be beneficial for a number of reasons in various embodiments of the present disclosure.

In some embodiments, a calculated activation area may be used to determine the effectiveness of a neural network structure. In such embodiments, an expected activation area may be defined. The expected activation area may be an area of an image that is expected (e.g., by an expert operator) to be part of the calculated activation area. The calculated activation area may then be calculated after the neural network structure has been trained. The similarity or difference between the expected activation area and the calculated activation area may indicate the effectiveness or ineffectiveness of the neural network structure.

For example, an expert operator may define an activation area 3501 for the "touching headunit" classification of a neural network structure as shown overlaid on an image 3502. The expert operator may define the activation area 3501 because it bounds the headunit area of the automobile as shown in the image. An expert operator may define an activate area 3503 for the "eating" classification of a neural network structure as shown overlaid on an image 3504. The expert operator may define the activate area 3503 because it bounds the area where a driver would typically have his hands when eating while driving. In some embodiments, an expected activation area may be automatically calculated.

Using expected activation areas 3501 and 3503, a neural network structure may be evaluated. In particular, a neural network structure is used to create the calculated activation areas 3404 and 3408. By comparing the calculated activation areas 3404 and 3408 with the expected activation areas 3501 and 3503, the neural network structure may be evaluation.

For example, a comparison of the calculated activation area 3404 for the "touching headunit" classification with the expected activation rea 3501 for the "touching headunit" classification shows that highest pixel values in the calculated activation area 3404 (representing greater significance in the activation area) fall within the expected activation area 3501. This indicates that the neural network structure is effectively identifying when a driver is touching the headunit.

As another example, a comparison of the calculated activation area 3408 for the "eating" classification with the expected activation rea 3503 for the "eating" classification shows that highest pixel values in the calculated activation area 3408 (representing greater significance in the activation area) fall outside the expected activation area 3501. In particular, the neural network structure is placing greater significance on the area down-to-the-left of the driver when predicting the "eating" classification. This is unexpected and indicates that the neural network structure is not effectively identifying when a driver is eating.

The result of this comparison may be used in numerous ways. For example, in the case of ineffective identification of a classification, the system employing the neural network structure may perform new iterations of sensor data capture when a driver is eating and retrain the neural network structure using the newly captured sensor data. This activity may be performed in order to train the neural network structure to more effectively identify the "eating" classification. As another example, the system employing the neural network structure may periodically (e.g., every week) calculate the calculated activation areas and perform the comparison with the expected activation areas in order to monitor the effectiveness of the neural network structure over time.

In some embodiments, the determination of an ineffective identification of a classification may result in a notification being provided to the expert operator. The expert operator may then manually compare the calculated activation zones to the expected activation zones to determine where the divergence between the two are occurring. By doing so, the expert operator may identify a new and correct pattern that the neural network structure has detected. As a result, the expert operator may modify the expected activation zones to account for the newly identified pattern.

In some embodiments, the comparison of the calculated activation zone to the expected activation zone may be performed automatically. For example, an activation zone score may be calculated as the percentage of pixels from the calculated activation zone that fall within the bounds of the expected activation zone. An activation zone score above a predefined threshold (e.g., 50%) may be considered "effective" or "acceptable", while an activation zone score below a predefined threshold (e.g., below 50%) may be considered "ineffective" or "unacceptable."

In some embodiments, a calculated activation area may be used to reduce the resource demands of the system employing neural network structure. For example, the system may calculate the calculated activation zones for all output classifications as described elsewhere herein. The system may then determine any pixels that are not in the calculated activation zones for any output classification, which may be referred to in this context as "unused" pixels. Thereafter, when captured sensor data is applied as input to the neural network structure (e.g., as performed at blocks 2718, 2810), all unused pixels in the captured sensor data may be ignored. In this way, the input data to the neural network structure may be reduced, which may thereby reduce the processing resources and processing time needed to apply the captured sensor data as input to the neural network structure. In some instances, the unused pixels may account for a significant portion of the captured sensor data. In some embodiments, unused pixels may also be ignored in subsequent retraining of the neural network structure.

Figure 36A:
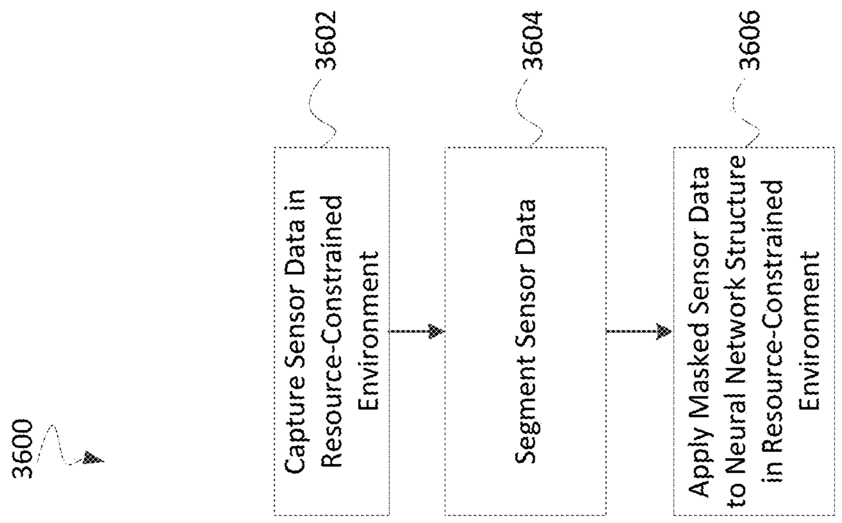
FIG. 36A is a flowchart of a process for segmenting sensor data for use with a neural network in a resource-constrained environment according to some embodiments of the present disclosure.

FIG. 36A is a flowchart of a process 3600 for segmenting sensor data for use with a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610). In some embodiments, the process 3600 may be performed after having captured sensor data in a resource constrained environment (e.g., block 2702, 2802, 2902) and after having trained a neural network structure based on that sensor data (e.g., block 2710, 2804, 2904).

At block 3602, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 3604, the sensor data captured at block 3602 is segmented. Segmenting the sensor data may include deleting a portion of the actual sensor data and replacing it with default value sensor data. For example, if the sensor data is an image of the interior of an automobile, and the image shows both the driver of the automobile and a passenger of the automobile, segmenting the sensor data may include replacing the captured pixel values in the portion of the image showing the passenger with a default pixel value (e.g., a black pixel value).

At block 3606, the sensor data segmented at block 3604 is applied to the neural network structure in the resource-constrained environment. In some embodiments, the process 3600 may include performing other actions, such as described elsewhere herein (e.g., blocks 2020, 2122, 2124, 2220, 2222, 2320, 2322, 2420, 2422, 2822, 2824, 2916, 2918).

In various embodiments, process 3600 may be performed using structures described elsewhere herein. For example, block 3602 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3604 and 3606 may be performed using computing devices described elsewhere herein (e.g., computing devices 726, 776, 1100, 1316, 1416, 1526, 1626, 1726). As a further example, blocks 3604 and 3606 may be performed using computing devices described elsewhere herein (e.g., computing devices 720, 770, 1000, 1320, 1420, 1520, 1620, 1720).

Figure 36B:
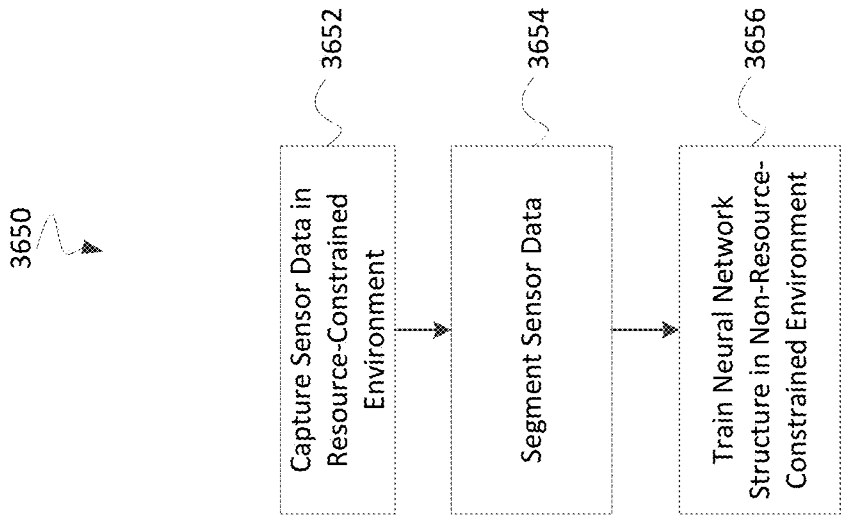
FIG. 36B is a flowchart of a process for segmenting sensor data for use with a neural network in a resource-constrained environment according to some embodiments of the present disclosure.

FIG. 36B is a flowchart of a process 3650 for segmenting sensor data for use with a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610).

At block 3652, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716).

At block 3654, the sensor data captured at block 3652 is segmented. Segmenting the sensor data may include deleting a portion of the actual sensor data and replacing it with default value sensor data. For example, if the sensor data is an image of the interior of an automobile, and the image shows both the driver of the automobile and a passenger of the automobile, segmenting the sensor data may include replacing the captured pixel values in the portion of the image showing the passenger with a default pixel value (e.g., a black pixel value).

At block 3656, a neural network structure is trained in the non-resource-constrained using the sensor data segmented at block 3654. The training of the neural network structure may be performed as described elsewhere herein (e.g., as described for neural network structures 600, 650). In some embodiments, the sensor data captured from the resource-constrained environment may be labelled prior to or as part of block 3656.

In some embodiments, the process 3650 may include performing other actions, such as described elsewhere herein (e.g., blocks 2020, 2122, 2124, 2220, 2222, 2320, 2322, 2420, 2422, 2822, 2824, 2916, 2918, 3602, 3604, 3606).

In various embodiments, process 3650 may be performed using structures described elsewhere herein. For example, blocks 3652 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3654 and 3656 may be performed using computing devices described elsewhere herein (e.g., computing devices 726, 776, 1100, 1316, 1416, 1526, 1626, 1726). As a further example, blocks 3654 and 3656 may be performed using computing devices described elsewhere herein (e.g., computing devices 720, 770, 1000, 1320, 1420, 1520, 1620, 1720).

In some embodiments, the processes 3600 and/or 3650 may be used as part of or in conjunction with other processes described elsewhere herein (e.g., processes 2000, 2100, 2200, 2300, 2400, 2800, 2900, 3200, 3600, 3650). For example, in some embodiments, process 3650 may be performed prior to performing process 3600.

Figure 37:
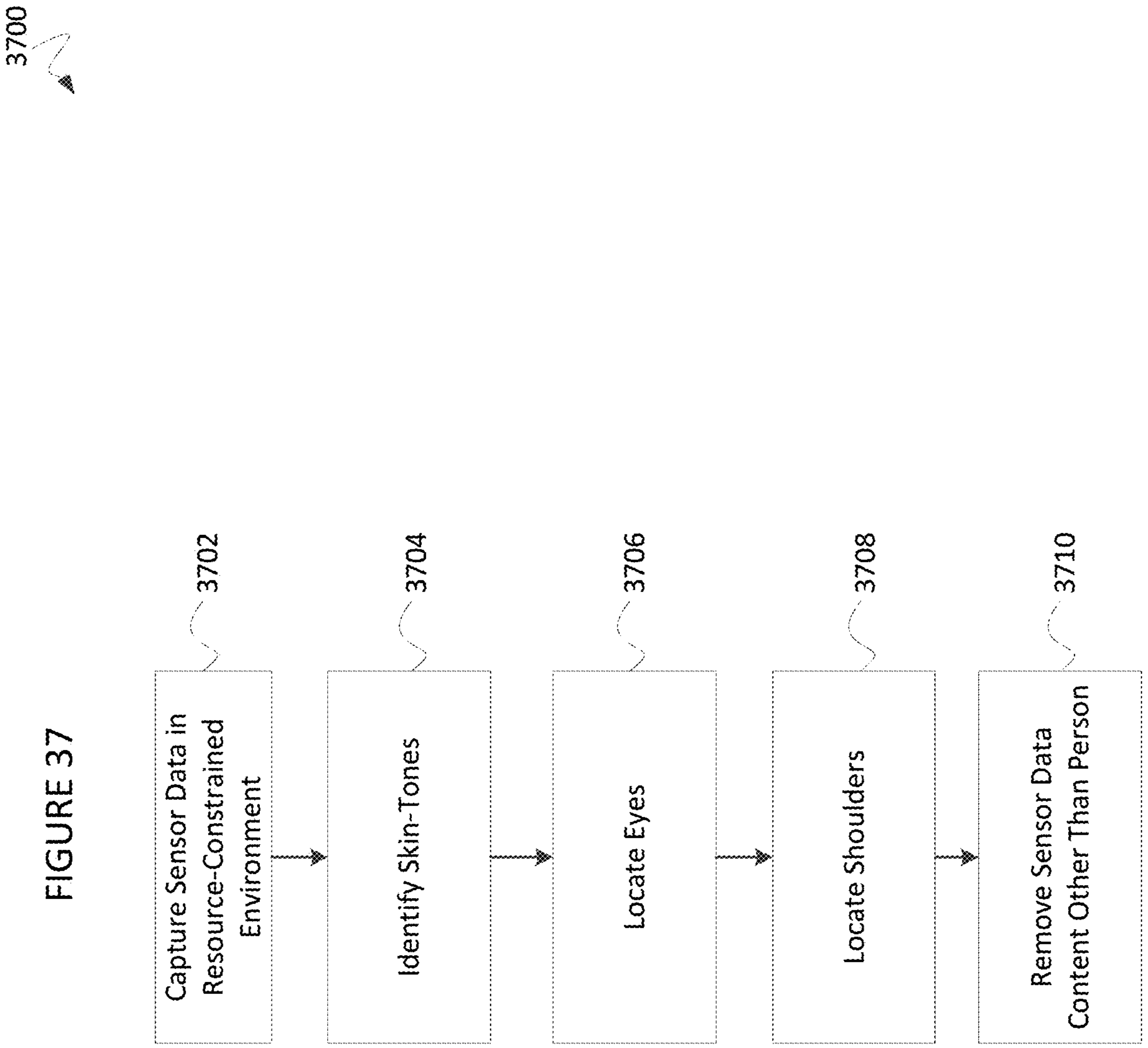
FIG. 37 is a flowchart of a process for segmenting sensor data for use with a neural network in a resource-constrained environment according to some embodiments of the present disclosure.

FIG. 37 is a flowchart of a process 3700 for segmenting sensor data for use with a neural network in a resource-constrained environment according to some embodiments of the present disclosure. For example, the resource-constrained environment may be an automobile as described elsewhere in the present disclosure (e.g., automobiles 110, 300, 400, 710, 1510, and/or 1610). In some embodiments, the process 3700 may be performed as part of a segmenting activity described elsewhere herein (e.g., blocks 3604, 3654).

At block 3702, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). In some embodiments the sensor data may be an image of an interior of an automobile. In some embodiments, the image of the interior of the automobile may include a driver present in the automobile.

At block 3704, skin tones are identified in the sensor data. Block 3704 may include using an image processor to identify locations in the image where colors matching typical human skin tones are present. In some embodiments, a face of a driver of the automobile may be determined based on the identification of skin tones in the image. For example, block 3704 may include identifying all clusters of pixels with a human skin tone consisting of at least a predefined minimum number of pixels (e.g., at least 20 pixels). Continuing the example, block 3704 may include identifying one of the clusters as being the face of the driver based on the locations of the clusters (e.g., selecting the largest cluster in the top-right quadrant of the image as the face of the driver).

At block 3706, eyes are located in the sensor data. Block 3706 may include using a facial recognition algorithm to identify the location of a face and the associated eyes within the image. In some embodiments, the facial recognition algorithm performed at block 3706 may be performed in only portions of the image. For example, the facial recognition algorithm may only be used to locate human eyes in or immediately adjacent to clusters of pixels identified at block 3704 as containing human skin tones. As another example, the facial recognition algorithm may only be used to locate human eyes in or immediately adjacent to a cluster of pixels identified at block 3704 as corresponding to the face of the driver of the automobile. In at least that way, the performance of block 3704 may be used to reduce the search space for the location of eyes at block 3706.

At block 3708, shoulders are located in the sensor data. Block 3708 may include estimating the location of the shoulders based on the location of the eyes determined at block 3706. For example, block 3708 may include using an image processor to identify concave shapes facing outward in a space immediately below and to the sides of the face and/or eyes identified at blocks 3704 and 3706, respectively. As another example, block 3708 may include measuring down and outward from each eye identified at block 3706 for a predefined number of pixels (e.g., 30 pixels), and marking the resulting locations as the shoulders. In some embodiments, the technique of measuring a distance from the eyes to identify the shoulders may include using a dynamic number of pixels for the measurement (e.g., based on the image size, based on the number of pixels between the eyes identified at block 3706, and/or based on the number of pixels contained in the face cluster identified at block 3704).

At block 3710, sensor data content is removed other than a person. Block 3710 may include masking the image of the interior of the automobile to the driver. For example, masking the image to the driver may include replacing all pixel values outside the area of the image occupied by the driver with a default pixel value (e.g., black pixel value). In some embodiments, the block 3710 may be performed based on the identification of skin tones, face, eyes, and/or shoulders as performed at blocks 3704, 3704, 3706, 3708, respectively. For example, block 3710 may include measuring a predefined number of pixels out from the locations of the locations of the eyes and shoulders as identified at block 3706 and 3708, respectively. As another example, block 3710 may include providing the image as well as the location of the eyes and/or the location of the shoulders as input to an image processor, the image processor which identify the outline of a human based on the provided input. In some embodiments, the image may be reduced in size by cropping the image to smaller dimensions to remove the content other than the person.

In various embodiments, process 3700 may allow a neural network structure to be more accurate. In particular, as described elsewhere herein (e.g., processes 1800, 1900, 2000, 2100, 2200, 2300, 2400, 2700, 2800, 2900, 3200, 3600, 3650), sensor data may be used to train a neural network structure and/or provided as input to an already trained neural network structure. When the sensor data includes extraneous aspects not pertinent to the accurate determination of a driver or automobile state, the extraneous aspects of the sensor data may cause the neural network structure to be less accurate. For instance, in a case where the neural network structure is used to determine if the driver is in a "safe" or in an "unsafe" state, but the images (i.e., the sensor data) are color images of the entire interior of the automobile, the neural network structure may be less accurate. For example, as a result of training, the neural network structure may inadvertently use the upholstery color or the position of the passenger headrest as a factor in determining the state of the driver. As another example, if the neural network structure is trained using images from a small compact car, the neural network structure may be inaccurate in predicting driver state when the images applied as input are captured in a large pickup truck. By removing sensor data content other than the driver, the neural network structure may be more accurately trained and more accurately applied to determine the driver state only based on relevant aspects of the driver's body. Similar benefits inure when segmenting an image to include only relevant aspects of the interior of an automobile when the neural network is trained and applied to detect deviations from normal configurations of the interior of the automobile.

In various embodiments, process 3700 may be performed using structures described elsewhere herein. For example, block 3702 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3704, 3706, 3708, and 3710 may be performed using computing devices described elsewhere herein (e.g., computing devices 726, 776, 1100, 1316, 1416, 1526, 1626, 1726). As a further example, blocks 3704, 3706, 3708, 3710 may be performed using computing devices described elsewhere herein (e.g., computing devices 720, 770, 1000, 1320, 1420, 1520, 1620, 1720).

Figure 38:
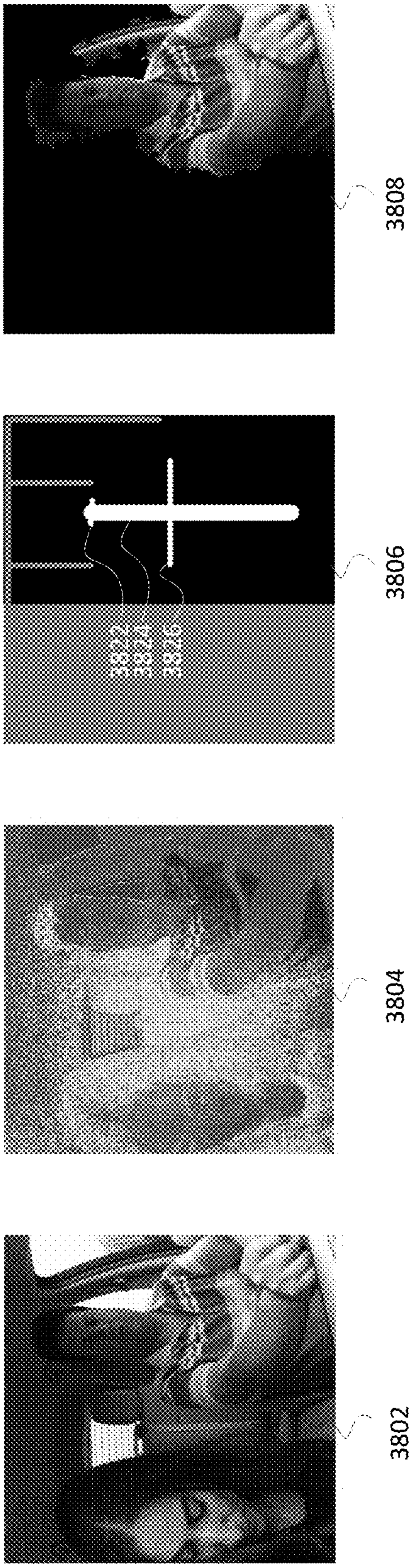
FIG. 38 is a diagram of sensor data and sensor data segmenting according to some embodiments of the present disclosure.

FIG. 38 is a diagram of sensor data and sensor data segmenting according to some embodiments of the present disclosure. In some embodiments, the process 3700 may be performed as part of a segmenting activity described elsewhere herein (e.g., blocks 3604, 3654, process 3700).

Image 3802 is an image of an interior of an automobile. Image 3802 includes a driver (man to the right) and a passenger (woman to the left). Image 3802 may be captured by any of a variety of sensors, such as described with respect to sensors elsewhere in the present disclosure (e.g., sensors 232, 234, 460, 472, 716, 800, 1516, 1518, 1616, 1716). In some embodiments, image 3802 may be captured as sensor data at block 3702 as part of process 3700.

Image 3804 is an image of an interior of an automobile that may be used for identifying human skin tones. Image 3804 may be generated as a transformation of image 3802. For example, image 3804 may be generated from image 3802 by increasing the amplitude, contrast, or other characteristic of pixels with a predefined pixel value corresponding to a human skin tone. In some embodiments, image 3804 may be used to identify skin tones and/or a face at block 3704 as part of process 3700.

Image 3806 is a model of the interior of an automobile that estimates the location of eyes and shoulders of a person. Image 3806 includes an estimation of a person's eyes (i.e., line 3822, the short horizontal line towards top-center of image 3806). Image 3806 includes an estimation of a person's shoulders (i.e., line 3826, the long horizontal line towards middle of image 3806). Image 3806 includes an estimation of a person's torso (i.e., line 3824, the long vertical line in middle of image 3806). In some embodiments, image 3806 may be generated using an image processor so as to identify the location of a person in image 3802. In some embodiments, image 3806 may be generated at blocks 3706 and 3708 as part of process 3700.

Image 3808 is an image of the interior of an automobile that has been segmented to the driver. Image 3808 includes the portions of image 3802 that correspond to the driver of the automobile. However, image 3808 has been masked for portions of image 3802 that do not correspond to the driver of the automobile. In image 3808, the non-driver portions of the image are masked by changing the pixels in those portions to all be black. In some embodiments, image 3808 may be generated at block 3710 as part of process 3700.

In embodiments of the present disclosure, the segmenting of sensor data described herein (e.g., processes 3600, 3650, 3700) may provide various benefits. First, the segmenting of sensor data may reduce the size of the sensor data, and thereby reduce the computation time and/or resources needed to train a neural network structure. Second, the segmenting of sensor data may reduce the size of the sensor data, and thereby reduce the computation time and/or resources needed to apply the sensor data as input to a neural network structure. In such cases, the providing of segmented sensor data as input to the neural network structure may allow more effective use of the limited computing resources available in the resource-constrained environment. Additionally, the providing of segmented sensor data as input to the neural network structure may allow faster determination of a result of the application of the sensor data as input to the neural network structure, and thus action may be taken more rapidly based on the result of the application of the sensor data as input to the neural network structure. This may be especially beneficial in some resource-constrained environments (e.g., an automobile), where the actions taken based on the results of the application of the sensor data as input to the neural network structure may include actions that impact the safety of a person (e.g., reducing the velocity of an automobile).

Third, the segmenting of sensor data may improve the effectiveness of the neural network structure. For example, if the neural network structure is used to determine the state of the driver of an automobile, it is possible that the neural network structure may provide some weighting (i.e., give some "importance") to the values of the pixels in the area of the front passenger seat. However, the portion of the image covering the front passenger seat may have little predictive value as to the state of the driver of the automobile. Thus, any weighting applied to the pixels in that portion of the image may create inaccuracies in the results of the neural network structure in determining the state of the driver of the automobile. In such a case, the segmenting of the image to remove the captured pixel values from the portion of the image covering the front passenger seat may remove this inaccurate weighting and thereby improve the effectiveness of the neural network structure in determining the state of the driver of the automobile.

Figure 39A:
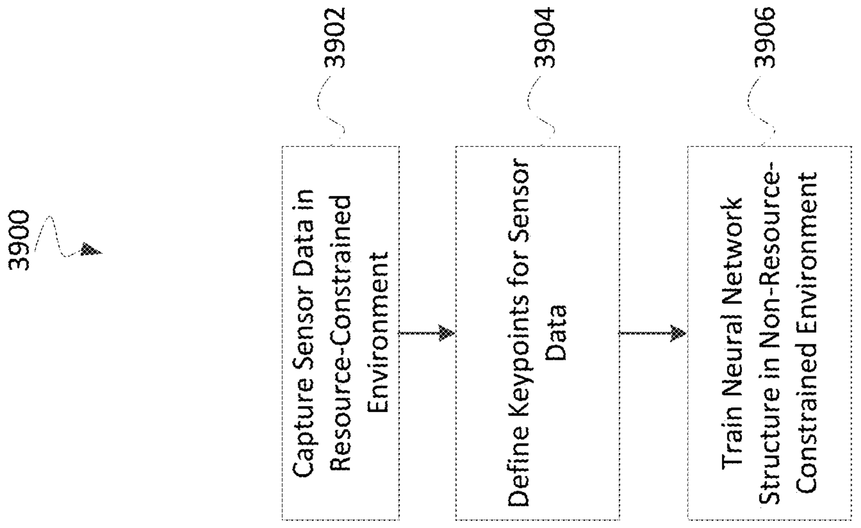
FIG. 39A is a flowchart of a process for training a neural network in a resource-constrained environment using key-points according to some embodiments of the present disclosure.

FIG. 39A is a flowchart of a process 3900 for training a neural network in a resource-constrained environment using keypoints according to some embodiments of the present disclosure. For example, the resource-constrained environment may be an automobile as described elsewhere in the present disclosure (e.g., automobiles 110, 300, 400, 710, 1510, and/or 1610).

At block 3902, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be an image of the interior of an automobile.

At block 3904, keypoints are defined for the sensor data. A keypoint may be a location in sensor data. For example, a keypoint may be defined by an x coordinate and a y coordinate in an area occupied by sensor data (e.g., a rectangular image). One or more pixels of sensor data may correspond to a keypoint. For example, a pixel located at the same x, y coordinates as the keypoint may be a pixel corresponding to the keypoint. Block 3904 may include defining one keypoint corresponding to the sensor data or defining more than one keypoint corresponding to the sensor data. In some embodiments, block 3904 may include a human user defining a keypoint. In some embodiments, block 3904 may include automatically defining a keypoint (e.g., based on a calculated activation area, and/or based on an expected activation area).

At block 3906, a neural network structure is trained in the non-resource-constrained using the sensor data captured at block 3902 and using the keypoints defined at block 3904. The training of the neural network structure may be performed as described elsewhere herein (e.g., as described for neural network structures 600, 650). In some embodiments, the sensor data captured from the resource-constrained environment may be labelled prior to or as part of block 3906.

In some embodiments, block 3906 may include modifying the training of the neural network structure. For example, in some embodiments, a pixel corresponding to a keypoint may have its value increased by a fixed multiple (e.g., two times its original value) prior to using the pixel as input to the neural network training algorithm. As another example, in some embodiments, a pixel corresponding to a keypoint may be duplicated (e.g., three additional times) prior to using the pixel as input to the neural network training algorithm. Block 3906 may include altering the input to a neural network structure training algorithm based on the keypoints defined at block 3904 in various other ways consistent with the present disclosure.

In some embodiments, block 3906 may include modifying a neural network structure. For example, in some embodiments, block 3906 may include training a neural network structure using the sensor data captured at block 3902, and then modifying a weight value for a connection of the neural network structure over which a pixel corresponding to a keypoint passes (e.g., doubling the weight on a connection carrying the pixel corresponding to a keypoint). As another example, in some embodiments, block 3906 may include training a neural network structure using the sensor data captured at block 3902, and then modifying an activation function for a node of the neural network structure into which a pixel corresponding to a keypoint passes (e.g., increasing the likelihood of activation for the connection carrying the pixel corresponding to a keypoint). Block 3906 may include altering a trained neural network structure based on the keypoints defined at block 3904 in various other ways consistent with the present disclosure.

In some embodiments, the process 3900 may include performing other actions, such as described elsewhere herein (e.g., blocks 2020, 2122, 2124, 2220, 2222, 2320, 2322, 2420, 2422, 2822, 2824, 2916, 2918, 3602, 3604, 3606).

In various embodiments, process 3900 may be performed using structures described elsewhere herein. For example, block 3902 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3904 and 3906 may be performed using computing devices described elsewhere herein (e.g., computing devices 726, 776, 1100, 1316, 1416, 1526, 1626, 1726). As a further example, blocks 3904 and 3906 may be performed using computing devices described elsewhere herein (e.g., computing devices 720, 770, 1000, 1320, 1420, 1520, 1620, 1720).

Figure 39B:
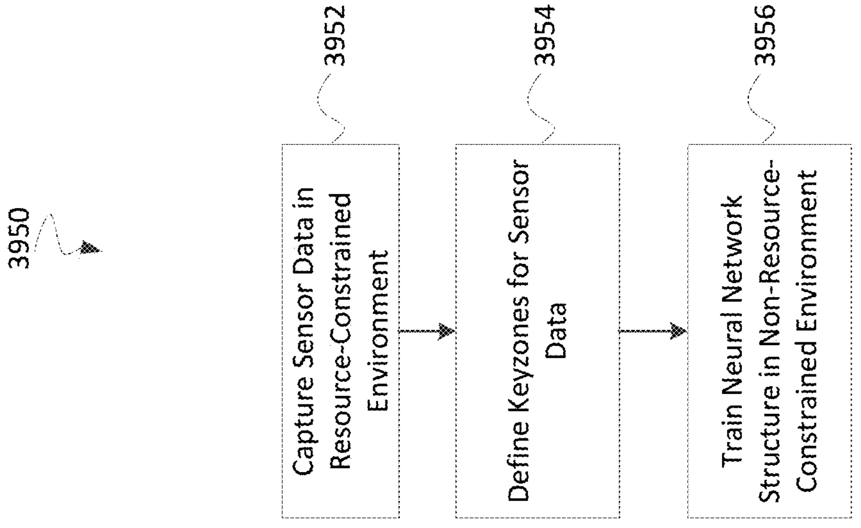
FIG. 39B is a flowchart of a process for training a neural network in a resource-constrained environment using key-zones according to some embodiments of the present disclosure.

FIG. 39B is a flowchart of a process 3950 for training a neural network in a resource-constrained environment using keyzones according to some embodiments of the present disclosure. For example, the resource-constrained environment may be an automobile as described elsewhere in the present disclosure (e.g., automobiles 110, 300, 400, 710, 1510, and/or 1610).

At block 3952, sensor data is captured in the resource-constrained environment. The sensor data may be captured by any of a variety of sensors, such as described with respect to sensors elsewhere in the present disclosure (e.g., sensors 232, 234, 460, 472, 716, 800, 1516, 1518, 1616, 1716). For example, the sensor data may be an image of the interior of an automobile.

At block 3954, keyzones are defined for the sensor data. A keyzone may be an area in sensor data. For example, a keyzone may be defined by four pairs of x, y coordinates (e.g., a rectangular bounding box) in an area occupied by sensor data (e.g., a rectangular image). One or more pixels of sensor data may correspond to a keyzone. For example, a group of 16 pixels located within the area bounded by the keyzone may be pixels corresponding to the keyzone. Block 3954 may include defining one keyzone corresponding to the sensor data or defining more than one keyzone corresponding to the sensor data. In some embodiments, block 3954 may include a human user defining a keyzone. In some embodiments, block 3954 may include automatically defining a keyzone (e.g., based on a calculated activation area, and/or based on an expected activation area).

At block 3956, a neural network structure is trained in the non-resource-constrained using the sensor data captured at block 3952 and using the keyzones defined at block 3954. The training of the neural network structure may be performed as described elsewhere herein (e.g., as described for neural network structures 600, 650). In some embodiments, the sensor data captured from the resource-constrained environment may be labelled prior to or as part of block 3956.

In some embodiments, block 3956 may include modifying the training of the neural network structure. For example, in some embodiments, pixels corresponding to a keyzone may have their values increased by a fixed multiple (e.g., two times its original value) prior to using the pixels as input to the neural network training algorithm. As another example, in some embodiments, pixels corresponding to a keyzone may be duplicated (e.g., three additional times) prior to using the pixels as input to the neural network training algorithm. Block 3956 may include altering the input to a neural network structure training algorithm based on the keyzones defined at block 3954 in various other ways consistent with the present disclosure.

In some embodiments, block 3956 may include modifying a neural network structure. For example, in some embodiments, block 3956 may include training a neural network structure using the sensor data captured at block 3952, and then modifying a weight value for a connection of the neural network structure over which a pixel corresponding to a keyzone passes (e.g., doubling the weight on a connection carrying a pixel corresponding to a keyzone). As another example, in some embodiments, block 3956 may include training a neural network structure using the sensor data captured at block 3952, and then modifying an activation function for a node of the neural network structure into which a pixel corresponding to a keyzone passes (e.g., increasing the likelihood of activation for the connection carrying a pixel corresponding to a keyzone). Block 3956 may include altering a trained neural network structure based on the keyzones defined at block 3954 in various other ways consistent with the present disclosure.

In some embodiments, the process 3950 may include performing other actions, such as described elsewhere herein (e.g., blocks 2020, 2122, 2124, 2220, 2222, 2320, 2322, 2420, 2422, 2822, 2824, 2916, 2918, 3602, 3604, 3606).

In various embodiments, process 3950 may be performed using structures described elsewhere herein. For example, block 3952 may be performed using sensors described elsewhere herein (e.g., sensors 460, 472, 716, 765, 766, 767, 768, 769, 800, 1316, 1416, 1516, 1518, 1616, 1618, 1716). As a further example, blocks 3954 and 3956 may be performed using computing devices described elsewhere herein (e.g., computing devices 726, 776, 1100, 1316, 1416, 1526, 1626, 1726). As a further example, blocks 3954 and 3956 may be performed using computing devices described elsewhere herein (e.g., computing devices 720, 770, 1000, 1320, 1420, 1520, 1620, 1720).

In some embodiments, the processes 3900 and/or 3950 may be used as part of or in conjunction with other processes described elsewhere herein (e.g., processes 2000, 2100, 2200, 2300, 2400, 2800, 2900, 3200, 3600, 3650, 3900, 3950). For example, in some embodiments, processes 3900 and 3950 may be combined so that both keypoints and keyzones are defined, and so that a neural network is trained based on captured sensor data, keypoints, and keyzones.

Figure 40:
FIG. 40 is a diagram of an annotation interface according to some embodiments of the present disclosure.

FIG. 40 is a diagram of an annotation interface 4000 according to some embodiments of the present disclosure. In some embodiments, the annotation interface 4000 may be used to annotate sensor data with keypoints. The annotation interface 4000 may allow a user to annotate an image with one or more keypoints (e.g., six keypoints as illustrated). In some embodiments, the annotation interface 4000 may be configured for the user to define a keypoint by clicking a point on the image. In such embodiments, the x, y coordinates of the location of the user's click may be determined and assigned as the location of the keypoint. In such embodiments, the annotation interface 4000 may output the x, y coordinates of the keypoint for view by the user after assigning the x, y coordinates to the keypoint. In some embodiments, the annotation interface 4000 may be configured for the user to define a keypoint by entering an x coordinate value and entering a y coordinate value. In some embodiments, the annotation interface 4000 may be used to define keypoints as part of other processes described herein (e.g., block 3904).

Figure 41:
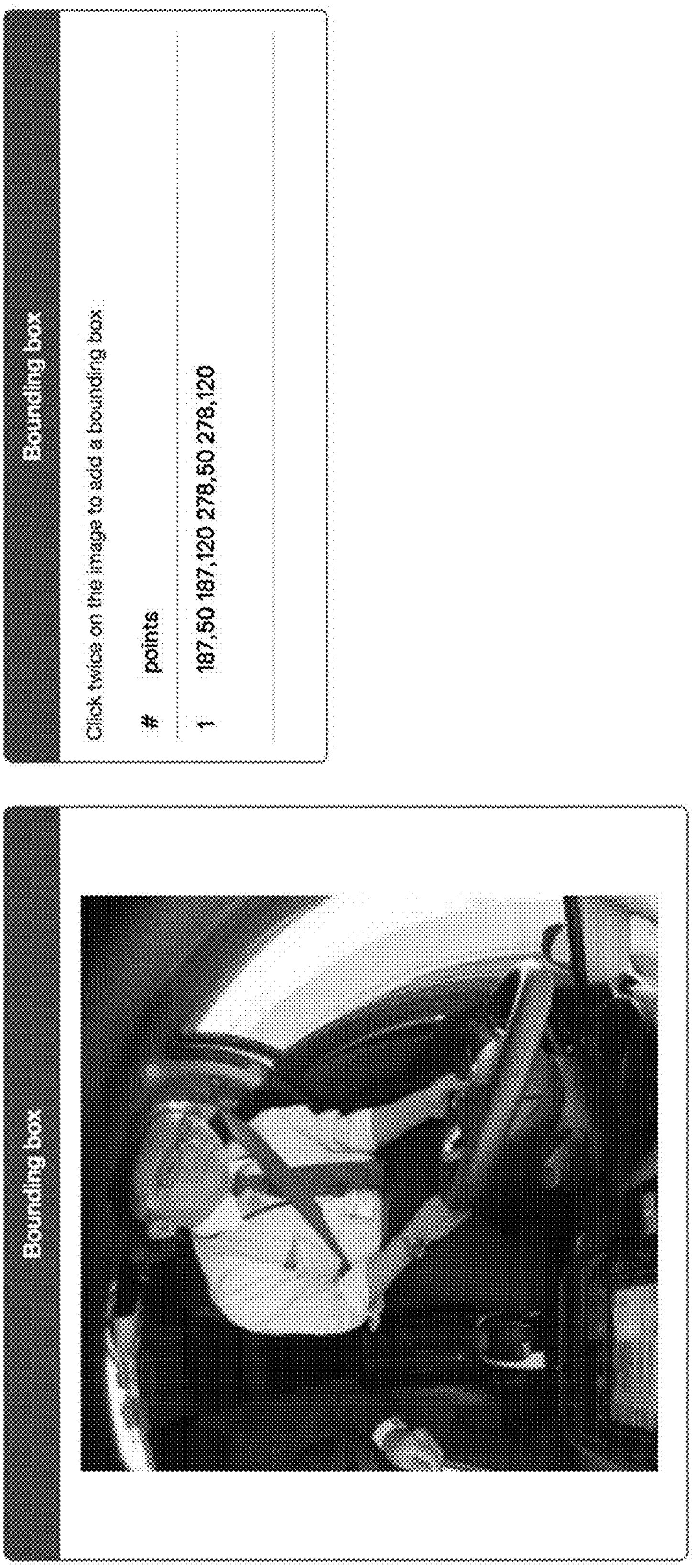
FIG. 41 is a diagram of an annotation interface according to some embodiments of the present disclosure.

FIG. 41 is a diagram of an annotation interface 4100 according to some embodiments of the present disclosure. In some embodiments, the annotation interface 4100 may be used to annotate sensor data with keyzones. The annotation interface 4100 may allow a user to annotate an image with one or more keyzones (e.g., six keyzones as illustrated). In some embodiments, the annotation interface 4100 may allow the user to define a keyzone as a geometric shape (e.g., a bounding box as illustrated). In some embodiments, the annotation interface 4100 may be configured for the user to define a keyzone by clicking a point on the image and dragging the pointer to a second location on the image. In some embodiments, the annotation interface 4100 may be configured for the user to define a keyzone by clicking three or more points on the image. In some embodiments, the x, y coordinates of the keyzone may be determined based on the user's clicks and or dragging, and the x, y coordinates may be assigned as the vertices of the keyzone. In such embodiments, the annotation interface 4100 may output the x, y coordinates of the vertices of the keyzone for view by the user after assigning the x, y coordinates to the keyzone. In some embodiments, the annotation interface 4100 may be configured for the user to define a keyzone by entering an x coordinate values and entering a y coordinate values for the vertices of the keyzone. In some embodiments, the annotation interface 4100 may be used to define keyzones as part of other processes described herein (e.g., block 3954).

In some embodiments of the present disclosure, the keypoints and/or keyzones may be beneficial for numerous reasons. The keypoints and/or keyzones may be effective to improve the effectiveness of a neural network structure. For example, by using the keypoints and/or keyzones to train a neural network structure or modify a trained neural network structure, such as described elsewhere herein (e.g., blocks 3906, 3956), the neural network structure may be more effective in determining a result based on the input (e.g., determining a driver state based on an input image of the interior of the automobile). This benefit may arise, at least in part, because the keypoints and/or keyzones may define area of particular importance to determining the neural networks output (e.g., the driver's face and the driver's hands for determining whether the driver state is "safe driving," "texting," "touching headunit," or "talking"). The keypoints and/or keyzones may therefore incorporate additional knowledge about the environment on which the neural network structure is operating that may be incorporated into the neural network structure. In cases where the keypoints and/or keyzones are defined by a human user, the keypoints and/or keyzones may incorporate the human user's knowledge about the environment (e.g., the human user's knowledge that the face and hands are important to determining the driver state). In cases where the keypoints and/or keyzones are defined automatically, the keypoints and/or keyzones may incorporate knowledge determined by some computational process (e.g., using the calculated activation zone to incorporate knowledge learned by the system from the previous application of the neural network structure).

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system comprising:

one or more sensors located in an environment configured to generate first sensor data of the environment;

one or more computing devices configured to receive a neural network, wherein the one or more computing devices are configured to receive the first sensor data, and determine a state of the environment based on input of the first sensor data to the neural network; and a controller configured to control a device in the environment based on a result of the determination of the state of the environment by the one or more computing devices, wherein the one or more computing devices are configured to calculate an activation area for the neural network, wherein the one or more computing devices are configured to calculate the activation area for the neural network, at least in part, by iteratively providing each of a plurality of sensor data as input to the neural network, wherein each sensor data of the plurality of sensor data is formed by placing a mask at a corresponding location in the first sensor data, wherein the one or more computing devices are configured to calculate the activation area for the neural network, at least in part, by comparing a first result of providing the first sensor data as input to the neural network to a corresponding result of providing each of the plurality of sensor data as input to the neural network;

wherein the environment is an automobile, and wherein the first sensor data comprises images of an interior of the automobile.

2. The system of claim 1, wherein the one or more computing devices comprise:

a local computing device located in the environment; and a remote computing device not located in the environment.

3. The system of claim 2, wherein the remote computing device is configured to generate the neural network based on second sensor data of the environment, and wherein the local computing device is configured to determine the state of the environment.

4. The system of claim 3, wherein the local computing device is configured to calculate the activation area for the neural network.

5. The system of claim 3, wherein the remote computing device is configured to calculate the activation area for the neural network.

6. The system of claim 1, wherein the controller is configured to control the device in the environment in order to control operation of the automobile in a self-driving mode.

7. The system of claim 1, wherein the one or more computing devices are configured to calculate the activation area for a first prediction class of the neural network, and wherein the one or more computing devices are configured to calculate a second activation area for a second prediction class of the neural network.

8. The system of claim 7, wherein the one or more computing devices are configured to compare the activation area to an expected activation area for the first prediction class; and wherein the one or more computing devices are configured to compare the second activation area to an expected activation area for the second prediction class.

9. The system of claim 8, wherein the one or more computing devices are configured, based at least in part on a result of comparing the activation area to the expected activation area for the first prediction class, to instruct the one or more sensors to generate additional sensor data for the first prediction class.

10. The system of claim 1, wherein the one or more computing devices are configured to compare the first result to the corresponding result, at least in part, by determining if a prediction class provided as part of the corresponding result is different from a prediction class provided as part of the first result.

11. The system of claim 1, wherein the one or more computing devices are configured to compare the first result to the corresponding result, at least in part, by determining if a second prediction confidence level provided as part of the corresponding result is different from a first prediction confidence level provided as part of the first result.

12. The system of claim 11, wherein the one or more computing devices are configured to determine if the second prediction confidence level is different from the first prediction confidence level, at least in part, by determining if a difference between the second prediction confidence level and the first prediction confidence level is greater than a predefined threshold value.

13. The system of claim 1, wherein the one or more computing devices are configured to determine an effectiveness value for the neural network based at least in part on the calculated activation area, and wherein the one or more computing devices are configured, based at least in part on the determined effectiveness value, to generate a second neural network.

14. A method comprising:

generating first sensor data of an environment;

receiving a neural network;

determining a state of the environment based on input of the first sensor data to the neural network;

controlling, based on a result of the determining the state of the environment, a device in the environment; and calculating an activation area for the neural network, wherein calculating the activation area for the neural network comprises iteratively providing each of a plurality of sensor data as input to the neural network, wherein each sensor data of the plurality of sensor data is formed by placing a mask at a corresponding location in the first sensor data, wherein calculating the activation area for the neural network comprises comparing a first result of providing the first sensor data as input to the neural network to a corresponding result of providing each of the plurality of sensor data as input to the neural network;

wherein calculating the activation area for the neural network comprises calculating a first activation area for a first prediction class of the neural network;

the method further comprising:

calculating a second activation area for a second prediction class of the neural network;

comparing the first activation area to an expected activation area for the first prediction class;

comparing the second activation area to an expected activation area for the second prediction class; and instructing one or more sensors, based at least in part on a result of comparing the first activation area to the expected activation area for the first prediction class, to generate additional sensor data for the first prediction class.

15. The method of claim 14, wherein the comparing of the first result to the corresponding result comprises determining if a prediction class provided as part of the corresponding result is different from a prediction class provided as part of the first result.

16. The method of claim 14, wherein the comparing of the first result to the corresponding result comprises determining if a second prediction confidence level provided as part of the corresponding result is different from a first prediction confidence level provided as part of the first result.

* * * * *